US012709024B2

(12) United States Patent
Peng et al.

(10) Patent No.: US 12,709,024 B2
(45) Date of Patent: Aug. 18, 2026

(54) AUGMENTED SYSTEM AND METHOD FOR GRASPING OBJECTS

(71) Applicant: Nexera Robotics Corp., North Vancouver (CA)

(72) Inventors: Jingyang Peng, Burnaby (CA); Jeffrey M. Krahn, North Vancouver (CA); Sepehr Sheikholeslami, Vancouver (CA); Carlo Menon, Coquitlam (CA); Michael Celio, Vancouver (CA)

(73) Assignee: Nexera Robotics Corp., North Vancouver (CA)

( * ) Notice: Subject to any disclaimer, the term of this patent is extended or adjusted under 35 U.S.C. 154(b) by 0 days.

(21) Appl. No.: 19/259,728

(22) Filed: Jul. 3, 2025

(65) Prior Publication Data

US 2026/0001240 A1 Jan. 1, 2026

Related U.S. Application Data

(63) Continuation of application No. PCT/CA2023/051650, filed on Dec. 12, 2023, and a (Continued)

(51) Int. Cl.
*B25J 15/06* (2006.01)
*B25J 9/10* (2006.01)
*B25J 19/02* (2006.01)

(52) U.S. Cl.
CPC ........... *B25J 15/0683* (2013.01); *B25J 9/108* (2013.01); *B25J 19/02* (2013.01)

(58) Field of Classification Search
CPC ........ B25J 15/0683; B25J 9/108; B25J 19/02; B25J 15/0052; B25J 15/0023; B25J 15/0616
See application file for complete search history.

(56) References Cited

U.S. PATENT DOCUMENTS 3,245,710 A 4/1966 Begemann
4,561,686 A 12/1985 Atchley
(Continued)

FOREIGN PATENT DOCUMENTS

CN 105798940 A 7/2016
CN 106466849 A 3/2017
(Continued)

OTHER PUBLICATIONS

European Patent Office, Office Action in EP Application No. 20886980.0, dated Sep. 3, 2024, 6 pages.
(Continued)

*Primary Examiner* — Stephen A Vu
(74) *Attorney, Agent, or Firm* — Schwabe, Williamson & Wyatt, P.C.

(57) ABSTRACT

A system and method to provide a suction device adapted to provide gripping and suction forces to pick up and move a wide variety of objects. This is accomplished through a primary grasping interface composed of a suction compartment, a membrane compartment, deformable membrane sealing said membrane compartment, and at least one pressure mechanism. At least one pressure mechanism is in fluid connection with the suction compartment and is configured to modify properties within the suction compartment to assist in providing gripping and attractive forces. The device will grasp an object with the primary grasping interface by positioning the deformable membrane adjacent to said object, modifying the deformable membrane to conform to and create a seal with said object, and then depressurizing the suction compartment vis the pressure mechanism, providing a suction force onto said object within that sealed area sufficient to grasp said object.

34 Claims, 24 Drawing Sheets

Related U.S. Application Data continuation-in-part of application No. 17/754,769, filed as application No. PCT/US2020/060308 on Nov. 12, 2020, now Pat. No. 12,576,544.

(60) Provisional application No. 63/589,119, filed on Oct. 10, 2023, provisional application No. 63/583,563, filed on Sep. 18, 2023, provisional application No. 63/503,182, filed on May 19, 2023, provisional application No. 63/038,806, filed on Jun. 13, 2020, provisional application No. 62/933,647, filed on Nov. 11, 2019.

(56) References Cited

U.S. PATENT DOCUMENTS

| | | | |
|---|---|---|---|
| 6,502,877 | B2 | 1/2003 | Schick et al. |
| 6,846,029 | B1 | 1/2005 | Ragner et al. |
| 7,293,750 | B2 | 11/2007 | Richter |
| 7,409,812 | B2 | 8/2008 | Gilmore et al. |
| 7,452,017 | B2 | 11/2008 | Maffeis |
| 7,992,908 | B2 | 8/2011 | Finck |
| 8,096,537 | B2 | 1/2012 | Browne et al. |
| 8,882,165 | B2 | 11/2014 | Lipson et al. |
| 9,120,230 | B2 | 9/2015 | Lipson et al. |
| 9,308,650 | B2 | 4/2016 | Eisele et al. |
| 9,339,945 | B2 | 5/2016 | Parness et al. |
| 9,505,955 | B1 | 11/2016 | Krahn et al. |
| 9,623,570 | B1 | 4/2017 | Krahn et al. |
| 10,087,020 | B1 | 10/2018 | Ruiz et al. |
| 10,335,956 | B2 | 7/2019 | Wagner et al. |
| 10,569,422 | B2 | 2/2020 | Curhan et al. |
| 11,077,564 | B1 | 8/2021 | Polido et al. |
| 2010/0054903 | A1 | 3/2010 | Jones et al. |
| 2010/0217436 | A1 | 8/2010 | Jones et al. |
| 2013/0106127 | A1 | 5/2013 | Lipson et al. |
| 2015/0272749 | A1 | 10/2015 | Amend, Jr. et al. |
| 2017/0072572 | A1 | 3/2017 | Wagner et al. |
| 2018/0015618 | A1 | 1/2018 | Nadler et al. |
| 2019/0047156 | A1 | 2/2019 | Curhan et al. |
| 2019/0217481 | A1 | 7/2019 | Lessing et al. |
| 2019/0217482 | A1 | 7/2019 | Ishida et al. |
| 2019/0217486 | A1 | 7/2019 | Takahashi et al. |
| 2019/0217487 | A1 | 7/2019 | Takahashi et al. |

FOREIGN PATENT DOCUMENTS

| | | | | |
|---|---|---|---|---|
| CN | 109789564 | A | 5/2019 | |
| CN | 110370308 | A | 10/2019 | |
| DE | 102012012289 | A1 | 12/2012 | |
| DK | 179475 | B1 | 11/2018 | |
| EP | 1731452 | A3 | 4/2008 | |
| EP | 2415696 | A1 | 2/2012 | |
| EP | 3248738 | A1 | 11/2017 | |
| JP | 2012176476 | A | 9/2012 | |
| JP | 2018149639 | A | 9/2018 | |
| JP | 2018149640 | A | 9/2018 | |
| WO | 2006082100 | A1 | 8/2006 | |
| WO | 2011130475 | A2 | 10/2011 | |
| WO | 2011135450 | A1 | 11/2011 | |
| WO | 2012093932 | A3 | 7/2012 | |
| WO | 2015006613 | A1 | 1/2015 | |
| WO | 2015123128 | A1 | 8/2015 | |
| WO | 2016146140 | A8 | 9/2016 | |
| WO | WO-2018168026 | A1 * | 9/2018 | ........... B29C 43/183 |
| WO | 2019065120 | A1 | 4/2019 | |
| WO | 2019075464 | A1 | 4/2019 | |
| WO | 2021097145 | A1 | 5/2021 | |

OTHER PUBLICATIONS

Japan Patent Office, Notice of Reason(s) for Rejection in JP Application No. 2021-575928, mailed Nov. 5, 2024, 15 pages with translation.

Japan Patent Office, Notice of Reason(s) for Rejection in JP Application No. 2021-575928, mailed May 20, 2025, 5 pages with translation.

China National Intellctual Property Administration, Notice of Allowance issued in CN Application No. 202080038031.X, issued Sep. 20, 2024, 6 pages with English translation.

China National Intellectual Property Administration, Office Action issued in CN Application No. 202080038031.X, issued Feb. 29, 2024, 20 pages with English machine translation.

European Patent Office, Extended European Search Report issued in EP Application No. 20886980.0, issued Dec. 15, 2022, 9 pages.

United States International Searching Authority (ISA/US), International Search Report issued in PCT/US2020/060308, mailed Feb. 3, 2021, 3 pages.

United States International Searching Authority (ISA/US), Written Opinion of the International Searching Authority issued in PCT/US2020/060308, mailed Feb. 3, 2021, 7 pages.

Canadian Intellectual Property Office International Searching Authority (ISA/CA), Written Opinion of the International Searching Authority issued in PCT/CA2023/051650 mailed Mar. 5, 2024, 9 pages.

* cited by examiner

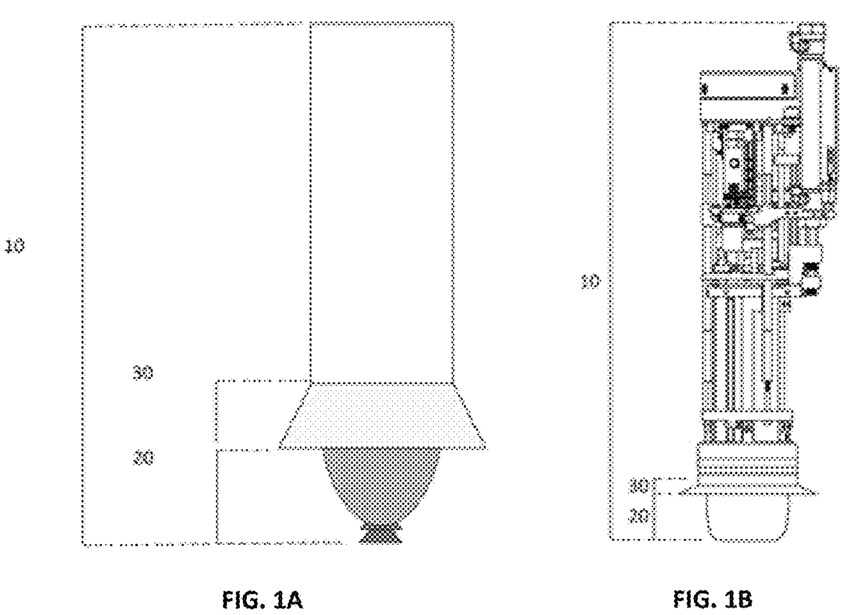
FIG. 1A
FIG. 1B
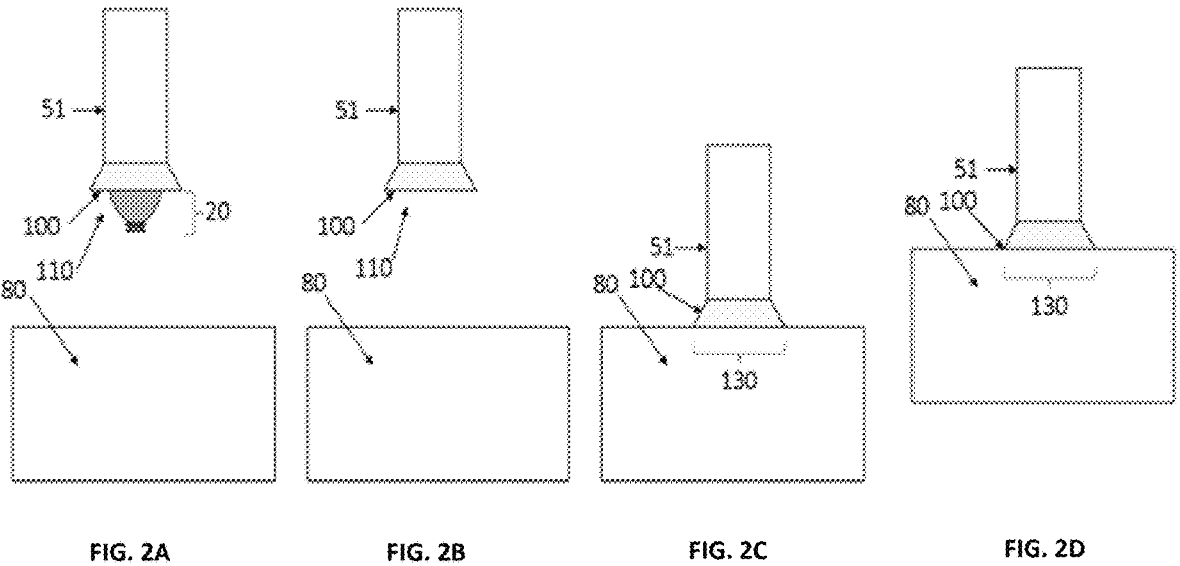
FIG. 2A
FIG. 2B
FIG. 2C
FIG. 2D 2
42
52
72
71
120
70
32
41
40
51
50
67
65
30
31
100
66
110
60
43
44
20
48
49
53
47

80
130

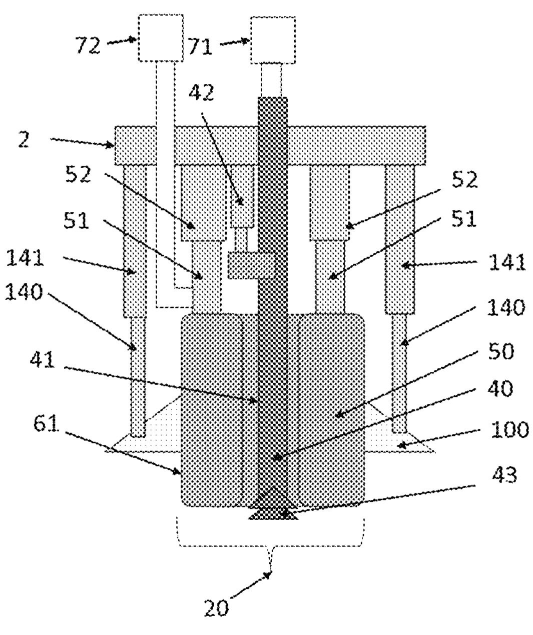
FIG. 7
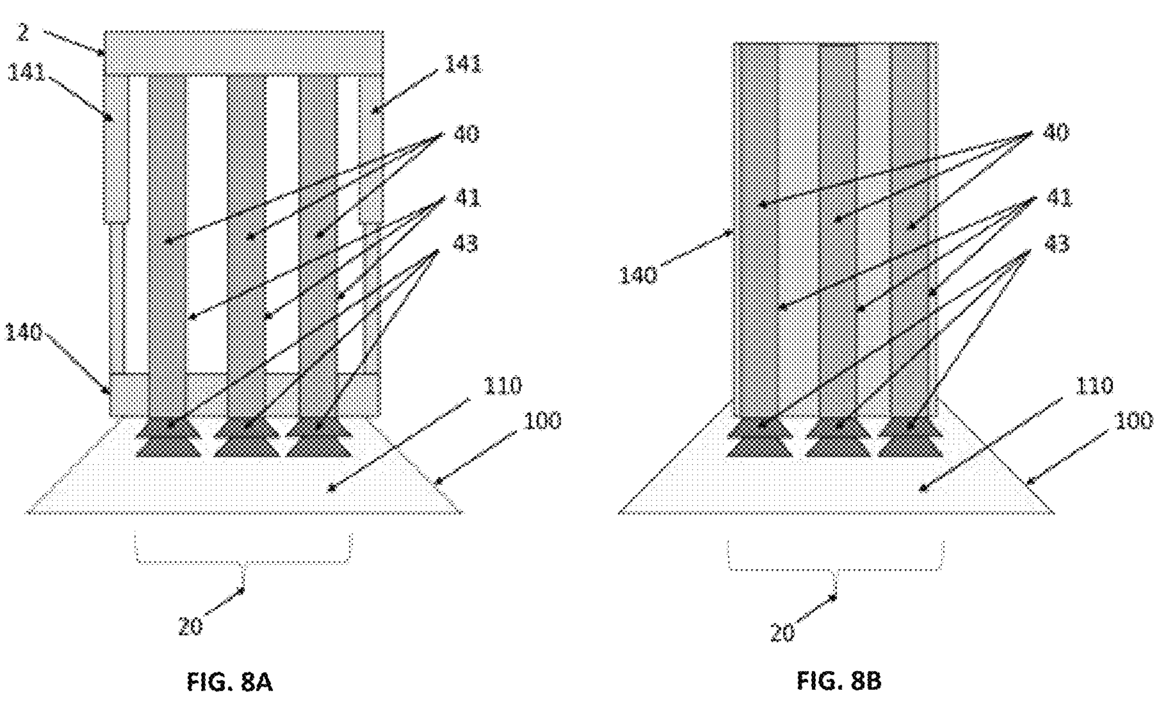
FIG. 8A
FIG. 8B

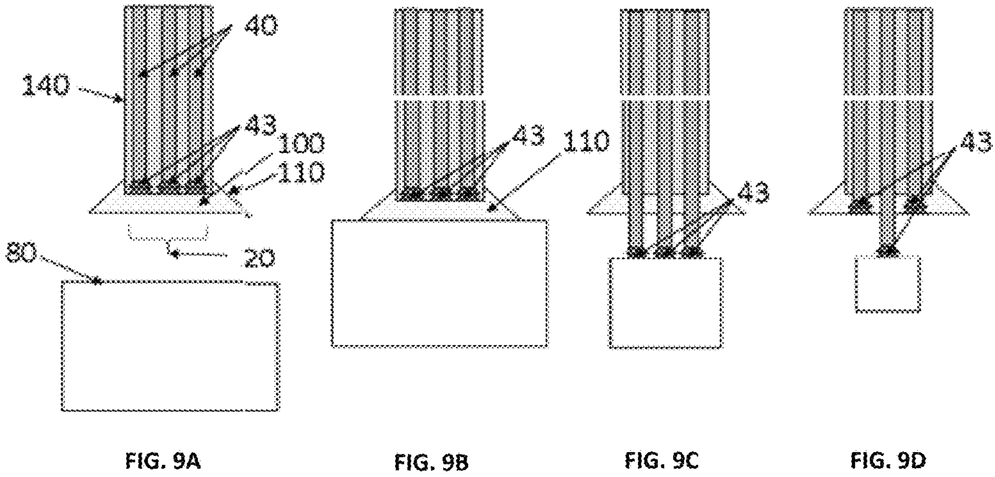
FIG. 9A FIG. 9B FIG. 9C FIG. 9D
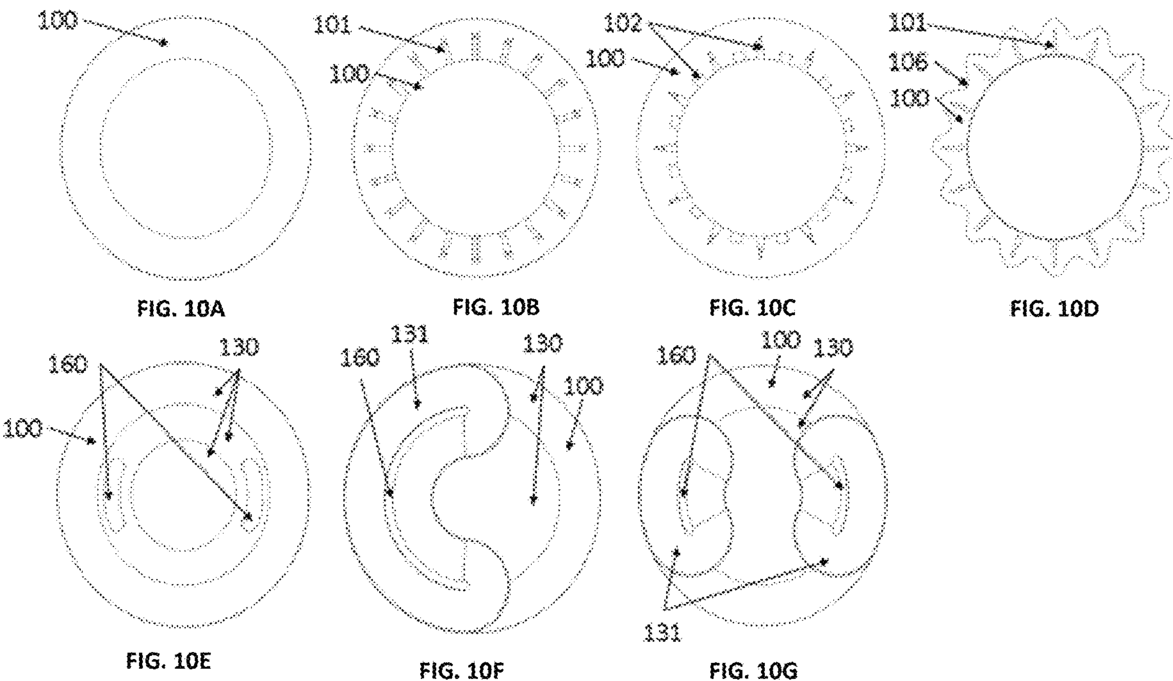
FIG. 10A FIG. 10B FIG. 10C FIG. 10D
FIG. 10E FIG. 10F FIG. 10G

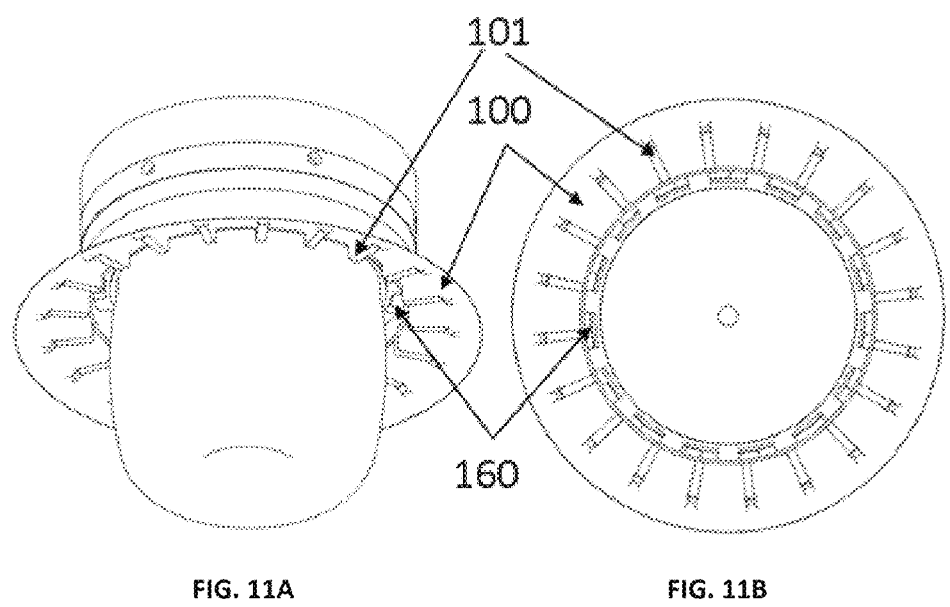
FIG. 11A
FIG. 11B
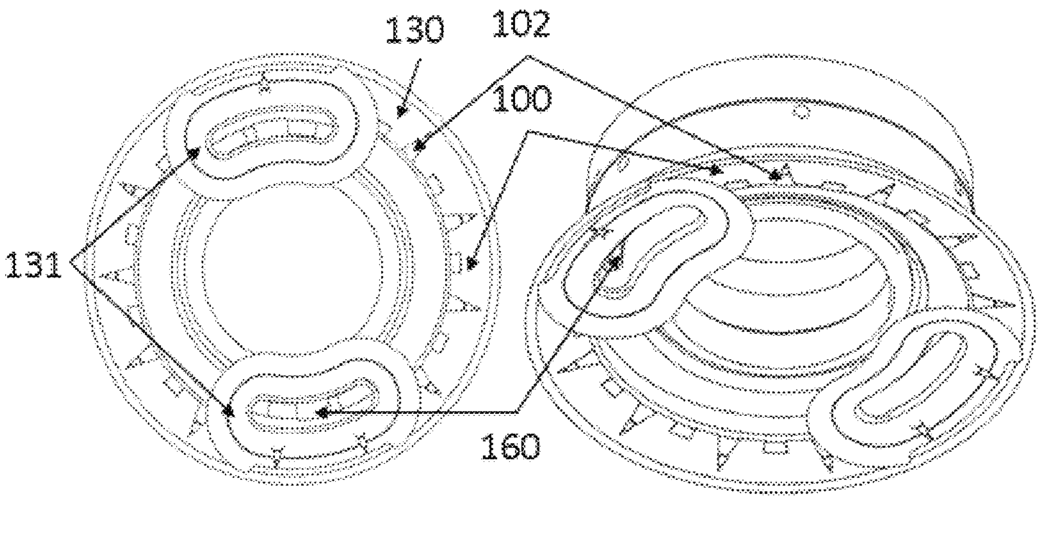
FIG. 12A
FIG. 12B

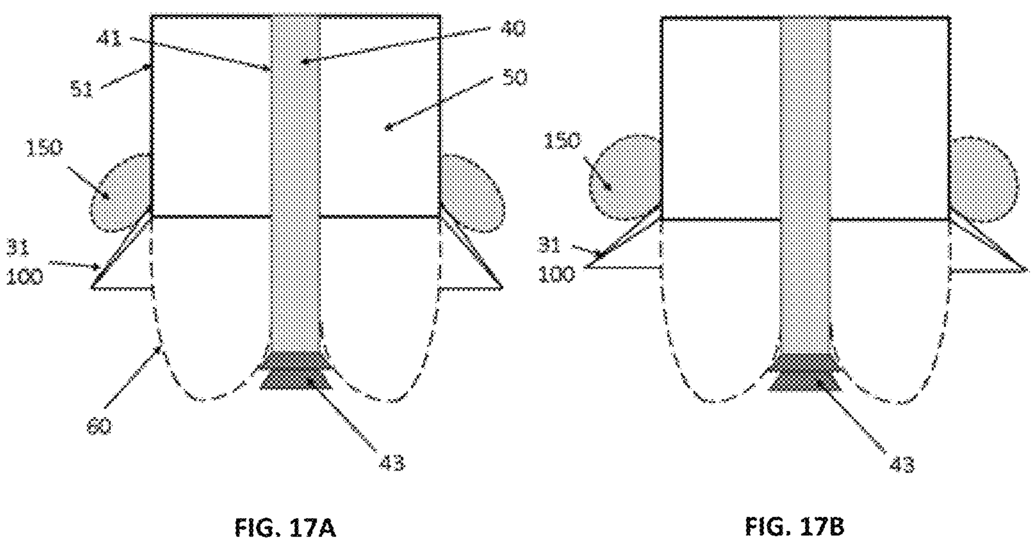
FIG. 17A
FIG. 17B
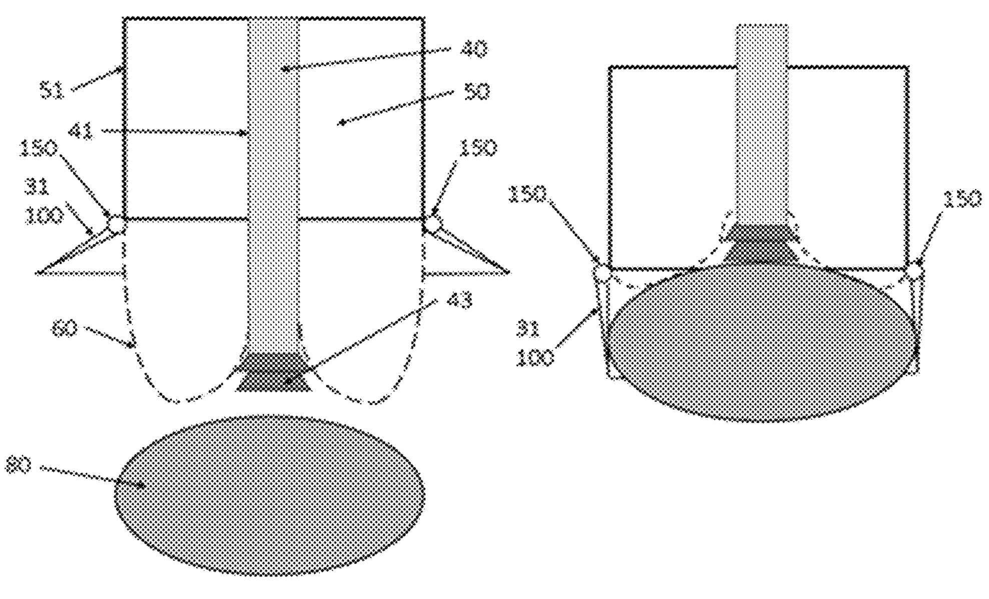
FIG. 18A
FIG. 18B

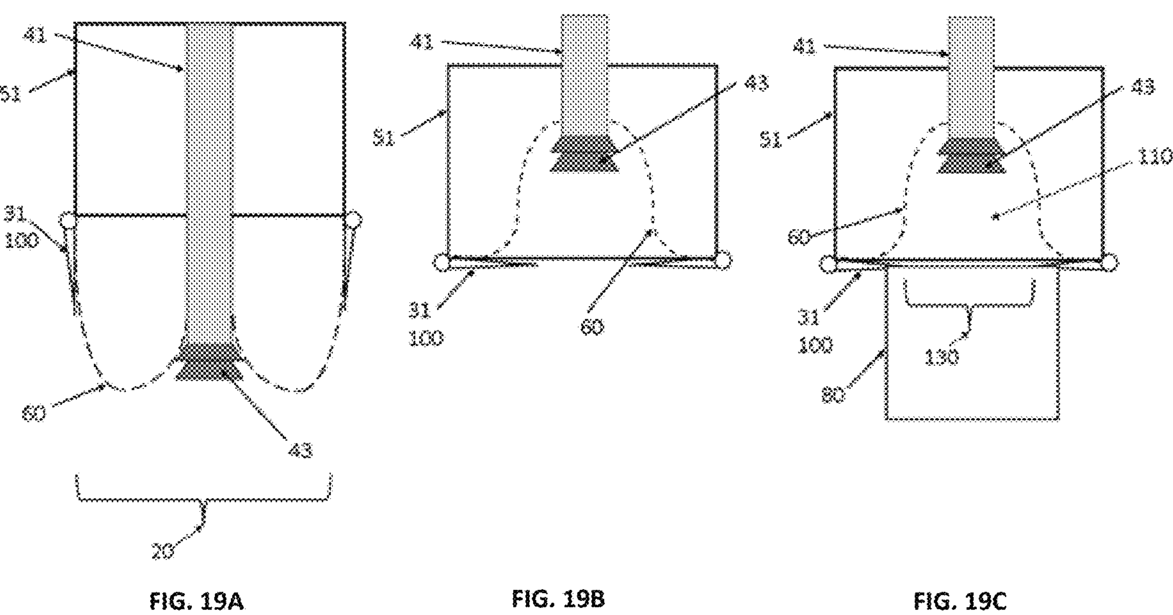
FIG. 19A
FIG. 19B
FIG. 19C
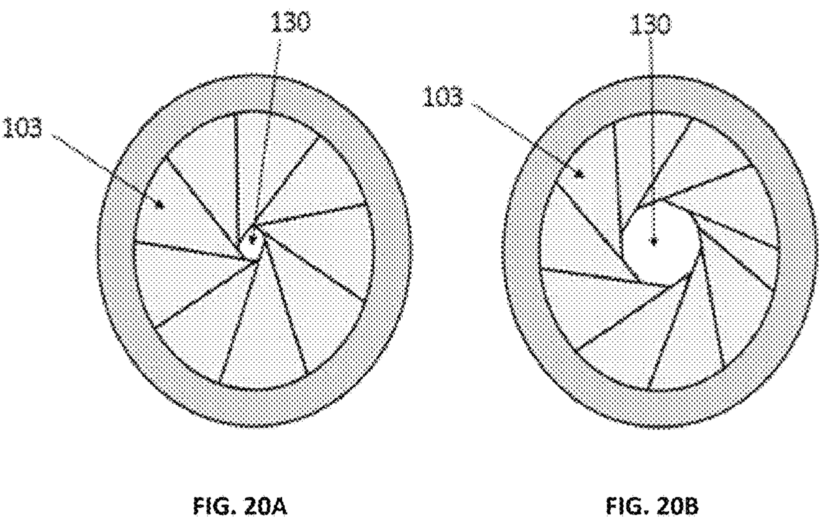
FIG. 20A
FIG. 20B

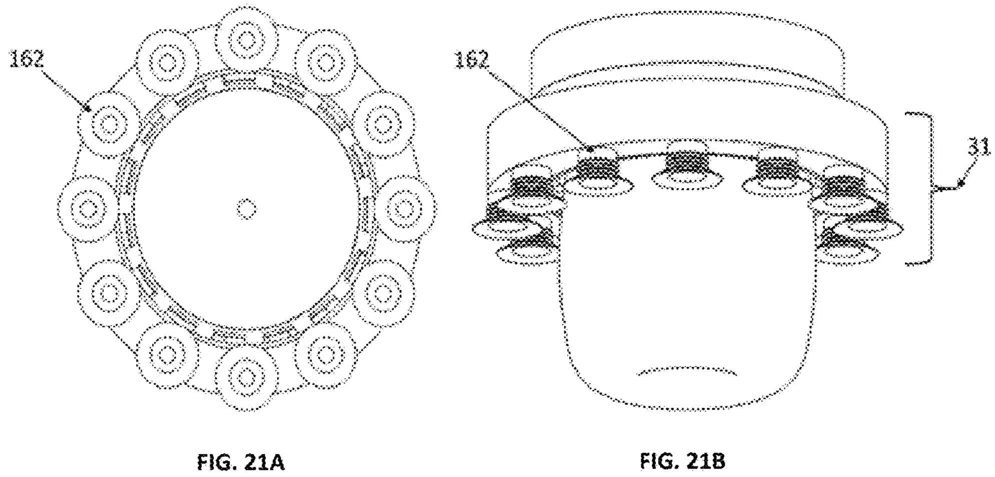
FIG. 21A
FIG. 21B
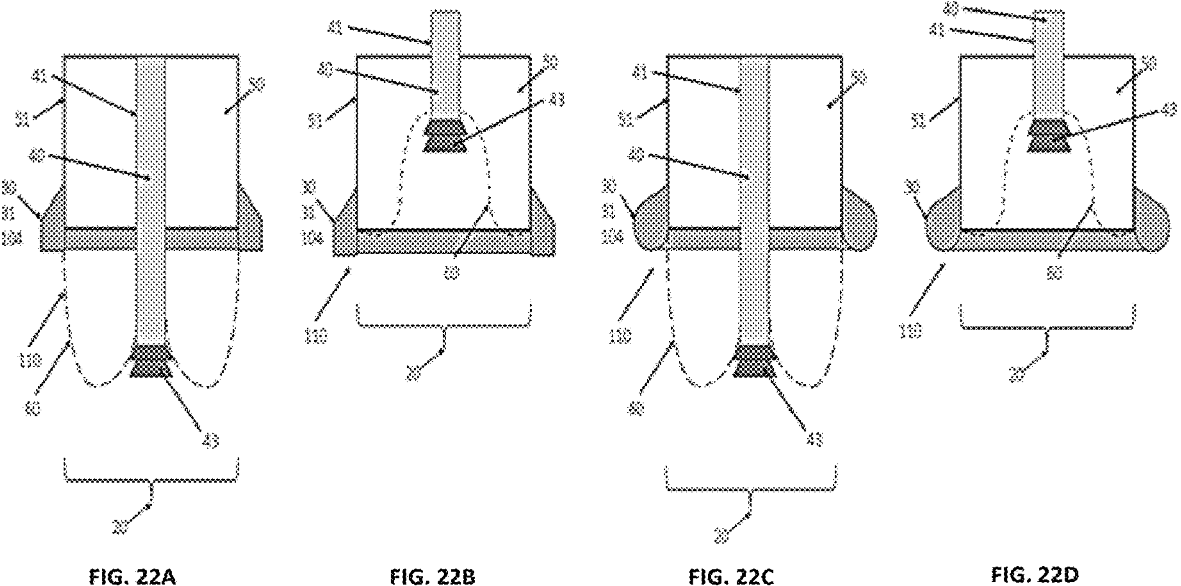
FIG. 22A
FIG. 22B
FIG. 22C
FIG. 22D

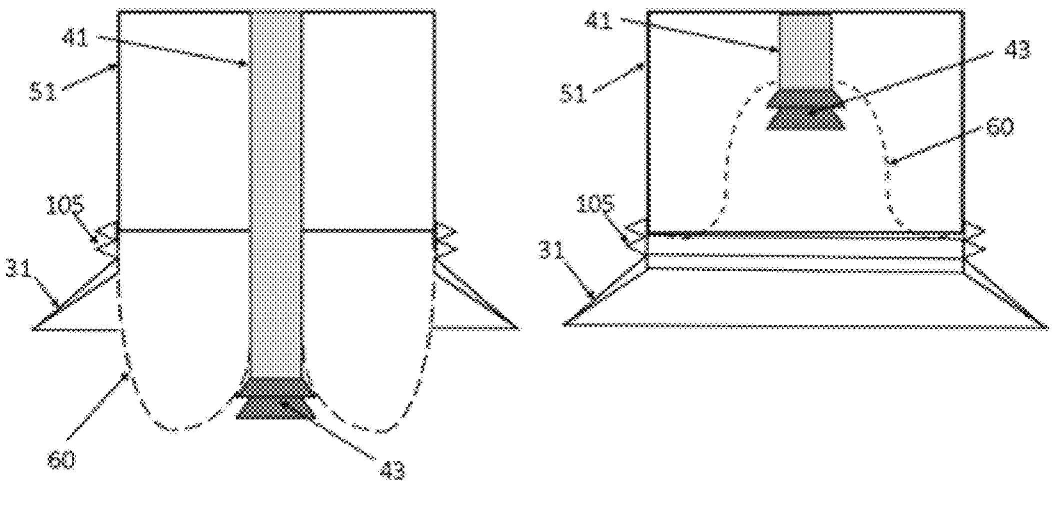
FIG. 27A
FIG. 27B
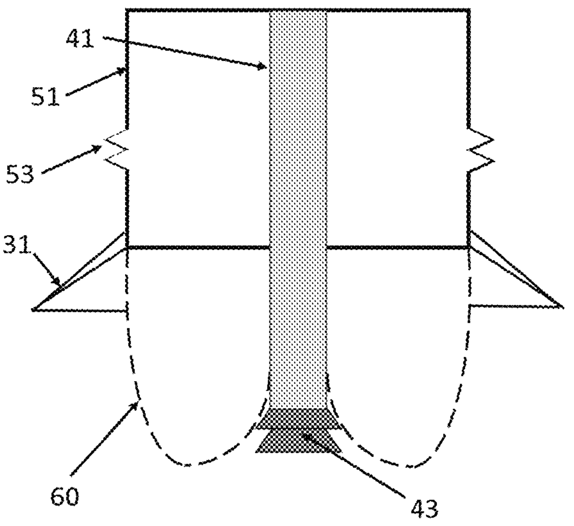
FIG. 28

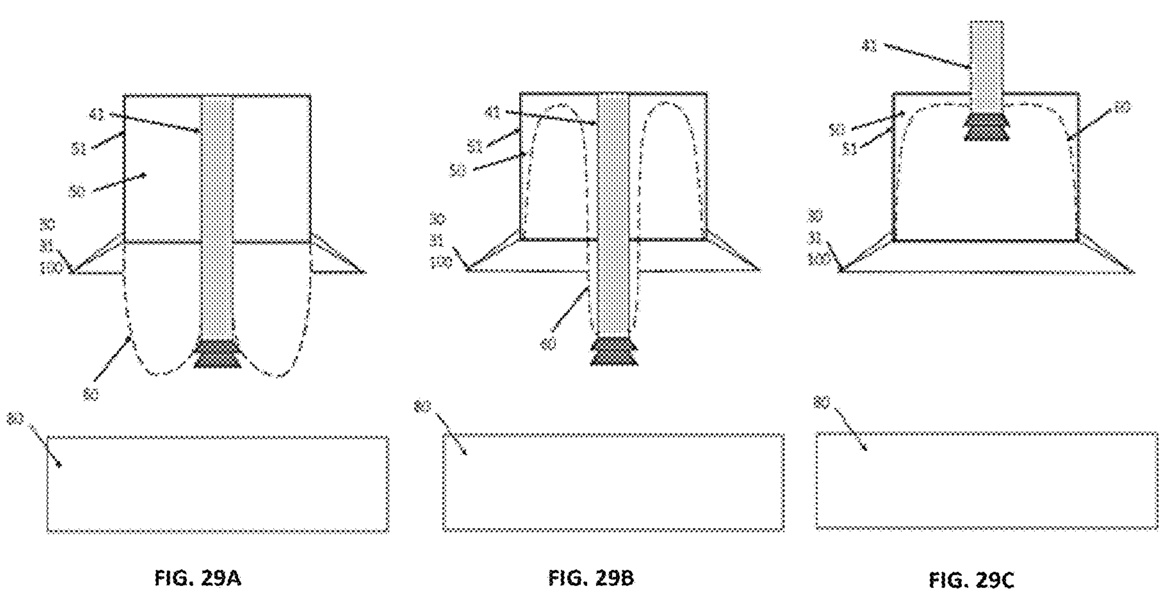
FIG. 29A
FIG. 29B
FIG. 29C
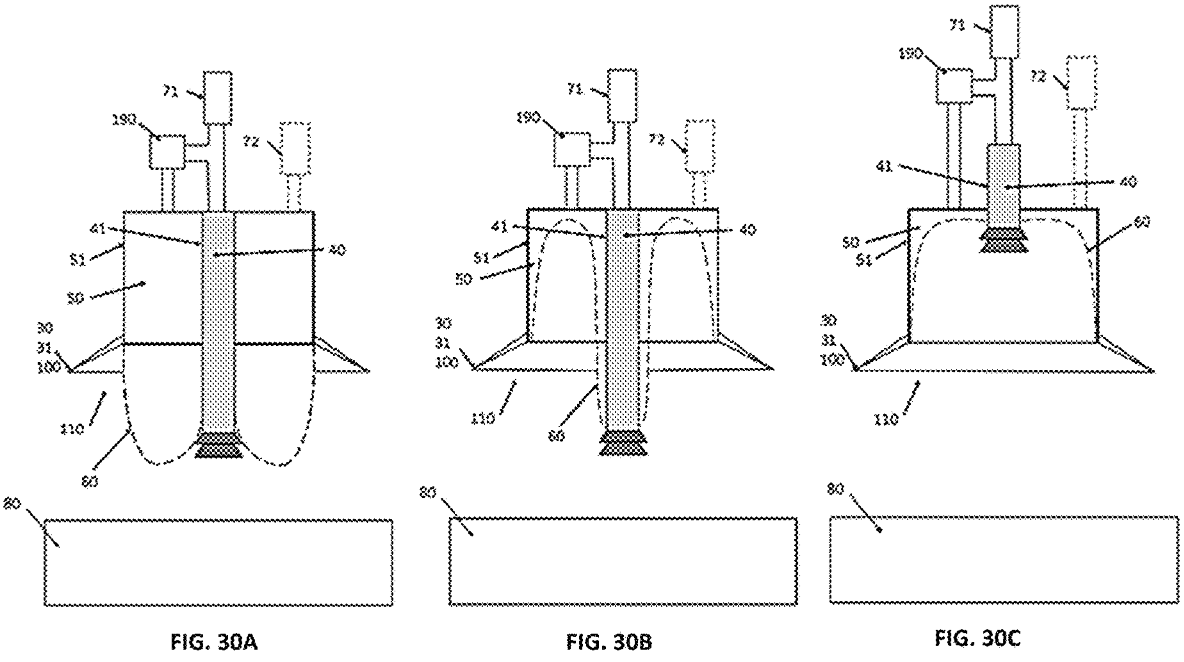
FIG. 30A
FIG. 30B
FIG. 30C

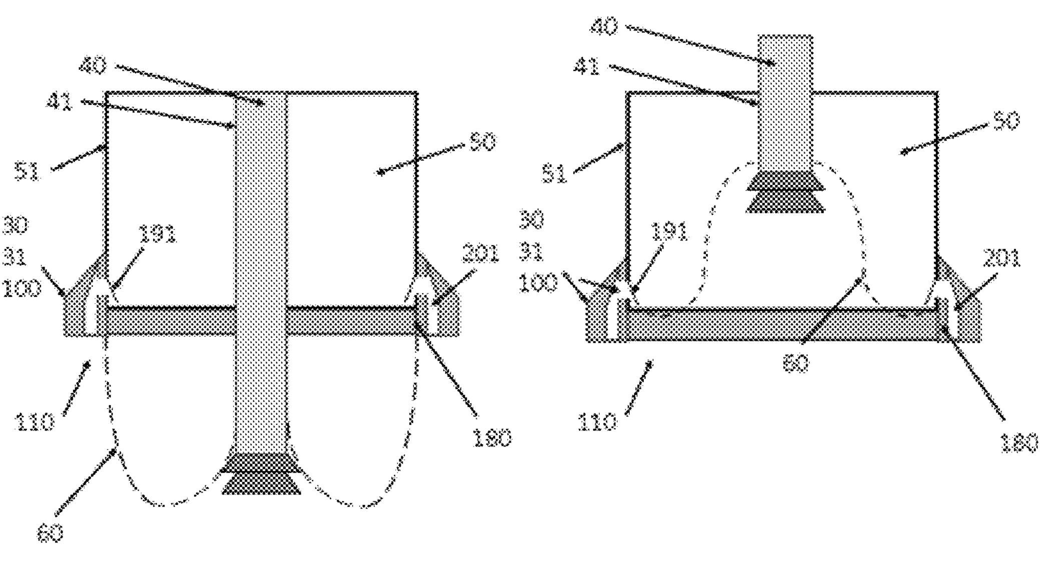
FIG. 31A
FIG. 31B
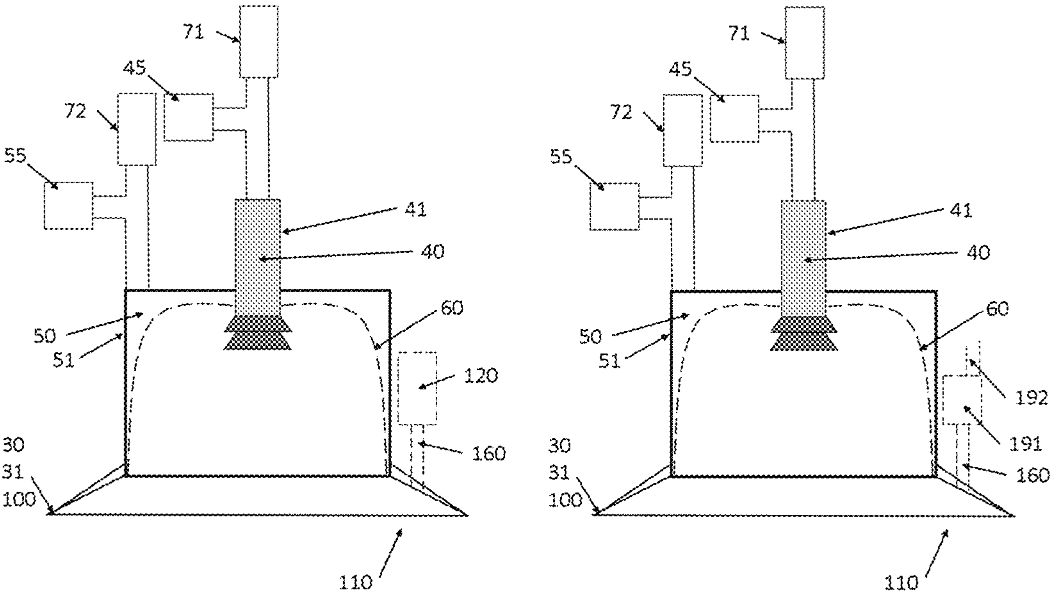
FIG. 32A
FIG. 32B

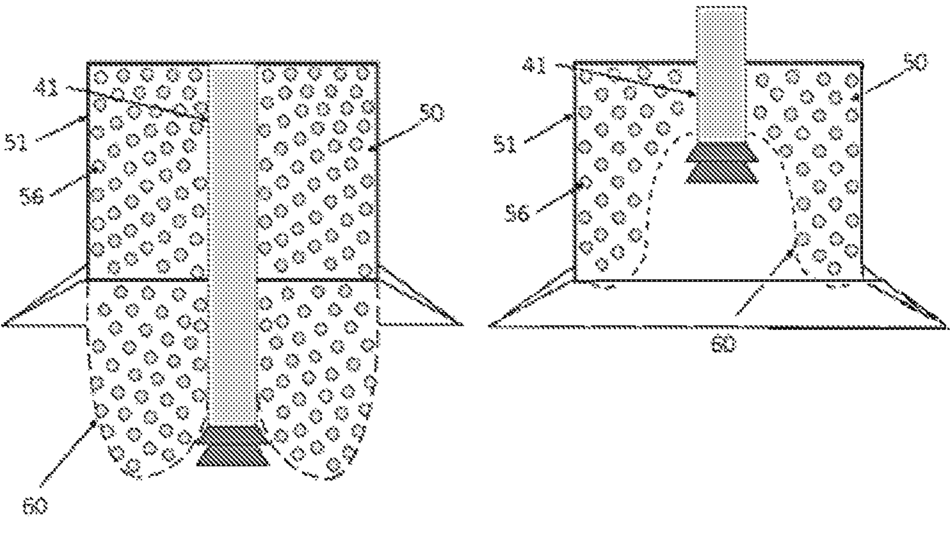
FIG. 33A
FIG. 33B
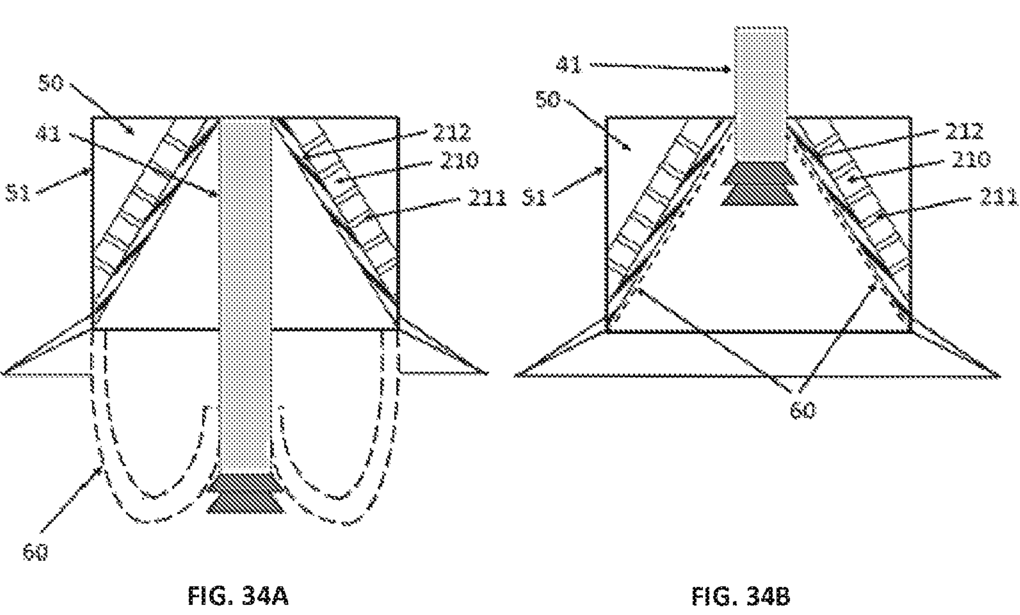
FIG. 34A
FIG. 34B

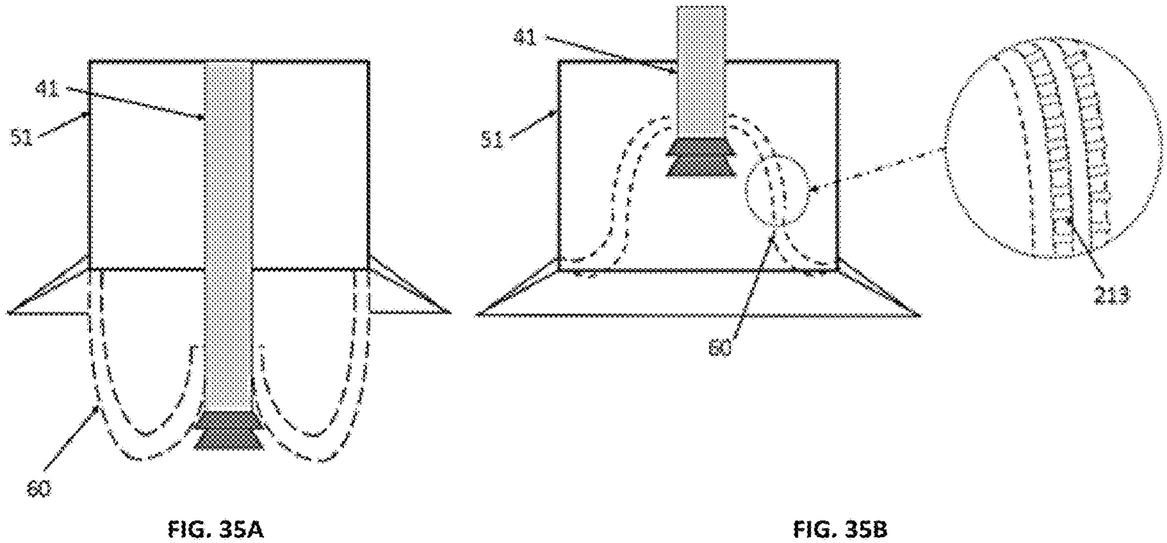
FIG. 35A
FIG. 35B
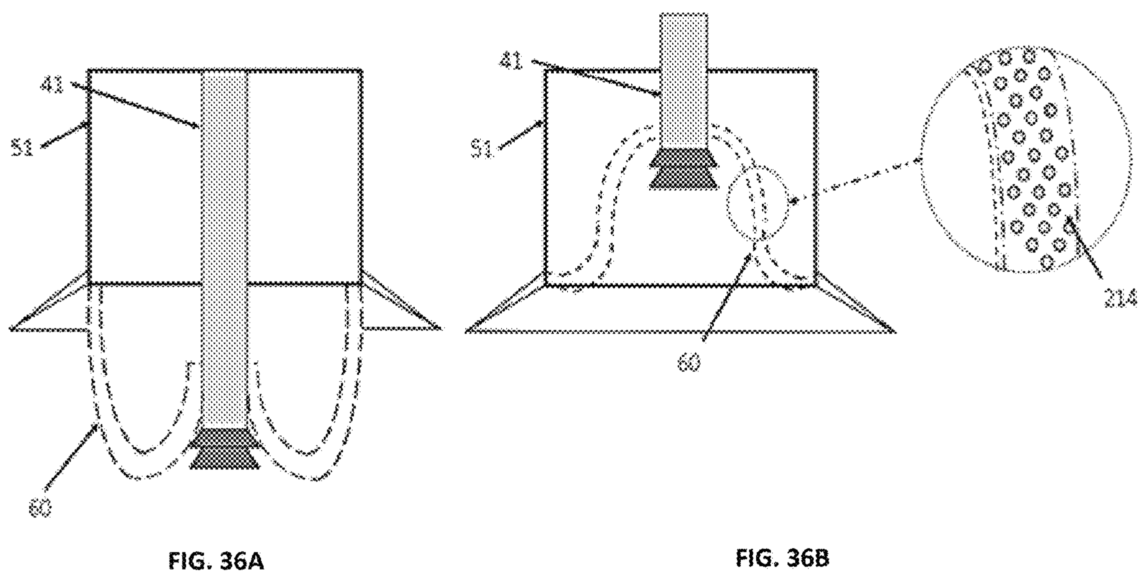
FIG. 36A
FIG. 36B

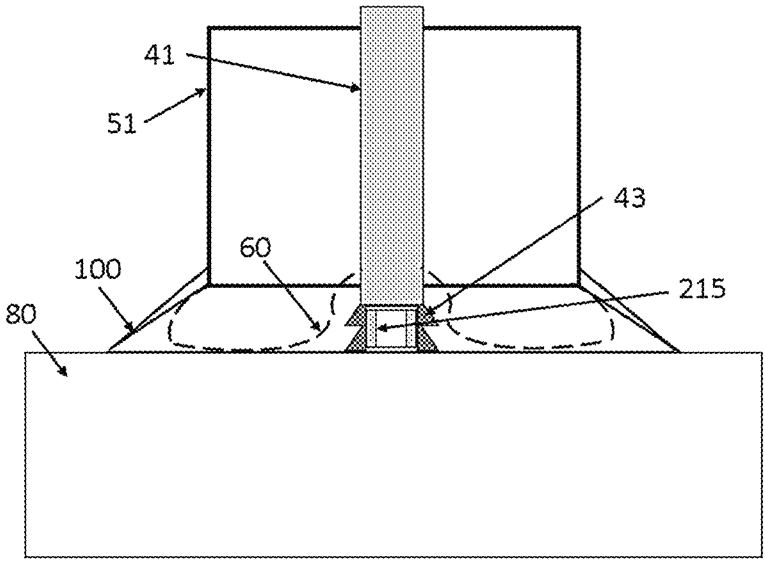
FIG. 37
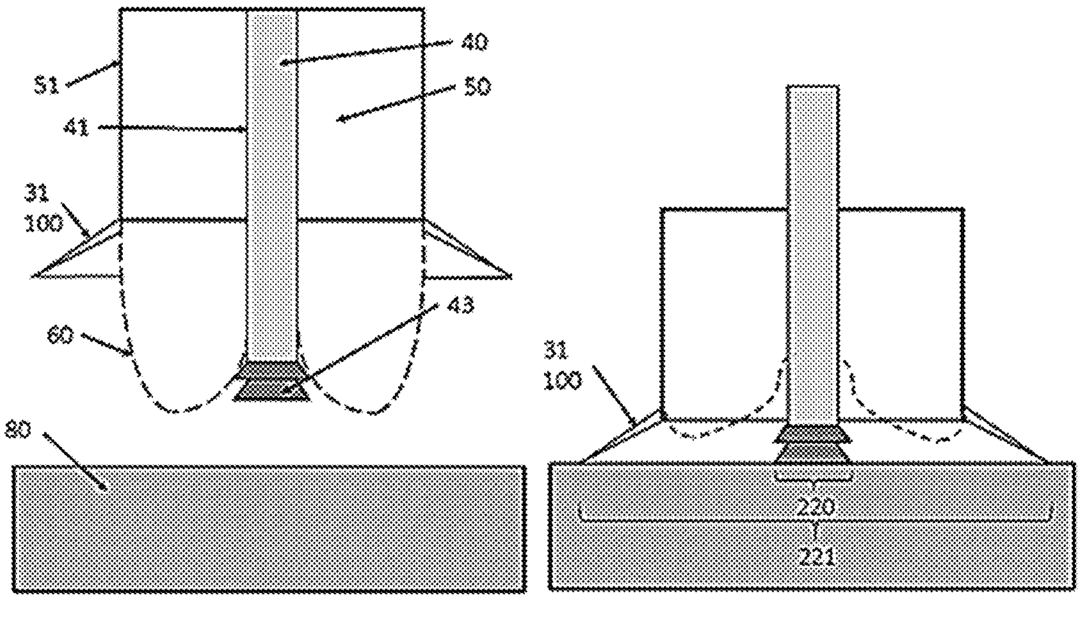
FIG. 38A
FIG. 38B

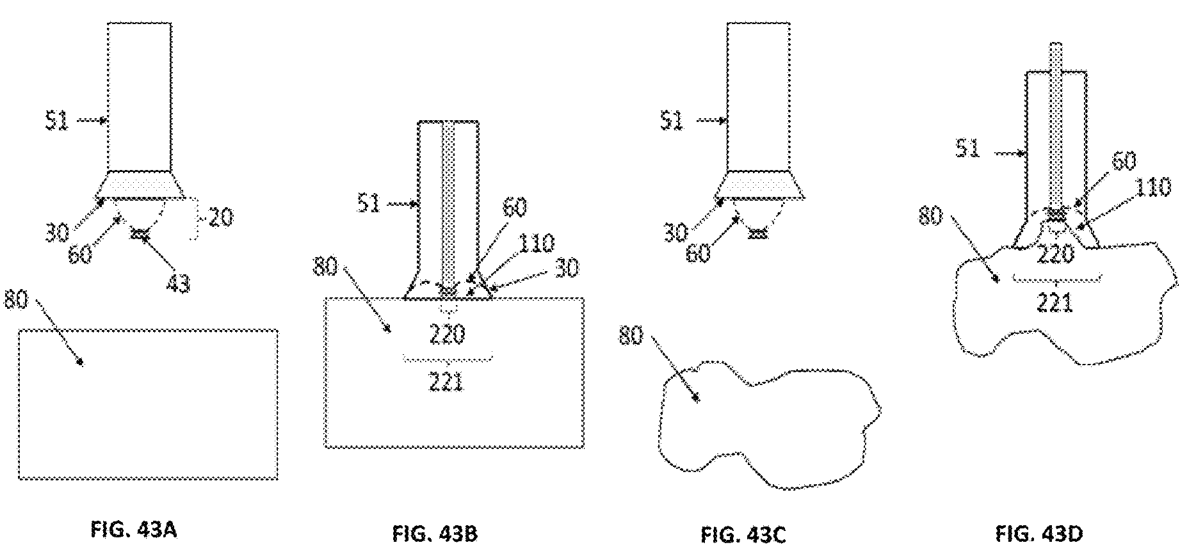
51
30
60
20
43
80
FIG. 43A
51
60
110
30
80
220
221
FIG. 43B
51
30
60
80
FIG. 43C
51
60
110
80
220
221
FIG. 43D
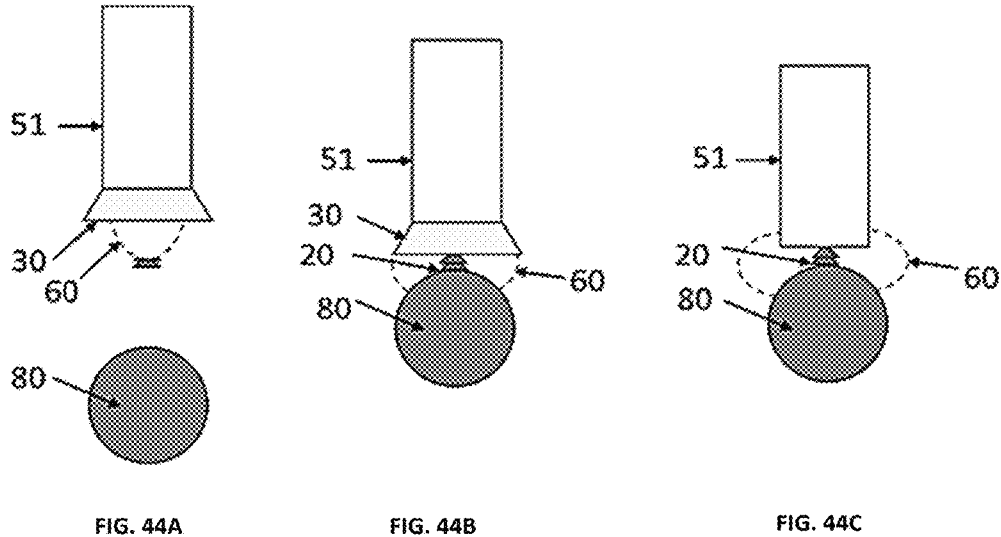
51
30
60
80
FIG. 44A
51
30
20
60
80
FIG. 44B
51
20
60
80
FIG. 44C

AUGMENTED SYSTEM AND METHOD FOR GRASPING OBJECTS

CROSS REFERENCE TO RELATED APPLICATIONS

This application is a continuation of international PCT Patent Application No. PCT/CA2023/051650, filed Dec. 12, 2023, which claims priority to and the benefit of U.S. Provisional Application Ser. No. 63/503,182, entitled "AUGMENTED SYSTEM AND METHOD FOR GRASPING OBJECTS", filed on May 19, 2023, U.S. Provisional Application Ser. No. 63/583,563, entitled "AUGMENTED SYSTEM AND METHOD FOR GRASPING OBJECTS", filed on Sep. 18, 2023 and U.S. Provisional Application Ser. No. 63/589,119, entitled "AUGMENTED SYSTEM AND METHOD FOR GRASPING OBJECTS", filed on Oct. 10, 2023, the disclosures of which are incorporated herein by reference in their entirety. This application is also a continuation- in-part of U.S. patent application Ser. No. 17/754,769, filed on Apr. 12, 2022, which is a National Phase application that claims priority to and the benefit of the international PCT Patent Application No. PCT/US2020/060308 entitled "METHOD AND APPARATUS FOR AN ADAPTABLE SUCTION DEVICE", filed on Nov. 12, 2020, which claims the benefit of U.S. Provisional Patent Application No. 62/933,647, filed on Nov. 11, 2019, and U.S. Provisional Patent Application No. 63/038,806, filed on Jun. 13, 2020, the disclosures of which are incorporated herein by reference in their entirety.

BACKGROUND

The embodiments described herein relate generally to a device configured to grasp, attract, and hold objects, and more particularly, to a method and apparatus for grasping a large variety of different objects in terms of both shapes and sizes.

The rise of automation across industries such as manufacturing, agriculture, e-commerce, and logistics brings about the ever-increasing need of robotic manipulators as well as grippers that will fit onto them. More specifically, the need to grip different kinds of objects with a single gripper arises in many fields.

While several solutions exist and adapted to grasp a large variety of objects within a small range of sizes, none are particularly effective and adapted to work for various types of objects within a large range of sizes. As such, there is a continued need for a device that can grasp a large variety of objects having a large range of sizes. The present invention satisfies these needs.

SUMMARY

A system and method to provide a suction device adapted to provide gripping and suction forces to pick up and move a wide variety of objects. This is accomplished through a primary grasping interface composed of a suction compartment, a membrane compartment, deformable membrane sealing said membrane compartment, and at least one pressure mechanism. At least one pressure mechanism is in fluid connection with the suction compartment and is configured to modify properties within the suction compartment to assist in providing gripping and attractive forces. The device will grasp an object with the primary grasping interface by positioning the deformable membrane adjacent to said object, modifying the deformable membrane to conform to and create a seal with said object, and then depressurizing the suction compartment vis the pressure mechanism, providing a suction force onto said object within that sealed area sufficient to grasp said object.

The present disclosure will provide a suction device adapted to provide gripping and suction forces to pick up and move a wide variety of objects in terms of both shapes and sizes. This is accomplished through a primary grasping device augmented by a secondary grasping device.

The primary grasping device can be a wide variety of grasping devices, including but not limited to a suction device, an electromagnetic device, or a finger type grasping device.

The secondary grasping device is provided by a secondary suction device that may have or may not have at least one actuator that allows the secondary suction device to move relative to the primary grasping device. The secondary grasping device can be configured to provide stabilization during motion or to enhance grasping capabilities by enabling objects to be grasped in ways that the primary grasping device or suction cups alone cannot.

The primary gripping interface can be configured for grasping with or without the secondary grasping device and may be configured with one or more actuation mechanisms.

The secondary gripping interface can be configured for grasping with or without the first grasping interface and may be configured with one or more actuation mechanisms.

BRIEF DESCRIPTION OF THE DRAWINGS

FIGS. 1A and 1B are line drawings that show the general embodiment of the augmented gripping device.

FIGS. 2A to 2D are line drawings that show the method of grasping an object with the augmented secondary grasping device only.

FIG. 7 is a line drawing showing an alternative gripping device using a torus membrane.

FIGS. 8A and 8B are line drawings that show one or more suction compartments in the primary grasping device.

FIGS. 9A to 9D are line drawings that show the grasping process of an augmented gripping device.

FIGS. 10A to 10G are line drawings that show various flexible flange designs.

FIGS. 11A and 11B are line drawings that show a flexible flange design with long cleats and one circular venting port all around.

FIGS. 12A and 12B are line drawings that show a flexible flange with 2 flanged venting ports.

FIGS. 17A and 17B are line drawings that illustrate how an additional device could change the shape of the flexible flange.

FIGS. 18A and 18B are line drawings that show the flexible flange can apply pinching force to an object for picking.

FIGS. 19A to 19C are line drawings that show a secondary suction interface facing inward in relaxed state.

FIGS. 20A and 20B are line drawings that show a secondary suction interface facing inward in relaxed state comprising small overlapping pieces.

FIGS. 21A and 21B are line drawings that show a secondary suction interface comprising a series of small suction cups.

FIGS. 22A to 22D are line drawings that show a secondary suction interface comprising a foam ring.

FIGS. 27A and 27B are line drawings that show a secondary suction interface comprising bellows.

FIG. 28 is a line drawing that shows the membrane compartment wall comprises a bellowed portion.

FIGS. 29A to 29C are line drawings that show a procedure for displacing the flexible membrane away from the object to be grasped.

FIGS. 30A to 30C are line drawings that show a procedure for displacing the flexible membrane away from the object to be grasped.

FIGS. 31A and 31B are line drawings that show fluid communication between flange compartment and membrane compartment.

FIGS. 32A and 32B are line drawings that show membrane compartment, suction compartment and flange compartment pressure control.

FIGS. 33A and 33B show a membrane compartment filled with a granular material.

FIGS. 34A and 34B show a conical backing structure for the deformable membrane.

FIGS. 35A and 35B are line drawings that show a deformable membrane that can be stiffened up.

FIGS. 36A and 36B are line drawings that show a deformable membrane that can be stiffened up.

FIG. 37 is a line drawing that shows a rigid ring preventing the suction cup from being crushed closed.

FIGS. 38A and 38B are line drawings that illustrate the inner, circular, sealing region and the outer, annular, sealing region.

FIGS. 43A to 43D are line drawings that illustrate how the relative positions of the primary grasping device and secondary grasping device can be modified to match the contours of the object being grasped.

FIGS. 44A to 44C are line drawings that illustrate how the secondary suction device can direct the inflation of the membrane.

DETAILED DESCRIPTION

Generalized Configuration

Figures 3A, 3B, 4A, 4B, 4C, 4D:
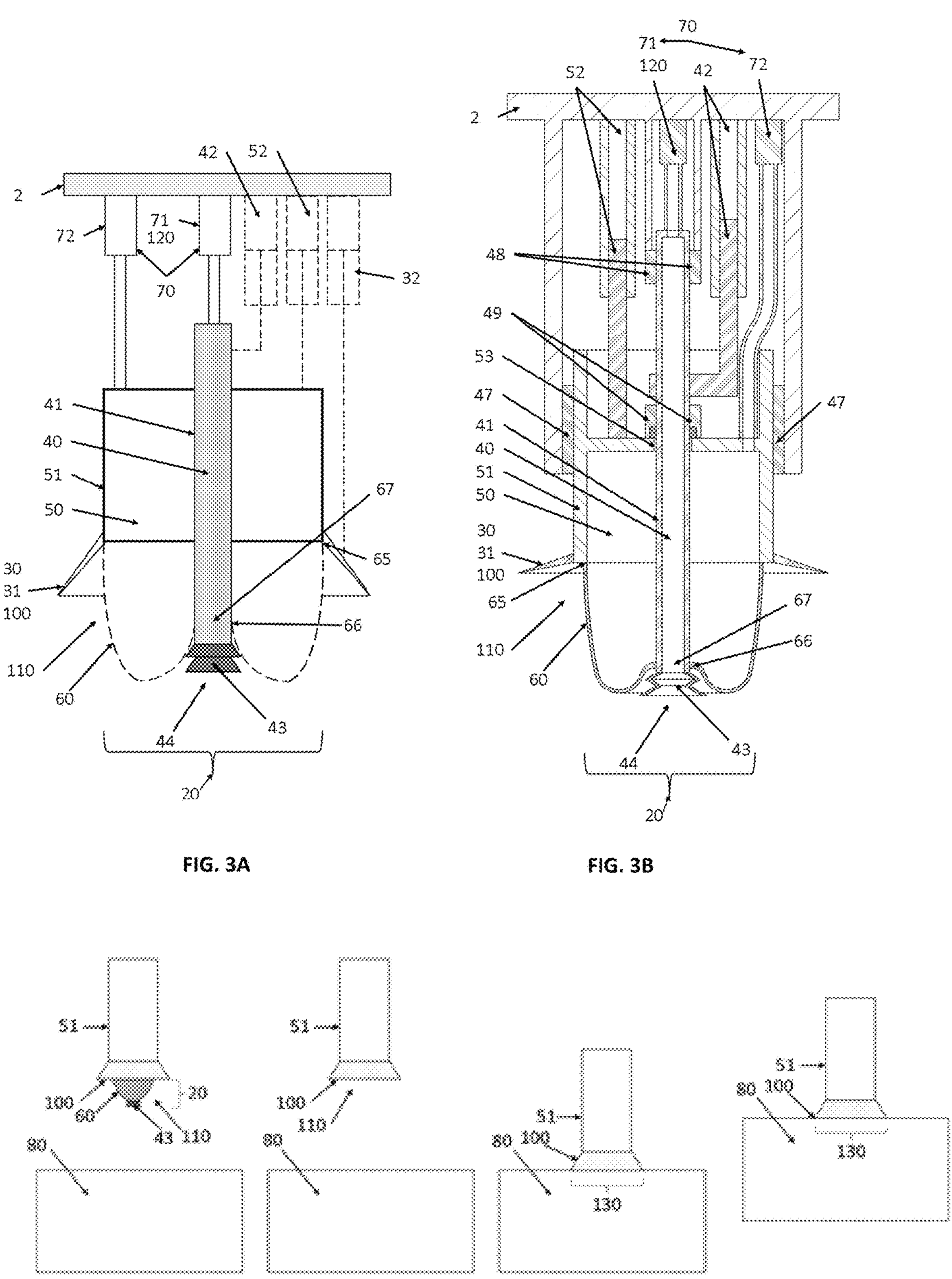
FIGS. 3A and 3B are line drawings that shows a preferred embodiment of a grasping device.
FIGS. 4A to 4D are line drawings that show the method of grasping an object with the augmented secondary grasping device on the preferred embodiment only.

FIGS. 1A and 1B are line drawings that show the general embodiment of the augmented gripping device. According to FIGS. 1A and 1B, the augmented gripping device [10] comprises one primary grasping device [20 ] and one secondary grasping device [30] augmenting the primary grasping device [20] and adapted to provide gripping and suction forces to pick up and move a wide variety of objects.

Said primary grasping device [20] can be one of a wide variety of grasping devices, including a suction grasping device, an electromagnetic grasping device, a finger type grasping device, and other grasping devices utilizing effects including suction, pressure, electromagnetic force, electrostatic force, magnetic force, friction, mechanical interlocking, van der Waal forces, etc. for grasping objects.

According to FIGS. 1A, 1B, 3A and 3B, said secondary grasping device [30] is created by the addition of a secondary suction interface [31] to the outside of and surrounding the primary grasping device [20]. In the following, the region in space between the secondary suction interface [31] and the object to be grasped [80], or the region of space adjacent to the secondary suction interface [31] and in the direction towards which the secondary suction interface [31] would approach the object to be grasped [80], is referred to as the flange compartment [110]. At least one second pressure mechanism [120], which can provide positive pressure or negative pressure or both, is in fluid connection with the flange compartment [110] adapted to regulate the pressure in the flange compartment [110]. The secondary pressure mechanism [120] can be independent from the primary grasping device [20]. The secondary pressure mechanism [120] can also be a pressure mechanism [70] or one or more of the pressure mechanisms [70] in the primary grasping device [20] that also serve the function as the secondary pressure mechanism [120].

Different Categories of Methods for Grasping

There exist different methods for grasping an object using the augmented gripping device in the preferred embodiment, and can be categorized in to three categories:

Category 1 Method: those that only use the primary grasping device [20] to grasp;

Category 2 Method: those only use the secondary grasping device [30] to grasp; and Category 3 Method: those that use both the primary grasping device [20] and the secondary grasping device [30] to grasp.

Method for Grasping Using the Augmenting Secondary Grasping Device Only

A Category 2 Method for the augmented gripping device [10] in the general embodiment to grasp an object [80] is shown in FIGS. 2A to 2D. FIGS. 2A to 2D are line drawings that show the method of grasping an object with the augmented secondary grasping device only. FIG. 2A shows the initial state of the augmented gripping device [10]. In step one as shown in FIG. 2B, if necessary, displace some parts or the whole of the primary grasping device [20] relative to the secondary grasping device [30] or vice versa such that the secondary grasping device [30] becomes the part of the augmented gripping device [10] that is the closest to the object to be grasped [80]; then in step two as shown in FIG. 2C, position said secondary grasping device [30] adjacent to said object to be grasped [80], thus modifying the said secondary grasping device [30] to conform to and create a seal with said object [80], and then depressurizing the flange compartment [110] via the secondary pressure mechanism [120], providing a suction force onto said object [80] within a sealed area [130] sufficient to grasp said object [80]. In the final step as shown in FIG. 2D, the object [80] is lifted by the augmented gripping device [10].

Membrane Gripper Augmented by a Flexible Flange Added to its Rim

FIGS. 3A and 3B are line drawings that show a preferred embodiment of a grasping device. FIGS. 3A and 3B show a more detailed implementation of the general embodiment in FIGS. 1A and 1B. According to FIGS. 3A and 3B, the primary grasping device [20] comprises a suction compartment wall [41], a membrane compartment wall [51], a deformable membrane [60] that has an outer edge [65] and a hole [67] surrounded by an inner edge [66], with its outer edge [65] attached to the rim of the membrane compartment wall [51] and with its inner edge [66] attached to the suction compartment wall [41], and at least one pressure mechanism [70] which can regulate pressure to be positive, negative, or both. There can be none, one, or more membrane compartment wall actuators [52] adapted to displace the membrane compartment wall [51] relative to the housing or structural frame [2] of the primary grasping device [20]. There can be none, one, or more suction compartment wall actuators [42] adapted to displace the suction compartment wall [41] relative to the structural frame [2] of the primary grasping device [20].

According to FIG. 3B, there can be one or more guiding elements [47] for facilitating the movement of the membrane compartment wall [51] relative to the structural frame [2]. There can be one or more guiding elements [48] for facilitating the movement of the suction compartment wall [41] relative to the structural frame [2]. There can be one or more guiding elements [49] for facilitating the movement of the suction compartment wall [41] relative to the membrane compartment wall [51]. The guiding elements [47], [48], and [49] can take at least the follow form: rolling bearing, sliding bearing, bushing, seal, hydrostatic bearing, air bearing, magnetic bearing, superconductive levitation bearing, acoustic levitation bearing, or electrostatic bearing.

As can be seen in FIGS. 3A and 3B, the suction compartment wall [41] goes through a hole [53] in the membrane compartment wall [53]. A sealing element [46] seals the gap between in the membrane compartment wall [51] and the suction compartment wall [41] such that the membrane compartment [50] is not in fluid communication with the environment [1] through said gap. The guiding elements [49] and the sealing element [46] can be combined as one component, or they can be separated and independent of each other.

There can be none or one primary suction interface [43], for example a suction cup, attached to the suction compartment wall [41].

These components are so configured that the suction compartment wall [41], the deformable membrane [60] and the membrane compartment wall [51] delimit a region in space referred to as the membrane compartment [50].

When the primary grasping device [20] is not grasping an object [80], the suction compartment wall [41] delimits a region in space referred to as the suction assembly, or the suction compartment [40]. It has an opening [44] to the environment [1]. When the primary grasping device [20] is grasping an object [80], the suction compartment wall [41], the deformable membrane [60] and the object being grasped [80] delimit a region in space referred to as the suction compartment [40] and there is no more opening [44] to the environment [1].

One of said pressure mechanisms [70] is referred to as the suction compartment pressure mechanism [71], and it is in fluid connection with the suction compartment [40], and it is configured to modify properties within the suction compartment [40] to assist in providing gripping and attractive forces, for example the pressure within the suction compartment [40], which can be regulated to a negative pressure or a positive pressure or both.

Another of said pressure mechanisms [70], if exists, is referred to as the membrane compartment pressure mechanism [72] and it is in fluid connection with the membrane compartment [50] and is configured to modify properties within the membrane compartment [50] to assist in providing gripping and attractive forces, for example the pressure within the membrane compartment [50], which can be regulated to a negative pressure or a positive pressure or both.

Said suction compartment pressure mechanism [71] and membrane compartment pressure mechanism [72] can referred to a same single pressure mechanism [70], or can be two independent pressure mechanisms, or can be two interrelated pressure mechanisms for example the pressure mechanisms [71] and [72] is in fluid connection with each other in a controlled or uncontrolled manner.

The secondary grasping device [30] comprises a secondary suction interface [31] added to the outside of and surrounding said primary grasping device [20], specifically, to the rim of the membrane compartment wall [51]. And the secondary suction interface [31] is in the form of a sealing element, for example in the form of one flexible flange [100] forming one large suction cup surrounding the primary grasping device [20]. There can be none, one, or more secondary pressure mechanism [120] for modifying properties within the flange compartment [110]. In this embodiment the suction compartment pressure mechanism [71] of the primary grasping device [20] is doubled as the secondary pressure mechanism [120] of the secondary grasping device [30] for modifying properties within the flange compartment [110]. There can be none, one, or more secondary suction interface actuators [32] adapted to displace the secondary suction interface [31] relative to the primary grasping device [20].

Method for Grasping Using the Augmenting Secondary Grasping Device Only

A Category 2 Method for the augmented gripping device [10] in the preferred embodiment as shown in FIGS. 3A and 3B to grasp an object [80] is shown in FIGS. 4A to 4D. FIGS. 4A to 4D are line drawings that show the method of grasping an object with the augmented secondary grasping device on the preferred embodiment only. FIG. 4A shows the grasping device approaches the object. FIG. B shows the primary suction interface is pulled back exposing the secondary grasping interface. FIG. C shows the secondary grasping interface contacts the object, and a vacuum seal is established with the object. FIG. D shows the grasping device lifts and moves the object.

FIG. 4A shows the initial state of the augmented gripping device [10]. In step one, the suction compartment wall [41] is displaced away from the object to be grasped [80] by the suction compartment actuator [42]. The membrane compartment wall [51] together with the secondary suction interface [31] attached to its rim are displaced towards the object to be grasped [80] using a membrane compartment wall actuator [52]. In step three, the membrane compartment pressure mechanism [72] is activated to depressurize the membrane compartment [50], such that the deformable membrane is sucked into the membrane compartment [50].

As a result, as shown in FIG. 4B, the secondary grasping device [30] in the form of a flexible flange [100] becomes the part of the augmented gripping device [10] that is the closest to the object to be grasped [80]. In step four the secondary pressure mechanism [120] which is also the suction compartment pressure mechanisms [71] of the primary grasping device [20] is activated to attempt to depressurize the suction compartment [40] and the flange compartment [110]. Notice that the suction compartment [40] and the flange compartment [110] is the same in this case. But because both the suction compartment and the flange compartment are opened to the environment [1] at this point, their pressure is not much lower than the ambient pressure in the environment [1].

In step five as shown in FIG. 4C, position said secondary grasping device [30] adjacent to said object to be grasped [80], which is done by displacing the whole augmented gripping device [10] towards the object to be grasped [80], thus allowing the said secondary grasping device [30] to contact, conform to and create a seal with said object to be grasped [80]. After the seal is formed, due to the action of the activated secondary pressure mechanism [120] which is also the suction compartment pressure mechanisms [71] of the primary grasping device [20], the flange compartment [110] or the suction compartment [40] is depressurized, providing a suction force onto said object [80] within a sealed area [130] sufficient to grasp said object [80]. In the final step as shown in FIG. 4D, the object [80] is lifted by the augmented gripping device [10].

Torus Membrane Gripper

Figure 5:
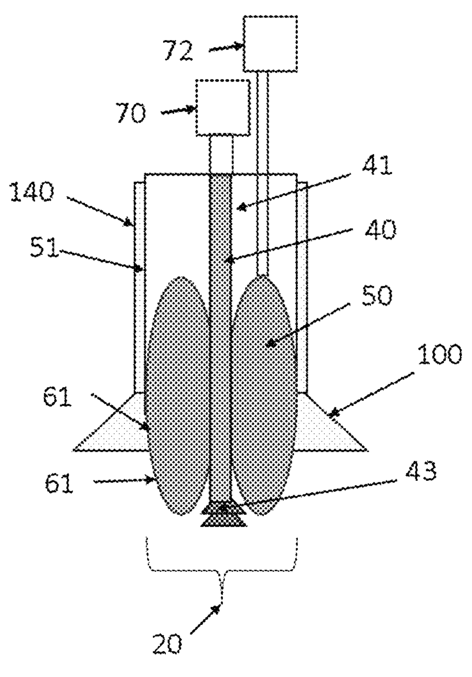
FIG. 5 is a line drawing showing a gripping device utilizing a toroidal membrane.

Another embodiment is shown in FIG. 5, which is one of a more detailed implementations of the general embodiment in FIG. 1. FIG. 5 is a line drawing showing a gripping device utilizing a toroidal membrane. According to FIG. 5, a torus membrane attached to both membrane compartment wall and suction compartment wall is shown whereby it is augmented by a secondary grasping device attached to an independent sleeve.

According to FIG. 5, the primary grasping device [20] comprises a suction compartment wall [41], a membrane compartment wall [51], a deformable membrane [51] and may or may not be attached to the suction compartment wall [41], and at least one pressure mechanism [70]. The membrane can have or assume different shapes. The membrane can have a compact surface-a surface without boundary. For instance, the membrane can have a torus shape or the membrane can be described as having a toroidal surface, which is defined in mathematics as genus 1. The membrane can be a closed surface with two holes, defined in mathematics as genus 2. Generally, the membrane can have g number of holes, that is it can be of genus g. The membrane can also have no holes, that is, a surface of genus 0. Alternatively, the membrane can be a non-closed or open surface. Another of said pressure mechanisms, if it exists, is referred to as the membrane compartment pressure mechanism [72] and it is in fluid connection with the membrane compartment [50] and is configured to modify properties within the membrane compartment [50]. There can be none, one, or more membrane compartment wall actuators [52] adapted to displace the membrane compartment wall [51] relative to the structural frame [2] of the primary grasping device [20].

There can be none, one, or more suction compartment wall actuators [42] adapted to displace the suction compartment wall [41] relative to the structural frame [2] of the primary grasping device [20]. There can be none or one structure, for example a primary suction interface [43], attached to the tip of the suction compartment wall [41]. The secondary grasping device [30] is added to the outside of and surrounding said primary grasping device [20]. Specifically, the secondary grasping device [30] comprises a secondary suction interface [31] attached to the end of a sleeve [140] that surrounds the primary gripping device [20], none or one or more secondary pressure mechanisms [120] for modifying properties within the flange compartment [110], and none or one or more flange actuators adapted to displace the sleeve [140] along with the secondary suction interface [31] attached relative to the structural frame [2] of the primary grasping device [20].

Alternative Torus Membrane Gripper 1

Figure 6:
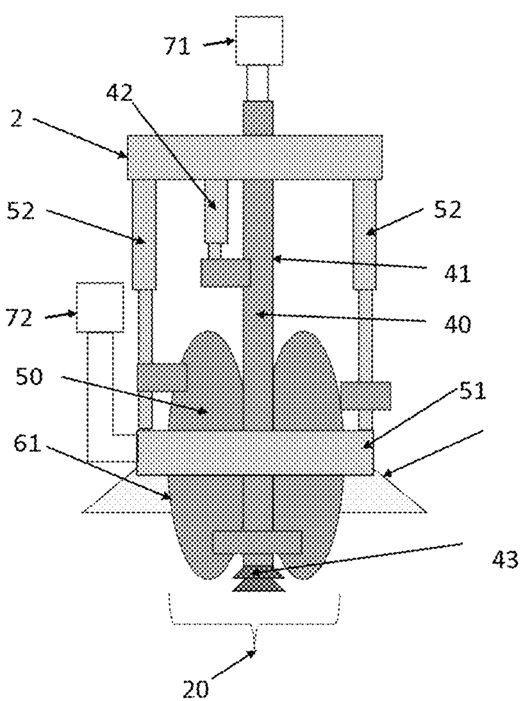
FIG. 6 is a line drawing showing a gripping device utilizing a toroidal membrane, in which the torus membrane is attached to both membrane compartment wall and suction compartment wall.

Another embodiment is shown in FIG. 6, which is one of a more detailed implementations of the general embodiment in FIG. 1. FIG. 6 is a line drawing showing a gripping device utilizing a toroidal membrane, in which the torus membrane is attached to both membrane compartment wall and suction compartment wall. The torus membrane attached to both membrane compartment wall and suction compartment wall—augmented by a secondary grasping device attached to the membrane compartment wall In this embodiment, the primary grasping device [20] comprises a suction compartment wall [41], a membrane compartment wall or a actuation component [51], at least two pressure mechanism [71] and [72], and a deformable membrane having genus 0, 1, 2 or g, torus, toroidal surface, surface with boundary, open surface, compact surface, non-compact surface, or surface with at least one hole [61] that is attached to the membrane compartment wall or the actuation component [51] and it is also attached to the suction compartment wall [41]. Said at least one pressure mechanism [72] is preferably disposed about an outer surface said deformable membrane [61], or they can take up other positions. There can be none, one, or more membrane compartment wall actuators [52] adapted to displace the membrane compartment wall or the actuation component [51] relative to the structural frame [2] of the primary grasping device [20]. There can be none, one, or more suction compartment wall actuators [42] adapted to displace the suction compartment wall [41] relative to the structural frame [2] of the primary grasping device [20]. At least one of such actuators [42] and [52] is configured to actuate such deformable membrane [62] at least linearly, at least transversely, at least radially, at least rotationally, at least spirally, or at least normally. There can be none or one structure, for example a primary suction interface [43], attached to the tip of the suction compartment wall [41]. There is at least one suction compartment pressure mechanism [71] for regulating the pressure inside the suction compartment. There is at least one membrane compartment pressure mechanism [72] for regulating the pressure inside said deformable membrane [61], and it is in fluid communication with the cavity inside the deformable membrane [61] through the membrane compartment wall or the actuation component [51]. The secondary grasping device [30] comprises a secondary suction interface [31] in the form of one flexible flange [100] added to the outside of and surrounding said primary grasping device [20], specifically, to the rim of the membrane compartment wall or the actuation component [51], and a secondary pressure mechanism [120] adapted for modifying properties within the flange compartment [110].

Alternative Torus Membrane Gripper 2

Another embodiment is shown in FIG. 7, which is one of a more detailed implementations of the general embodiment in FIG. 1. FIG. 7 is a line drawing showing an alternative gripping device using a torus membrane. According to FIG. 7, a torus membrane is shown attached to membrane compartment wall only, augmented by a secondary grasping device attached to an independent sleeve.

According to FIG. 7, the primary grasping device [20] comprises a suction compartment wall [41], a membrane compartment wall [51], at least two pressure mechanism [71] and [72], and a deformable membrane having genus 0, 1, 2 or g, torus, toroidal surface, surface with boundary, open surface, compact surface, non-compact surface, or surface with at least one hole [61] that is only attached to the membrane compartment wall [51. There can be none, one, or more membrane compartment wall actuators [52] adapted to displace the membrane compartment wall [51] relative to the structural frame [2] of the primary grasping device [20]. There can be none, one, or more suction compartment wall actuators [42] adapted to displace the suction compartment wall [41] relative to the structural frame [2] of the primary grasping device [20]. At least one of such actuators [42] and [52] is configured to actuate such deformable membrane [61] at least linearly, at least transversely, at least radially, at least rotationally, at least spirally, or at least normally. There can be none or one structure, for example a primary suction interface [43], attached to the tip of the suction compartment wall [41]. There is at least one suction compartment pressure mechanism [71] for regulating the pressure inside the suction compartment.

There is at least one membrane compartment pressure mechanism [72] for regulating the pressure inside said deformable membrane [61], and it is in fluid communication with the cavity inside the deformable membrane [61] through the membrane compartment wall or the actuation component [51]. Said at least one pressure mechanism [72] is preferably disposed about an outer surface said deformable membrane [61], or can take up other positions. The secondary grasping device [30] is added to the outside of and surrounding said primary grasping device [20]. Specifically, the secondary grasping device [30] comprises a secondary suction interface [31] attached to the end of a sleeve [140] that surrounds the primary gripping device [20], none or one or more secondary pressure mechanisms [120] for modifying properties within the flange compartment [110], and none or one or more flange actuators [141] adapted to displace the sleeve [140] along with the secondary suction interface [31] attached, or only the secondary suction interface [31] relative to the structural frame [2] of the primary grasping device [20].

One or More Suction Cup Gripper Augmented By a Secondary Grasping Device

According to the disclosure, one or more suction cup gripper augmented by a secondary grasping device is shown in FIGS. 8 and 9. Another embodiment is shown in FIG. 8, which is one of a more detailed implementations of the general embodiment in FIG. 1. FIGS. 8A and 8B are line drawings that show one or more suction compartments in the primary grasping device. FIG. 8A shows a position controlled secondary grasping device and FIG. B shows a fixed secondary grasping device. FIGS. 9A to 9D are line drawings that show the grasping process of an augmented gripping device. FIG. 9A shows the initial state. FIG. 9B shows grasping the object using the secondary grasping device only. FIG. 9C shows grasping the object using multiple suction compartments and FIG. 9D shows grasping the object using one suction compartment.

According to FIGS. 8A and 8B, the primary grasping device [20] comprises one or more suction compartment walls [41] that may or may not be actuated by none, one, or more actuators [42], at least one pressure mechanism [70] in fluid connection with the suction compartments [40] delimited by the suction compartment walls [41], and is configured to modify the pressure in the suction compartments to assist in providing gripping and attractive forces to the object to be grasped [80].

The secondary grasping device [30] is added to the outside of and surrounding said primary grasping device [20]. Specifically, the secondary grasping device [30] comprises a secondary suction interface [31] attached to the end of a sleeve [140] that surrounds the primary gripping device [20], a secondary pressure mechanism [120] for modifying properties within the flange compartment [110], and none, as in FIG. 8A, or one, as in FIG. 8B, flange actuators [141] adapted to displace the sleeve [140] along with the secondary suction interface [31] attached relative to the structural frame [2] of the primary grasping device [20].

The augmented gripping device [10] in this embodiment can have different grasping modes. Specifically, in FIG. 9B, only the secondary grasping device [30] is used for grasping the object [80]; in FIG. 9C, all suction compartments [40] of the primary grasping device [20] is used for grasping the object [80]; and in FIG. 9D, only one suction compartment [40] of the primary grasping device [20] is used for grasping the object [80].

Lip Construction

In the preferred embodiment shown in FIG. 3, the secondary suction interface [31] is in the form of one flexible flange [100] forming one large suction cup surrounding the primary grasping device [20]. Such a flexible flange [100] can have different designs as shown in the following embodiments and in FIG. 10 to FIG. 14. FIGS. 10A to 10G are line drawings that show various flexible flange designs. FIG. 10A shows a plain circular flange. FIG. 10B shows a circular flange with long cleats. FIG. 10C. shows a circular flange with short cleats. FIG. 10D. shows a flange with wavy edge and long cleats. FIG. 10E shows a circular with two venting ports. FIG. 10F shows a circular with a flanged venting port and FIG. 10G shows a circular with two smaller flanged venting ports.

In one embodiment shown in FIG. 10A the flexible flange [100] is of a plain circular design. In one embodiment shown in FIG. 10B, long cleats [101] are added to the flexible flange [100]. The long cleats [101] prevent the part of the flexible flange [100] that is further away from the edge from collapsing onto the object to be grasped [80] when the flange compartment [110] is depressurized, effectively increasing the seal area [130] therefore improving the suction force that can be generated. With the increased seal area [130], this embodiment is highly suited for grasping heavy objects [80].

In another embodiment shown in FIG. 10C, short cleats [102] such as the triangular cleats and square cleats shown are added to the flexible flange [100]. Like the long cleats [101] in FIG. 10B, the short cleats [102] can prevent the part of the flexible flange [100] that is further away from the edge from collapsing onto the object to be grasped [80] when the flange compartment [110] is depressurized, effectively increasing the seal area [130] to improve the suction force can be achieved. But since the short cleats [102] are shorter compared with the long cleats [101], the seal area [130] increment that can be achieved in this embodiment is smaller than that can be achieved in FIG. 10B using the long cleats [101].

In yet another embodiment shown in FIG. 10D, long cleats [101] are added to the flexible flange [100]. The long cleats [101] prevent the part of the flexible flange [100] that is further away from the edge from collapsing onto the object to be grasped [80] when the flange compartment [110] is depressurized, effectively increasing the seal area [130] to improve the suction force can be achieved. But the long cleats [101] also increase the rigidity of the flexible flange [100]. At the same time, the shape of the flexible flange [100] is modified to have a wavy edge [106], thus reducing its rigidity.

Flexible Flange with Vents

In the grasping method represented by FIG. 2, it was mentioned that the flange compartment [110] is depressurized to generate a suction force on the object to be grasped [80] within a sealed area [130] sufficient to grasp said object [80]. There are multiple ways to accomplish this, some of which are described in the following embodiments.

First Generation Rim Cup Without Vents Around It

In one embodiment, the flexible flange takes the form those shown in FIGS. 10A to 10D wherein vacuum only passing through the shaft. In these embodiments, the flange compartment [110] is vented through the suction compartment [40]. So that the suction compartment pressure mechanism [71] of the primary grasping device [20] can double as the secondary pressure mechanism [120] of the secondary grasping device [30] for modifying properties within the flange compartment [110]. Alternatively, one or more separate secondary pressure mechanisms [120] can be used independently or in combination with the suction compartment pressure mechanism [71] for modifying properties within the flange compartment [110], but still doing so through the suction compartment [40].

Rim Cup With One Vent

Another embodiment is shown in FIGS. 11A and 11B wherein a rim cup is shown with one vent. FIGS. 11A and 11B are line drawings that show a flexible flange design with long cleats and one circular venting port all around. FIG. 11A is an illustration of the flexible flange attached to the gripping device. FIG. 11B is a flexible flange as viewed from the underside. According to FIGS. 11A and 11B, the secondary suction interface [31] comprises one ring-shaped venting port [160] surrounding the whole primary grasping device [20].

Another embodiment is shown in FIG. 10F. In this embodiment, the secondary suction interface [31] comprises one venting port [160] that covers only a section or a point on the circle surrounding the primary grasping device [20]. The venting port [160] establishes fluid connection between the flange compartment [110] and the secondary pressure mechanisms [120], providing an alternative route for the air or fluid to go in or out of the flange compartment [110] other than the suction compartment [40]. The venting port [160] may be not flanged, or may be flanged as in FIG. 10F, effectively creating a smaller suction cup with their own smaller suction areas [131] that are nested inside the large suction cup formed by the flexible flange [100], that is the large suction cup formed by the flexible flange [100] is compartmentalized into different regions.

Yet another embodiment is shown in FIG. 10E, FIG. 10G and FIG. 12 with a rim cup with more than one vents around it (i.e., up to 22 suction control for the multiple vents). FIGS. 12A and 12B are line drawings that show a flexible flange with 2 flanged venting ports. FIG. 12A shows the underside and FIG. 12B shows when attached to the gripping device.

According to these embodiments (FIG. 10E, FIG. 10G and FIG. 12), the secondary suction interface [31] comprises more than one venting ports [160] around the primary grasping device [20]. Such venting ports [160] could be controlled, i.e. opening, closing, partially opening, actively or passively, individually or as a group. The venting port [160] may be not flanged as shown in FIG. 10E. The venting ports [160] may also be flanged as in FIG. 10G and FIG. 12.

The flanges effectively create a number of smaller suction cups with their own smaller suction areas [131] that are nested inside the large suction cup formed by the flexible flange [100]. When such flanged venting ports [160] are controlled individually, by means of passive or actively controlled and selective valves, vacuum flow can be sent to each of the sub suction areas [131] as well as the larger suction area [130] to allow items that are narrower than the area formed by the flexible flange [100 ] to be grasped and moved. Such venting ports [160] may also have bellows added to them to better adapt to the surface of the object to be grasped [80].

Figures 13A, 13B, 13C:
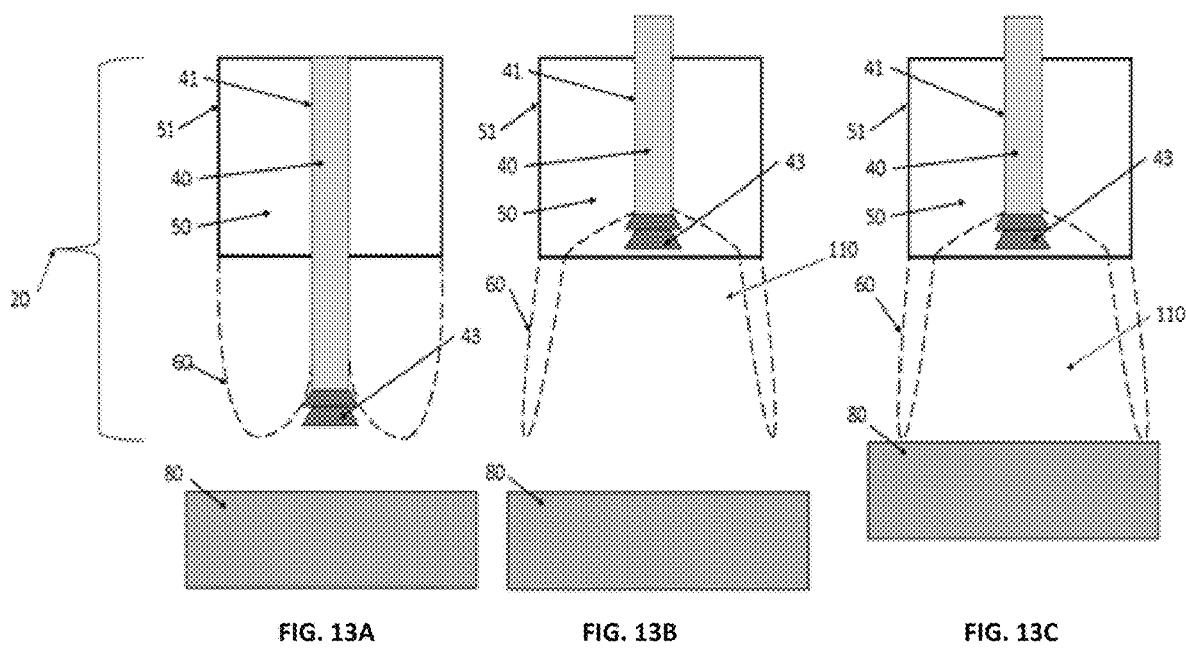
FIGS. 13A to 13C are line drawings that show the deformable membrane as the flexible flange.

Yet another embodiment is shown in FIG. 13, which is derived from the preferred embodiment shown in FIG. 3. FIGS. 13A to 13C are line drawings that show the deformable membrane as the flexible flange. According to FIGS. 13A to 13C, the deformable membrane [60] of the primary grasping device [20] can also serve as the flexible flange [100] of the secondary grasping device [30] with the configuration steps that are shown in FIG. 13. Specifically, FIG. 13A shows the initial state of the augmented gripping device [10].

In FIG. 13B, the suction compartment wall [41] is retracted back relative to the membrane compartment wall [51], bring the inner edge of the deformable membrane [60] with it. The membrane compartment [50] is pressurized. This can be due to the reduction in volume in the membrane compartment [50] and/or the effect of the membrane compartment pressure mechanism [72]. Finally, membrane compartment [50] is depressurized, so that the deformable membrane [60] folds tightly onto itself, forming a lip-shaped structure, which can serve as the flexible flange [100] of the secondary grasping device [30] as shown in FIG. 13C.

Figure 14:
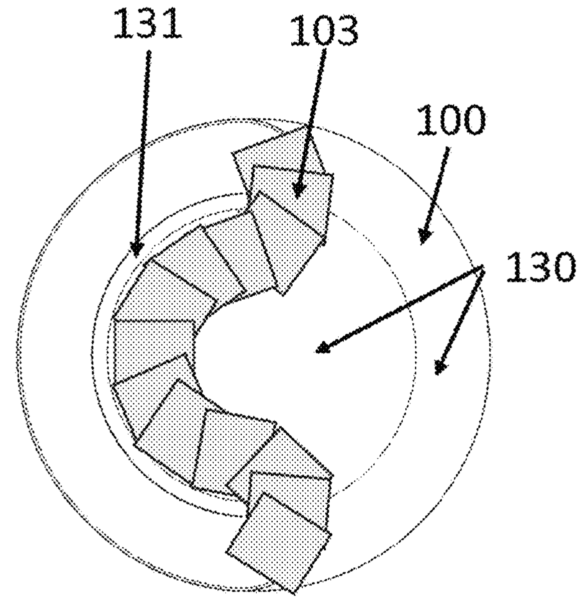
FIG. 14 is a line drawing that shows a flexible flange comprising small overlapping pieces.

Yet another embodiment is shown in FIG. 14, which is derived from the embodiment shown in FIG. 10F. FIG. 14 is a line drawing that shows a flexible flange comprising small overlapping pieces. According to FIG. 14, the flexible flange [100] is compartmentalized into multiple regions, formed as one or more small suction areas [131] within a larger suction area [130] where each small suction area [131] could be controlled individually or as a group. Compartmentalization is done in a way that the boundary or boundaries that delimit the small suction areas [131] are made of small overlapping pieces [103] that are not attached to each other.

if used in combination with the primary grasping device [20] in the preferred embodiment as shown in FIG. 3, when the deformable membrane [60] inflates due to a pressure increment in the membrane compartment [50], the small overlapping pieces [103] do not interfere with the deformable membrane [60] and just separate from each other and flip open. But when the small suction areas [131] in the flexible flange [100] is used for grasping an object [80], the small overlapping pieces [103] overlap each other and the decompression in the small suction areas [131] seal the small overlapping pieces [103] together, creating the airtight lips that delimit the small suction areas [131].

Figure 15:
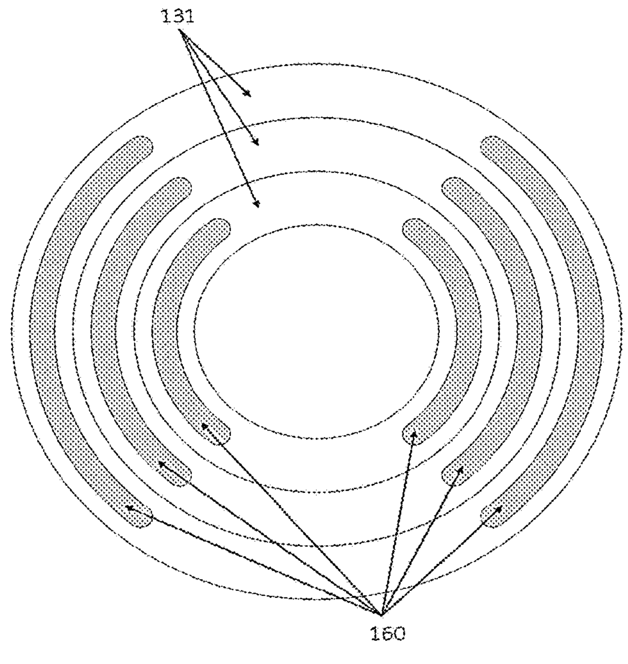
FIG. 15 is a line drawing that shows a flexible flange compartmentalized radially.

Yet another embodiment is shown in FIG. 15. FIG. 15 is a line drawing that shows a flexible flange compartmentalized radially. According to FIG. 15, the flexible flange [100] is radially compartmentalized into multiple concentric annular sub suction areas [131]. One or more venting points [160] can be created for each concentric annular sub suction area [131]. Such venting ports [160] could be controlled, i.e. opening, closing, partially opening, actively or passively, individually or as a group. By controlling the venting ports [160], one or more concentric annular sub suction areas [131] can be depressurized. This allows flexible flange [100] to have different effective diameters to apply different suction forces to different objects [80] depending on their size. Smaller or inner concentric annular sub suction areas [131] allow lifting smaller items and even larger items that do not require the lifting force of the bigger or outer concentric annular sub suction areas [131].

Movable Lip

It should be noted that the secondary suction interface [31] or the flexible flange [100] that that comprises it do not necessarily have a fixed shape. Besides by conforming to an object to be grasped [80], there are other ways to change the shape of the secondary suction interface [31], which can help better grasp a large variety of objects [80].

Deformable Membrane for Chaing Diameter of the Lip

Figures 16A, 16B, 16C:
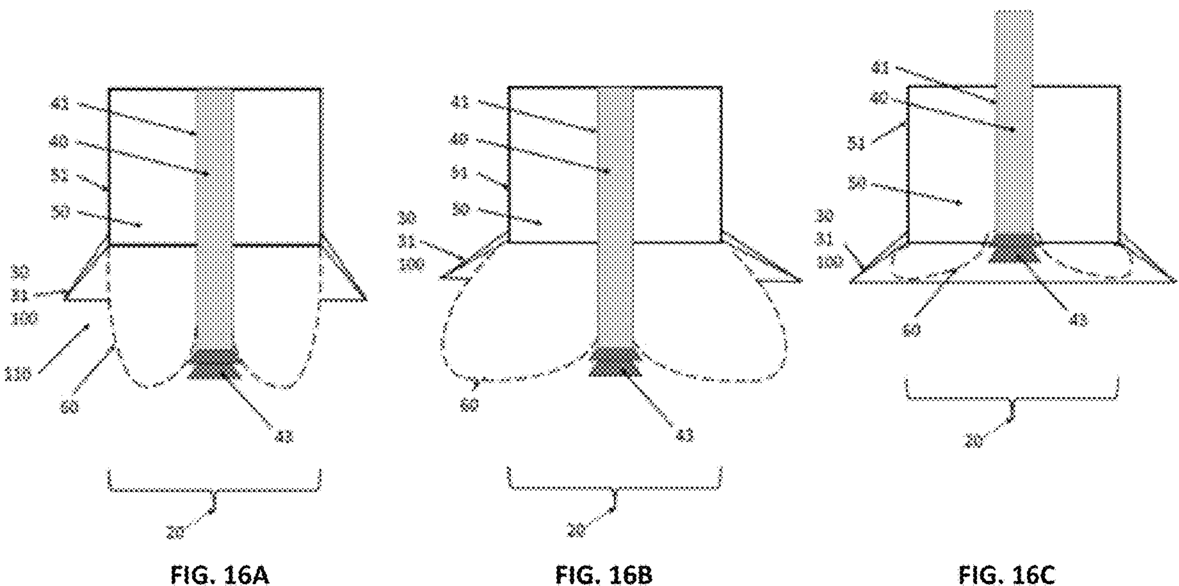
FIGS. 16A to 16C are line drawings that show the shape of a flexible flange can be changed depending on the shape of the deformable membrane.

FIGS. 16A to 16C are line drawings that show the shape of a flexible flange can be changed depending on the shape of the deformable membrane. By inflating and/or deflating the deformable membrane and chamber-shaft relative to movement changes the diameter of the lip.

One embodiment is shown in FIG. 16A, which is similar to the preferred embodiment shown in FIG. 3. In this embodiment the secondary suction interface [31] in the form of one flexible flange [100] can change shape as the deformable membrane [60] inflates or deflates caused by the pressurization and depressurization of the membrane compartment [50].

The outer diameter of the secondary suction interface [31] increases as the deformable membrane [60] is inflated as in FIG. 16B and FIG. 16C; and decreases as the deformable membrane [60] is deflated as in FIG. 16A. The pressurization and depressurization of the membrane compartment [50] can be induced by using the membrane compartment pressure mechanism [72] as in FIG. 16B or can be induced by the relative motion between the membrane compartment wall [51] and the suction compartment wall [41] as in FIG. 16 C, or both.

Additional Devices for Changing Diameter of the Lip

FIGS. 17A and 17B are line drawings that illustrate how an additional device could change the shape of the flexible flange. Another embodiment is shown in FIG. 17A and FIG. 17B, which is derived from the preferred embodiment in FIG. 3. This embodiment is different from the preferred embodiment in FIG. 3 that a dedicated structure [150] actively changes the shape of the secondary suction interface [31]. The structure [150] can be implemented in many ways and can be embedded in or external to the secondary suction interface [31], including but not limited to one or more actuators, one or more mechanical linkages, one or more compliant mechanisms, one or more nozzles capable of blowing or sucking in a fluid, one or more channels or pockets embedded in the secondary suction interface [31] filled with a fluid or a granular material or both and can be pressurized or depressurized on demand, piezoelectric material embedded in the secondary suction interface [31], shape memorizing alloy embedded in the secondary suction interface [31], magnetic or ferromagnetic particles embedded in the secondary suction interface [31] that can be attracted or repelled by an externally applied electromagnetic field, etc.

For example, according to FIGS. 17A and 17B, the structure [150] is a bag filled with a fluid and attached to the secondary suction interface [31] in the form of a flexible flange [100]. As the bag [150] is pressurized as in FIG. 17B, it changes shape and becomes rigid, stretching or compressing the part of the secondary suction interface [31] that is attached to it, thus modifying the shape of the secondary suction interface [31].

Conforming Rim Cup Acting Like Fingers

Another embodiment is shown in FIGS. 18A and 18B, which is derived from the embodiment shown in FIGS. 17A and 17B. FIGS. 18A and 18B are line drawings that show the flexible flange can apply pinching force to an object for picking. According to FIGS. 18A and 18B, the change in the shape of the secondary suction interface [31] caused by the structure [150] can exert a force on the object to be grasped [80]. As a result, the secondary suction interface [31] can be used as a hand or fingers to pick up the object [80] by pinching it as shown in FIG. 18B.

Inverted Rim Cup

Another embodiment is shown in FIGS. 19A to 19C, which is derived from the embodiment in FIGS. 16A to 16C describes an inverted rim cup which the lips are inverted towards inside and not the outside. FIGS. 19A to 19C are line drawings that show a secondary suction interface facing inward in relaxed state.

According to the disclosure, these embodiments are different from the embodiment in FIGS. 16A to 16 wherein the secondary suction interface [31] is flipped inward instead of outward at the relaxed state as shown in FIG. 19B. So that when the primary grasping device [20] is in an idle state as in FIG. 19A, the secondary suction interface [31] is forced open by the deformable membrane [60]. But once the suction compartment wall [41] is retracted relative to the membrane compartment wall [51], bringing the deformable membrane [60] with it into the membrane compartment wall [51], the secondary suction interface [31] is in a relax state and flipped in as in FIG. 19B. In this case when grasping an object [80] as in FIG. 19C the secondary suction interface [31] can create a seal area [130] that is smaller than the diameter of the primary grasping device [20], facilitating grasping objects that are smaller than the diameter of the primary grasping device [20].

Shutter Camera Rim Cup Lip

Another embodiment is shown in FIGS. 20A and 20B, which is derived from the embodiment shown in FIG. 14 and the embodiment shown in FIGS. 19A to 19C. FIGS. 20A and 20B are line drawings that show a secondary suction interface facing inward in relaxed state and comprises small overlapping pieces. In these embodiments a rim cup lip is shown similar to a camera shutter where it can get bigger and smaller.

According to FIGS. 20A and 20B, the secondary suction interface [31] is flipped inward instead of outward at the relaxed state, and the secondary suction interface [31] is made of small overlapping [103] pieces that are not attached to each other. So, if used in combination with the primary grasping device in the preferred embodiment shown in FIG. 3, when the primary grasping device [20] is in an idle state as in FIG. 19A, the secondary suction interface [31] is forced open by the deformable membrane [60], and the small overlapping pieces [103] do not interfere with the deformable membrane [60], just separate from each other and flip open.

Once the suction compartment wall [41] is retracted relative to the membrane compartment wall [51], bringing the deformable membrane [60] with it into the membrane compartment wall [51], the secondary suction interface [31] is in a relax state and flipped in as in FIG. 19B. In this case the small overlapping pieces [103] flip back towards the center of the primary grasping device [20] and partially overlap, leaving a seal area [130] at the center but with a diameter smaller than that of the primary grasping device [20], as shown in FIG. 20. In addition, each of the small overlapping pieces [103] can rotate, so together they can create a smaller, as in FIG. 20A, or a bigger, as in FIG. 20B, sealing area [130], adapted to grasp objects [80] of a wide range of sizes.

Rim Cup with Suction Cups with Bellows

Yet another embodiment is shown in FIGS. 21A and 21B. FIGS. 21A and 21B are line drawings that show a secondary suction interface comprising a series of small suction cups. In these embodiments, a rim cup is shown with suction cups with bellows instead of segmented vents around it (i.e., suction control for the multiple vents).

According to FIGS. 21A and 21B, the secondary suction interface comprises a series of small suction cups [162]. Such small suction cups [162] have bellows so they can better conform to an object to be grasped with a non-flat surface as shown.

Rim Cup with Solid Foam Ring

Yet another embodiment is shown in FIGS. 22A to 22D. FIGS. 22A to 22D are line drawings that show a secondary suction interface comprising a foam ring. In these embodiments, the rim cup is shown with the solid foam ring instead of using a thin polymer lips.

According to FIGS. 22A to 22D, secondary suction interface [31] is in the form of a ring of soft and porous material [104], for example a foam, a sponge, or a fabric, etc., forming an annular suction pad surrounding the primary grasping device [20]. The ring of a ring of soft and porous material [104] is porous to allow a fluid to flow through while being soft enough to conform to the object to be grasped [80] upon contacting with the object [80], therefore can generate a suction force upon the object [80] once the flange compartment [110] is depressurized. And the flange compartment [110] is depressurized through depressurizing the suction compartment [40]. The ring of a ring of soft and porous material [104] can have a square profile as shown in FIG. 22A and FIG. 22B. The ring of a ring of soft and porous material [104] can have a circular profile as shown in FIG. 22C and FIG. 22D. The ring of a ring of soft and porous material [104] can also apply other gripping forces to the object to be grasped [80], comprising friction, dry adhesion, electro-adhesion, magnetic adhesion, or other forms of attractive force.

Rim Cup with Segmented Foam Ring

Figure 23:
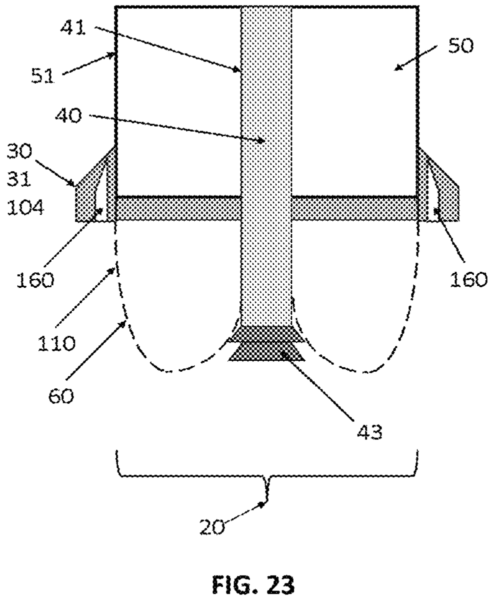
FIG. 23 is a line drawing that shows a secondary suction interface comprising a foam ring with venting ports.

Yet another embodiment is shown in FIG. 23 where the rim cup is shown with a segmented foam ring instead of thin polymer lips. FIG. 23 is a line drawing that shows a secondary suction interface comprising a foam ring with venting ports. This embodiment is derived from the one shown in FIGS. 22A to 22D, and it is different from FIGS. 22A to 22D that to improve air flow through the ring a ring of soft and porous material [104] thus improving the suction force generated, venting ports [160] are created within the ring a ring of soft and porous material [104] to reduce resistance to the suction air flow.

Air Passage for the Vents

Figure 24:
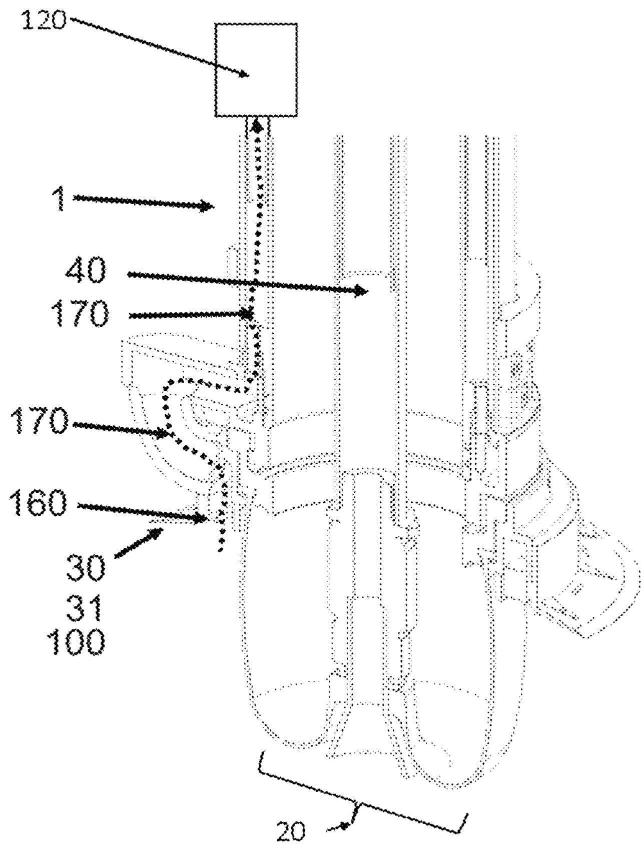
FIG. 24 is a line drawing that shows a single air passage for all venting ports.

One or more air passages [170] can be added to the secondary suction interface to help establish fluid connection between one or more venting ports [160] to one or more flange compartment pressure mechanism [120]. FIG. 24 is a line drawing that shows a single air passage for all venting ports. According to FIG. 24, one or more venting ports [160] are all connected to a single air passage [170]. Having a single air passage [170] helps simplify the mechanical structure. However, it becomes difficult to achieve even air flow distribution amount the venting ports [160] due to the differences in flow resistance between different venting ports [160]. In another embodiment, one or more venting ports

[160] are connected to multiple air passages [170]. In this way air flow can distribute more evenly amount the venting ports [160].

Air Passage Through Detachable Clip

Figure 25:
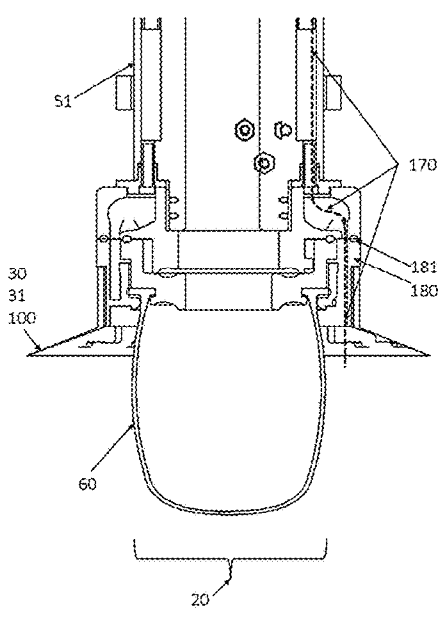
FIG. 25 is a line drawing that shows an air passage passing through a clip.

Yet another embodiment as shown in FIG. 25 where a detachable clip is shown for air passage wherein the air needs to go through the connection to the vents of the rim cup. FIG. 25 is a line drawing that shows an air passage passing through a clip.

According to FIG. 25, the secondary suction interface [31] in the form of one flexible flange forming one large suction cup surrounding the primary grasping device [20] is fixed to a clip [180] on the primary grasping device [20]. The clip [180] also connects the deformable membrane [60] to the membrane compartment wall [51]. The clip [180], together with the deformable membrane [60] and the secondary suction interface [31] attached to it, is detachable from the primary grasping device [20]. There are venting ports [160] in the secondary suction interface [31]. And the air passages [170] for such venting ports firstly passes though the clip [180], and then are embedded into the membrane compartment wall [51]. Methods are taken, including tight fitting and O-rings [181], to ensure airtight seals between different sections of the air passages [170]: between the secondary suction interface and the clip [180], and between the clip and the membrane compartment wall [51].

Adaptability

For the secondary suction interface [31] to form a good seal with the object to be grasped [80], while not exerting excessive force on the object [80] so as to damage it, it is required that the secondary suction interface [31] to contact the object to be grasp [80] along the normal direction of the surface region of the object to be grasp [80] to which the secondary suction interface [31] faces as much as possible, and to not push too much inward towards the object [80]. But sometimes such requirements cannot be easily met in practice. Therefore, it is desirable to have some means of improving the adaptability or tolerance for the positioning error of the secondary suction interface [31] built into the augmented gripping device [10]. Several ways of doing so are described below.

Using Gripper Cylinder as a Compensation Spring

Figures 26A, 26B, 26C:
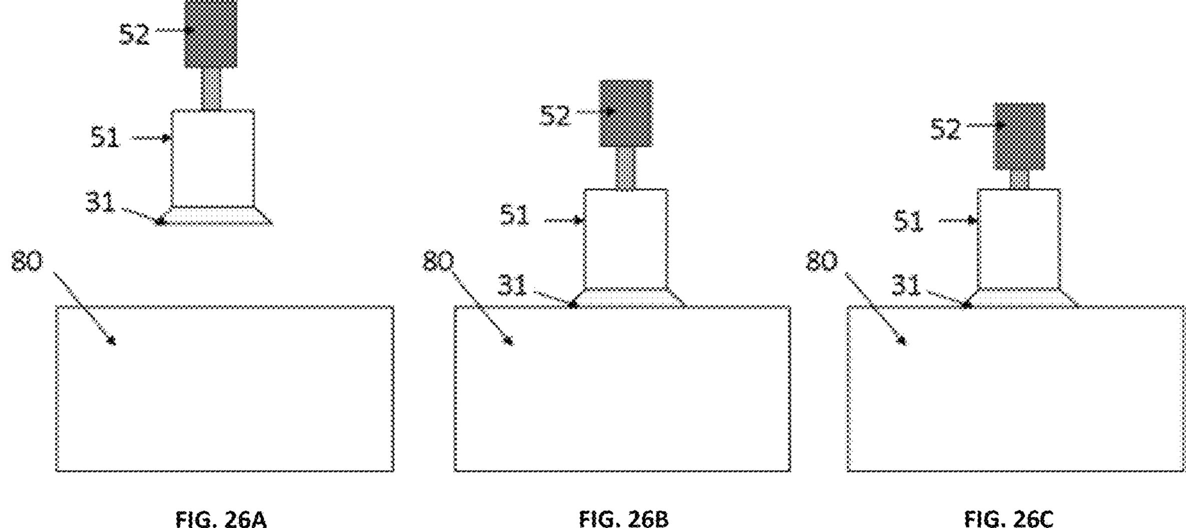
FIGS. 26A to 26C are line drawings that show using the membrane compartment wall actuator as a passive compensator.

In further embodiments, a gripper cylinder can be used as a compensation spring. FIGS. 26A to 26C are line drawings that show using the membrane compartment wall actuator as a passive compensator. As shown in FIG. 26, the secondary suction interface [31] is added to the outside of and surrounding said primary grasping device [20], specifically, to the rim of the membrane compartment wall [51]. As such the secondary suction interface [31] and the membrane compartment wall [51] are in rigid connection and move together as shown in FIG. 26A.

When displacing the secondary suction interface [31] together with the membrane compartment wall [51] towards and then contact with the object to be grasped [80] as shown in FIG. 26B, increased tolerance for the positioning error of the secondary suction interface [31] can be achieved by using the membrane compartment wall actuator [52] as a passive compensator, i.e. if the secondary suction interface [31] is displaced too much towards the object [80], the membrane compartment wall actuator [52] can be pushed back passively by the object [80], as shown in FIG. 26C, to prevent the object form being damaged.

Rim Cup With Bellows to Confirm to Uneven Surfaces

FIGS. 27A and 27B are line drawings that show a secondary suction interface comprising bellows. In these embodiments, a rim cup is shown with bellows around it below the clip to conform to uneven surfaces. According to FIGS. 27A and 27B, the secondary suction interface [31] comprises bellows [105]. The bellows [105] provide both directional tolerance and axial positioning tolerance when displacing the secondary suction interface [31] towards and then contact with the object to be grasped [80].

In another embodiment which is derived from that in FIGS. 27A and 27B, the whole, or one or more portions of the bellows [105] can be hardened on demand or can be hardened after contact with an object to be grasped [80]. One advantage of doing this is that after the object [80] is picked up, the whole or partially hardened bellows [105] will not allow the object [80] to oscillate excessively.

Gripper With Soft Chamber

In yet another embodiment as shown in FIG. 28, a gripper with a soft chamber or bellow shape chamber is shown. FIG. 28 is a line drawing that shows the membrane compartment wall comprises a bellowed portion. According to FIG. 28, the secondary suction interface [31] is added to the outside of and surrounding said primary grasping device [20], specifically, to the rim of the membrane compartment wall [51]. As such the secondary suction interface [31] and the membrane compartment wall [51] are in rigid connection and move together. In addition, in this embodiment the membrane compartment wall [51] has one or more bellowed portions [53]. And such bellowed portions provide both directional tolerance and axial positioning tolerance when displacing the secondary suction interface [31] towards and then contact with the object to be grasped [80].

In another embodiment which is derived from that in FIG. 28, the whole, or one or more bellowed portions [53] can be hardened on demand or can be hardened after contact with an object to be grasped [80]. One advantage of doing this is that after the object [80] is picked up, the whole or partially hardened bellowed portions [53] will not allow the object [80] to oscillate excessively.

Procedure for Prevention for Collapsing Membrane

For the preferred embodiment of the augmented gripping device as shown in FIG. 3, in order for secondary grasping device [30] to grasp an object [80] properly, that is to form a good seal with the object to be grasped [80], to generate as much suction force as possible, and to tolerate as much air leakage from the environment [1] into the flange compartment [110] as possible, it is preferable to displace the flexible membrane [60] away from the object to be grasped [80], so as to reduce or minimize its obstruction to the suction air flow and maximize the seal area [130] on the object to be grasped [80] that is directly exposed to the low pressure in the flange compartment [110] and the suction compartment [40]. The following embodiments are about different ways to achieve this.

Procedure for Displacing the Flexible Membrane Away From the Grasped Object

One embodiment is shown in FIGS. 29A to 29C, which is derived from the preferred embodiment shown in FIG. 3. FIGS. 29A to 29C are line drawings that show a procedure for displacing the flexible membrane away from the object to be grasped. In these embodiments, the chamber creates a vacuum first then the shaft retracts to prevent forming a lip.

According to FIGS. 29A to 29C, when the secondary grasping device is to be used for grasping an object [80], the deformable membrane [60] is firstly displaced away from the object to be grasped [80] before the secondary grasping device [30] contacts the object [80] using the following procedure wherein FIG. 29A shows the initial state of the augmented gripping device [10]. In FIG. 29B, the membrane compartment [50] is depressurized. Due to the pressure difference between the two surfaces of the deformable membrane [60], the deformable membrane [60] is sucked into the membrane compartment [50].

Then in FIG. 29C, the suction compartment wall [41] is retracted relative to the membrane compartment wall [51], bringing the portion of the deformable membrane [60] that is adjacent to the rim of the suction compartment wall [41] with it into the membrane compartment [50]. As such the deformable membrane [60] is displaced away from the object to be grasped [80].

According to the disclosure, a single vacuum source that is connected to the shaft compartment is used. A valve can be opened on demand to form a fluid connection between the shaft compartment and the chamber compartment, therefore bringing the pressure of the chamber compartment to the same as the shaft compartment, thus balancing the pressure.

It is noticed that, in the embodiment shown in FIGS. 29A to 29C, as the grasping process continue to progress, once the secondary grasping device [30] contacts the object [80], a seal is formed and the flange compartment [110] is separate from the environment [1] and become one with the suction compartment [40]. With the suction compartment pressure mechanism [71] activated to depressurize the suction compartment [40], hence also the flange compartment [110], there is a possibility that the flange compartment [110] reaches a lower pressure than the membrane compartment [50]. In that case, the deformable membrane [60] may collapse towards the object [80], reducing the seal area [130] of the secondary grasping device [30] and obstructing the air flow from the flange compartment [110] to the suction compartment [40], which will in turn decrease the suction force generated towards the object [80].

Although a lot of the time a successful grasp is still achieved with the decreased suction force, this situation is nonetheless undesirable. To solve this, that is to prevent the deformable membrane [60] from collapsing towards the object [80], it is desired to keep the pressure in the membrane compartment [50] to be lower than or at least equal to the pressure in the suction compartment [40] and the flange compartment [110].

FIGS. 30A to 30C are line drawings that show a procedure for displacing the flexible membrane away from the object to be grasped. FIGS. 30A to 30C, the membrane compartment [50] depressurization is done by the suction compartment pressure mechanism [71] instead of the membrane compartment pressure mechanism [72]. That is, the flange compartment [110], the suction compartment [40] and the membrane compartment [50] are decompressed by the same pressure mechanism. So that the pressure in the three compartments will be equalized after the secondary grasping device [30] contacts the object [80] and forms a seal, as such there will be zero force acting on the deformable membrane [60] due to pressure difference between the two sides of the deformable membrane [60], so the deformable membrane [60] will maintain its shape and will not collapse towards the object [80], or at least the deformable membrane [60] will not clog the primary suction interface [43].

Specifically, the suction compartment pressure mechanism [71] can be connected to or disconnected from the membrane compartment [50] through a valve [190]. So that before using the secondary grasping device [30] to grasp an object [80], if there exists a membrane compartment pressure mechanism [72], it is deactivated or disconnected from the membrane compartment [50]; the valve [170] is opened; and the suction compartment pressure mechanism [71] is activated to lower the pressure in the membrane compartment [50] thought out the grasping process until the object [80] is to be released. Furthermore, the valve connecting the shaft compartment and the chamber compartment is opened during the gripping motion. It is then closed when the gripping process is done.

In practice with the embodiment shown in FIGS. 30A to 30C, sometimes there is leakage between the membrane compartment [50] and the environment [1] causing the pressure in the membrane compartment [50] to rise. And since the membrane compartment [50] and the suction compartment [40] is in fluid connection through the valve [190], the pressure in the suction compartment [40] hence the flange compartment [110] also rises, thus lowering the suction force generated towards the object [80]. The negative pressure in the flange compartment [110] helps pick up the object [80].

In this case, sometimes it is desirable to only keep valve [190] open for a short period of time after the secondary grasping device [30] contacts the object [80] and forms a seal, and then the valve [190] is closed, so as to prevent too much pressure rises in the flange compartment [110] due to leakage between the membrane compartment [50] and the environment [1] and hence loosing too much suction force applied to the object [80]. It should be noted that after the valve [190] is closed, air will continue to leak into the membrane compartment [50] from the environment [1] and the deformable membrane [60] will consequently collapse towards the object [80], reducing the suction force towards the object [80]. But as long as the suction loss due to the pressure rises in the flange compartment [110] is greater than the suction loss caused by the collapsing of the deformable membrane [60] towards the object [80], it is worthy to consider closing valve [190] shortly after the secondary grasping device [30] contacts the object [80] and forms a seal.

According to the disclosure, the two vacuum sources are connected and used to balance the two vacuum sources. This would reduce the risk for the membrane to collapse. This can be achieved by using a membrane with holes to enable communication between the two vacuum compartments In another embodiment, instead of using a valve [190] to establish a fluid connection between the membrane compartment [50] and the suction compartment [40], hence also the flange compartment [110], a deformable membrane [60] with one or more holes [200] is used. In this way the one or more holes [200] on the deformable membrane [60] establish a fluid connection directly between the membrane compartment [50] and the flange compartment [110].

According to the disclosure, the two vacuum sources are connected and used to balance the two vacuum sources. This would reduce the risk for the membrane to collapse. This can be achieved by using a clip with holes to enable communication between the two vacuum compartments Yet another embodiment is shown in FIGS. 31A and 31B, which is derived from the previous embodiment. FIGS. 31A and 31B are line drawings that show fluid communication between flange compartment and membrane compartment. According to FIGS. 31A and 31B, the deformable membrane [60] is fixed to a clip [180], which is in turn attached to the rim of the membrane chamber wall [51]. One or more holes [201] is created through the body of the clip [180] so that the one or more holes [201] establish a fluid connection directly between the membrane compartment [50] and the flange compartment [110]. In addition, none, one, or more passive or active valves [191] can be installed at the holes [201] to allow opening or closing the fluid communication between the membrane compartment [50] and the flange compartment [110] on demand.

From the above discussion, it is noted that to prevent the deformable membrane [60] from collapsing towards the object to be grasp [80] and reducing suction, the best the embodiments shown in FIGS. 30A TO 30C and FIGS. 31A and 31B can achieve is to equalize the pressures on both sides of the deformable membrane [60] so that the deformable membrane [60] can maintain its shape without collapsing. But if there is leakage between be membrane compartment [50] and the environment [1], the deformable membrane [60] will still collapse towards the object. It is more desirable to be able to control the pressure in the membrane compartment [50] and the suction compartment [40] such that the pressure in the former is lower than that in the latter. According to the disclosure, the controller may have two pressure sensors and two venturi which actively control the pressure in the two chambers.

Membrane Compartment and Suction Compartment Pressure Control

FIGS. 32A and 32B are line drawings that show pressure control scheme for the membrane compartment [50], suction compartment [40] and flange compartment [110]. In one embodiment as shown in FIG. 32A, at least one suction compartment pressure sensor [45] and at least one membrane compartment pressure sensor [55] are added. One can use the membrane compartment pressure mechanism [72] and the reading from the membrane compartment pressure sensor [55] to actively control the membrane compartment [50] pressure to a set point value. One can use the suction compartment pressure mechanism [71] or the secondary pressure mechanism [120] through a venting port [160], if it is separated from the suction compartment pressure mechanism [71] and the reading from the suction compartment pressure sensor [45] to actively control the suction compartment [40] pressure and the flange compartment [110] pressure to another set point value. Furthermore, the membrane compartment [50] pressure set point is set to a value lower than the suction compartment [50] pressure set point. Alternatively in the embodiment shown in FIG. 32B, a valve [191] can be used to regulate a pressure fluid flow [192] to or from the flange compartment [110] through a venting port [160], thus controlling the pressure in the flange compartment [110].

Membrane Compartment with Granular Material

In the embodiment shown in FIGS. 30A to 30C, FIGS. 31A to 31B, and FIGS. 32A and 32B, if the membrane chamber compartment [50] pressure is lower than the flange compartment [110] pressure or the suction compartment [40] pressure, the deformable membrane [60] will get pushed tightly against the inner surface of the membrane compartment wall [51]. This may cause damage to the deformable membrane [60], for example, if there are any sharp points or edges on the inner surface of the membrane compartment wall [51]. The following four embodiments address this problem.

FIGS. 33A and 33B show a membrane compartment filled with a granular material. As shown in FIGS. 33A and 33B, the membrane compartment [50] is filled with a granular material [56] (i.e., sand). Once the membrane compartment [50] is depressurized, the granular material [56] will jam up and solidify, providing a relatively smooth surface for the deformable membrane [60] to rest upon as shown in FIG. 33B, preventing membrane damage.

According to FIGS. 33A and 33B, a granular material (i.e., sand) is used to make the membrane to become solid when the rim cup engages (i.e., very high vacuum in the chamber with sand). Alternative embodiments may also use a vent.

Conical Backing Structure for the Deformable Membrane

Another embodiment is shown in FIGS. 34A and 34B where a conical backing structure for the deformable membrane is shown. In these embodiments, a rigid conical structure [210] is fixed inside the membrane compartment [50]. There are holes [211] on the conical structure [210] to allow fluid communication between the two sides of the conical structure [210]. On the internal surface of the conical structure [210], one or more layers of a soft and porous material [212], e.g. sponge, fabric, etc., are attached. So that when the membrane compartment [50] pressure is lower than the flange compartment [110] pressure or suction compartment [40] pressure, the deformable membrane [60] will be pushed tightly against the surface of the soft and porous material [212] layer, preventing the deformable membrane [60] from being damaged.

According to the disclosure, a chamber with conical shape and sponge is shown, Furthermore, very high vacuum pressure is sent through the sponge (i.e, may be a fabric/filter with multiple layers separated by spacers) to keep the membrane in place.

Stiffened Deformable Membrane

Another embodiment is shown in FIGS. 35A and 35B where are line drawings that show a deformable membrane that can be stiffened up. According to the disclosure, a membrane having multiple layers with vents that allow membrane to become stiffer under vacuum is shown. In these embodiments, the deformable membrane [60] comprises a number of cavities [213] that can be depressurized on demand. Upon decompression of the cavities [213], the deformable membrane stiffens up, preventing the deformable membrane [60] from being pushed tightly against the internal surface of the membrane compartment wall [51], thus preventing the deformable membrane from being damaged.

Another embodiment is shown in FIGS. 36A and 36B are line drawings that show a deformable membrane that can be stiffened up. According to the disclosure, a membrane having multiple layers with vents that allow membrane to become stiffer under vacuum is shown. In this embodiment, a layer of porous and soft material [214] is sandwiched inside the deformable membrane [60]. The layer of porous and soft material [214] can be depressurized on demand. And upon decompression the layer of porous and soft material [214] stiffens up, causing the deformable membrane [60] to stiffen up, preventing the deformable membrane [60] from being pushed tightly against the internal surface of the membrane compartment wall [51], thus preventing the deformable membrane [60] from being damaged.

The above embodiments as shown in FIGS. 29 to FIG. 36 all depend on creating a pressure difference between the two sides of the deformable membrane [60] to displace the flexible membrane [60] away from the object to be grasped [80]. Alternatively, different mechanisms can be added to the augmented gripping device [10] to achieve the same effect. Further, other mechanism which presses the membrane upward when an item engages can be used.

Specifically, in one embodiment a mechanism presses the deformable membrane [60] away from the object to be grasped [80] or a mechanism which removes the membrane when rim cup is used.

In another embodiment, a mechanism completely removes the deformable membrane from the primary grasping device [20] when only the secondary grasping device [30] is used for grasping an object [80] or a mechanism that enables the membrane to fold on itself.

In yet another embodiment, a mechanism folds deformable membrane [60] up away from an object to be grasped [80] when only the secondary grasping device [30] is used for grasping the object [80]. In a further embodiment, before the rim cup engages, the membrane gets detached from the rim cup whereby rubber bands can be used tol connect the membrane to the rim cup and the membrane is fully retracted inside the shaft.

In yet another embodiment, when only the secondary grasping device [30] is used for grasping an object [80], a mechanism is used to detach the deformable membrane [60] from the membrane chamber wall [51] and then retract it away from the object [80]. One or more tether lines are left connecting the deformable membrane [60] to the membrane chamber wall [51]. Such tether lines are to be used as a guide to detach the deformable membrane [60] back to the membrane chamber wall [51] when needed.

Rigid Ring Structure to Prevent Suction Cup to be Crushed

Yet another embodiment is shown in FIG. 37, which is derived from the preferred embodiment shown in FIG. 3. FIG. 37 is a line drawing that shows a rigid ring preventing the suction cup from being crushed closed. In this embodiment, the membrane collapses, to prevent total loss of suction, a rigid structure, such as a ring, can be put inside the shaft cup to keep the shaft cup form being crushed closed by the collapsed membrane According to FIG. 37, the secondary grasping device is used for grasping an object [80] and the deformable membrane [60] collapses towards the object [80], the primary suction interface [43] attached to the tip of the suction compartment wall [41] may be crushed closed by the collapsed deformable membrane [60], causing a total loss of suction force upon the object [80], which is undesirable. To solve this, a rigid structure, such as a rigid ring [215], is put inside the primary suction interface [43] to prevent it from being crushed close.

Different Sealing Regions

FIGS. 38A and 38B are line drawings that illustrate the inner, circular, sealing region and the outer, annular, sealing region. According to FIGS. 38A and 38B, it is shown that based on the preferred embodiment shown in FIG. 3, new embodiments can be derived so that the combination of the primary grasping device [20] and the secondary grasping device [30] can produce a variety of grasping configurations adapted to grasp a wide variety of objects.

In one embodiment as shown in FIG. 38A, which is derived from the preferred embodiment shown in FIG. 3, the secondary pressure mechanism [120] is independent of the suction compartment pressure system [71] and is in fluid connection with the flange compartment [110] through a venting port [160], and a primary suction interface [43] is attached to the tip of the suction compartment wall [41].

When using a Category 3 Method to grasp an object [80] as shown in FIG. 38B, both the primary suction interface [43] on the primary grasping device [20] and the secondary suction interface [31] of the secondary grasping device [30] can contact the object [80] and form two seals, one between the object [80] and the primary suction interface [43], the other between the object and the secondary suction interface [31]. As such the suction compartment [40] is separated from the flange compartment [110], forming two sealing regions: a circular sealing region [220] and an annular sealing region [221], and both the suction compartment pressure system [71] and the secondary pressure mechanism [120] contribute to the grasping effort.

According to the disclosure, the middle cup can help with the rim cup due to using another venturi. In other words, two suction area with 2 different venturis where both are trying to lift the same item.

Short Sealing Structure

Figures 39A, 39B, 39C:
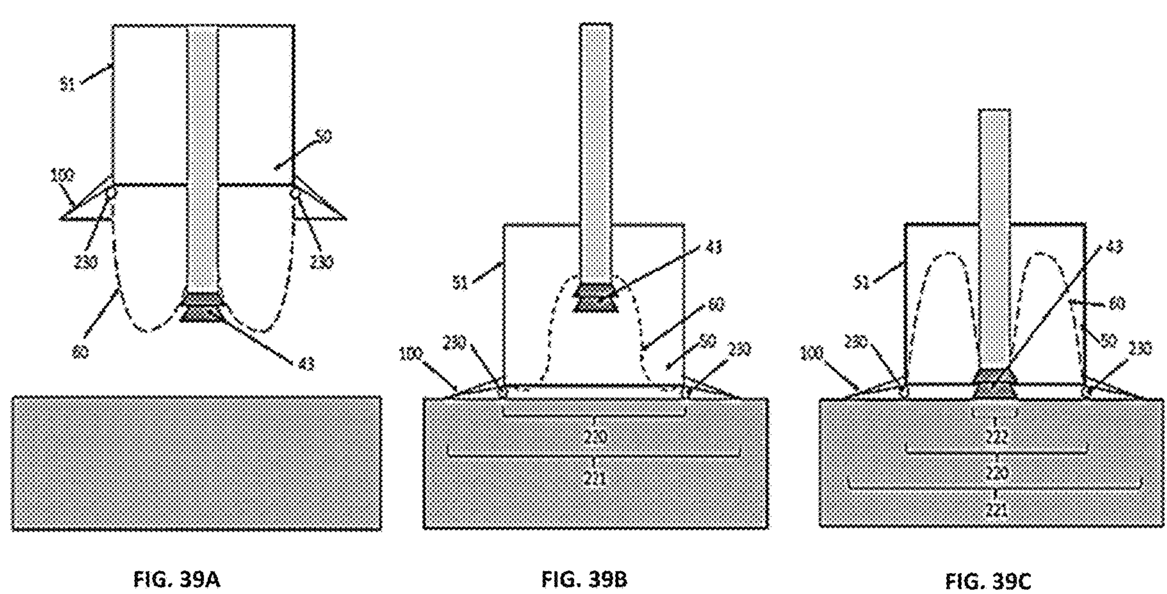
FIGS. 39A to 39C are line drawings that show a short sealing structure used to create a circular sealing area and an annular sealing area.

FIGS. 39A to 39C are line drawings that show a short sealing structure used to create a circular sealing area and an annular sealing area. These embodiments ensure the "clip" or something similar forms a very good seal, such as the vacuum of from the shaft is not used at all. This would form an annular ring In another embodiment as shown in FIG. 39A, which is derived from the preferred embodiment shown in FIG. 3, a short sealing structure [230] is added to the tip of the membrane compartment wall [51] between the deformable membrane [60] and the flexible flange [100] and around the whole circumference of the deformable membrane [60].

When the membrane compartment wall [51] is displaced towards the object to be grasped [80] as shown in FIG. 39B, both the flexible flange [100] and the short sealing structure [230] can contact the object [80] and form a seal. As such two sealing regions: a circular sealing region [220] and an annular sealing region [221], are formed. Each of them or a combination of them can contribute to the grasping effort.

Furthermore, if the suction compartment wall [41] together with the primary suction interface [43] is subsequently displaced towards the object [80] such that that the primary suction interface [43] contacts with the object [80] and forms a seal, a new circular sealing region [222] is formed inside the circular sealing region [220], and the suction compartment [40] is now confined to be inside the circular sealing region [222] as shown in FIG. 39C. In this case, the three sealing regions [220], [221] and [222] can each or in any combination contribute to the grasping process, adapted to grasp objects [80] of a wide range of sizes.

Back Structure for Deformable Membrane

In yet another embodiment as shown in FIGS. 40A to 40D, which is derived from the preferred embodiment shown in FIG. 3, a back structure for a deformable membrane is shown. FIGS. 40A to 40D are line drawings that illustrate a backing structure for the deformable membrane creating an inner sealing area. According to FIG. 40A, a backing structure [240] for the deformable membrane is added inside the membrane compartment [50] and fixed to the membrane compartment wall [51]. This backing structure [240] can take different forms, such as an O-ring attached to the membrane compartment wall [51] or a rib built into the membrane compartment wall [51].

Figures 40A, 40B, 40C, 40D:
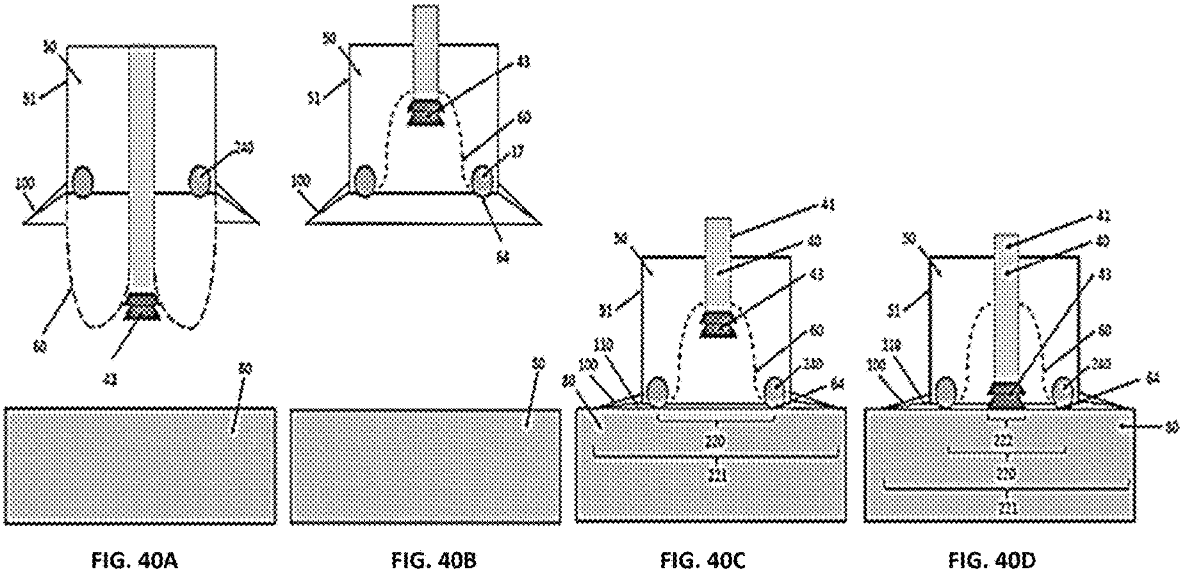
FIGS. 40A to 40D are line drawings that illustrate a backing structure for the deformable membrane creating an inner sealing area.

When the deformable membrane [60] is displaced away from the item to be grasped [80] and into the membrane compartment [50], the rim portion [64] of the deformable membrane [60] will rest against this backing structure [240] as shown in FIG. 40B. And if subsequently the membrane compartment wall [51] is displaced towards the object to be grasped [80] as shown in FIG. 40C, both the flexible flange [100] and the rim portion [64] of the deformable membrane [60] that is resting on the backing structure [140] can contact the object [80] and form a seal. As such two sealing regions: a circular sealing region [220] and an annular sealing region [221], are formed, separating the suction compartment [40] and the flange compartment [110].

Each of them or a combination of them can contribute to the grasping effort. For example, with the two sealing regions [220] and [221] formed, sometimes only the suction compartment [40] needs to be depressurized for grasping an object [80], sometimes only the flange compartment [110] needs to be depressurized for grasping an object [80], and sometimes both the suction compartment [40] and the flange compartment [110] can be depressurized to the same pressure or to different pressures for grasping an object [80]. Furthermore, if the suction compartment wall [41] together with the primary suction interface [43] is subsequently displaced towards the object [80] such that that the primary suction interface [43] contacts with the object [80] and forms a seal, a new circular sealing region [222] is formed inside the circular sealing region [220], and the suction compartment [40] is now confined to be inside the circular sealing region [222] as shown in FIG. 40D. In this case, the three sealing regions [220], [221] and [222] can each or in any combination contribute to the grasping process, adapted to grasp objects [80] of a wide range of sizes.

According to further embodiments of the disclosure, there is a soft O-ring inside the clip, when the membrane retracts, this O-ring can act as another sealing lip which is smaller than the rim cup. The membrane lays on this O-ring and helps with sealing (i.e., a rim cup outside a middle size cup with a smaller suction cup in the middle). According to a further embodiment, the gripper first sits on an item so the seal is firmly on the item, then only the inner vacuum turns on and creates the seal, hence the lips of the rim cup will not do anything. In a further embodiment, a mechanism is used to flap the outer rim cup up, which leaves only the inner sealing lip (i.e., membrane on the O-ring forming a seal).

Actively Flip Up Flexible Flange

Figures 41A, 41B, 41C:
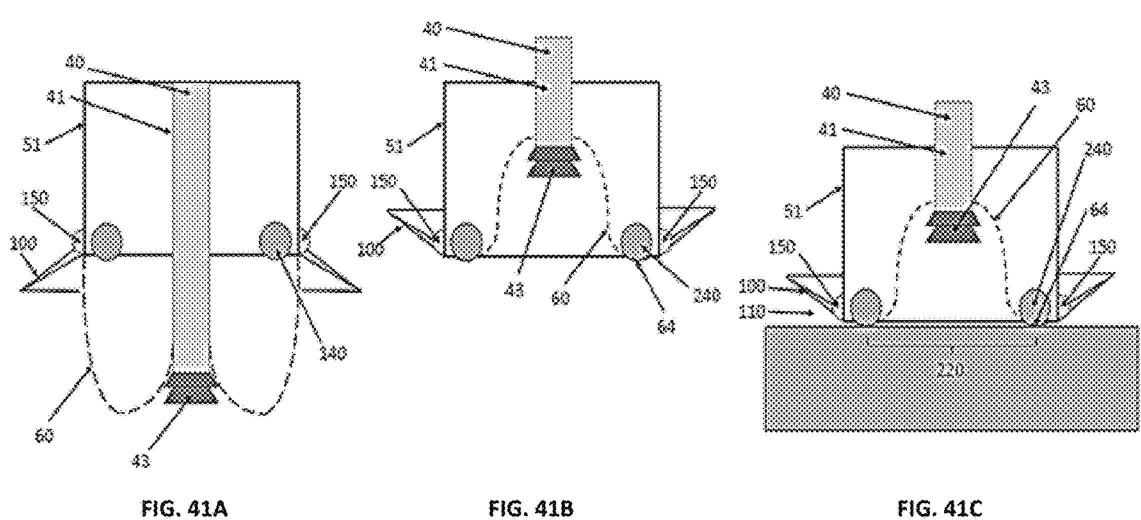
FIGS. 41A to 41C are line drawings that illustrate a structure being used to actively flip up the flexible flange.

FIGS. 41A to 41C are line drawings that illustrate a structure being used to actively flip up the flexible flange. In yet another embodiment as shown in FIGS. 41A to 41C, which is formed by combining the embodiments shown in FIG. 17 and FIGS. 40A to 40C. When grasping an object [80], a structure [150] can firstly actively flip up the flexible flange [100] of the secondary suction interface [31] as in FIG. 41B, and if subsequently the membrane compartment wall [51] is displaced towards the object to be grasped [80] as shown in FIG. 41C, only the rim portion [64] of the deformable membrane [60] that is resting on the backing structure [240] can contact the object [80] and form a seal. As such only on sealing regions: a circular sealing region [220] is formed, separating the suction compartment [40] and the flange compartment [110], and only the suction compartment [40] can contribute to the grasping effort.

Formation of Different Sealing Regions (Variable Vacuum Area)

Yet another embodiment is shown in FIGS. 42A to 42F. FIGS. 42A to 42F are line drawings that show that different sealing regions can be formed or adjusted by manipulating one or more components in the augmented gripping device. According to the disclosure, variable vacuum area are formed wherein the vacuum area is Increased or decreased by varying the pressure difference between the “chamber vacuum area” vs “membrane vacuum area”.

According to FIGS. 42A to 42D, once the flexible flange [100] of the secondary suction interface [31] contacts the object [80] and forms a seal, different sealing regions can be formed or adjusted by manipulating one or more components in the augmented gripping device [10]. Specifically, in FIG. 42A, the sealing region [220] covers the area of the whole flexible flange [100] and the pressure in the sealing region [220] can be control by at least the suction compartment pressure mechanism [71] or at least the secondary pressure mechanism [120].

Figures 42A, 42B, 42C, 42D:
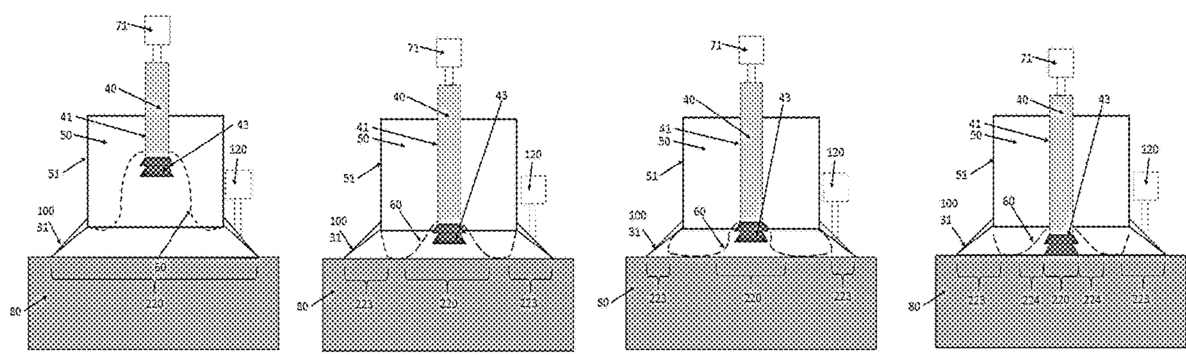
FIGS. 42A to 42F are line drawings that show that different sealing regions can be formed or adjusted by manipulating one or more components in the augmented gripping device.

According to FIG. 42B, the suction compartment wall [41] is displaced and the membrane compartment [50] pressure is controlled that the deformable membrane [60] partially collapses towards the object, producing two sealing regions [220] and [223] and the pressure in the sealing region [220] can be controlled by the suction compartment pressure mechanism [71], while the pressure in the sealing region [223] can have three scenarios.

In the first scenario, the pressure in the sealing region [223] can be controlled by the secondary pressure mechanism [120] if it is separated from the suction compartment pressure mechanism [71].

In the second scenario, if the suction compartment pressure mechanism [71] is doubled as the secondary pressure mechanism [120], and the suction compartment pressure mechanism [71] is activated to depressurize the suction compartment [40] before the deformable membrane [60] comes into contact with the object [80], and the deformable membrane [60] is then come into contact with the object [80], then the pressure in the sealing region [223] is at a pressure lower than that of the environment [1] but may be affected by leakage from the environment [1] or leakage from the sealing region [220].

In the third scenario, if the suction compartment pressure mechanism [71] is doubled as the secondary pressure mechanism [120], and the suction compartment pressure mechanism [71] is activated to depressurize the suction compartment [40] after the deformable membrane [60] comes into contact with the object [80], and the deformable membrane [60] is then come into contact with the object [80], then the pressure in the sealing region [223] is at a pressure similar to that of the environment [1] but may be affected by leakage from the environment [1] or leakage from the sealing region [220].

According to FIG. 42C, the suction compartment wall [41] position and the membrane compartment pressure [50] are further adjusted so that the area of the sealing regions [220] and [223] are reduced.

According to FIG. 42D, the suction compartment wall [41] position and the membrane compartment pressure [50] are further adjusted so that three sealing regions [220], [223], and [224] are produced. Furthermore, the pressure in the sealing region [220] can be controlled by the suction compartment mechanism. The pressure in the sealing region [223] can have three scenarios.

In the first scenario, the pressure in the sealing region [223] can be controlled by the secondary pressure mechanism [120] if it is separated from the suction compartment pressure mechanism [71].

In the second scenario, if the suction compartment pressure mechanism [71] is doubled as the secondary pressure mechanism [120], and the suction compartment pressure mechanism [71] is activated to depressurize the suction compartment [40] before the deformable membrane [60] and the primary suction interface [43] come into contact with the object [80], and the deformable membrane [60] and the primary suction interface [43] are then come into contact with the object [80], then the pressure in the sealing region [223] is at a pressure lower than that of the environment [1] but may be affected by leakage from the environment [1] or leakage from the sealing region [224].

In the third scenario, if the suction compartment pressure mechanism [71] is doubled as the secondary pressure mechanism [120], and the suction compartment pressure mechanism [71] is activated to depressurize the suction compartment [40] after the deformable membrane [60] comes into contact with the object [80], and the deformable membrane [60] is then come into contact with the object [80], then the pressure in the sealing region [223] is at a pressure similar to that of the environment [1] but may be affected by leakage from the environment [1] or leakage from the sealing region [224].

According to the disclosures, the pressure in the sealing region [224] can have the following scenarios. In the first scenario, the pressure in the sealing region [224] can be lower than that in the environment [1] if the suction compartment pressure mechanism [71] is activated to depressurize the suction compartment [40] before the primary suction interface [43] contacts the object [80] but after the secondary suction interface [31] or the deformable membrane [60] contacts the object [80]. In the second scenario, the pressure in the sealing region [224] can be lower than that in the environment [1] if the secondary pressure mechanism [120] is separate from the suction compartment pressure mechanism [71] and the secondary pressure mechanism [120] is activated to depressurize the flange compartment [110] or the sealing area [223] before the deformable membrane [60] contacts the object [80] but after the secondary suction interface [31] contacts the object [80].

In the third scenario, the pressure in the sealing region [224] can be similar to that in the environment [1] if both the deformable membrane [60] and the primary suction interface [43] contact the object [80] before the pressure in the sealing region [224] is affected by the suction compartment pressure mechanism [71] or the secondary pressure mechanism [120].

In all three scenarios, the pressure in the sealing region [224] is subsequently affected by leakage from the sealing region [220] and leakage from the sealing region [223]. According to FIG. 42E, only the primary suction interface [43] contacts the object [80], delimiting a sealing region [220], whose pressure is affected by the suction compartment pressure mechanism [71].

Figures 42E, 42F:
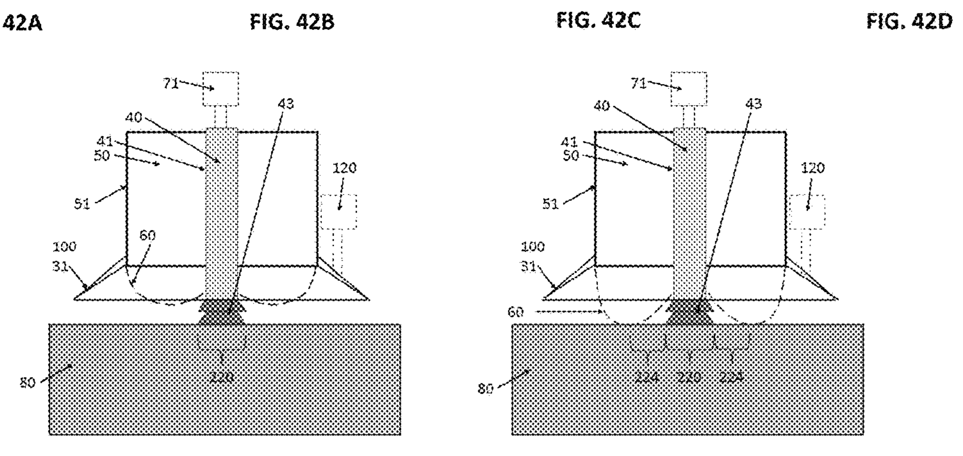

And finally, according to FIG. 42F, both the primary suction interface [43] and the deformable membrane contact the object [80], delimiting a sealing region [220], whose pressure is affected by the suction compartment pressure mechanism [71], and a sealing region [224] whose pressure can be lower than or similar to that of the environment, dependent on the pressure of the sealing region [224] at the moment it is formed. And said pressure in the sealing region [224] is subsequently affected by leakage from the sealing region [220] and leakage from the environment [1].

Miscellaneous Operations to Assist with Grasping

The augmented gripping device [10] in the preferred embodiment as shown in FIG. 3 can utilize different components and employ different methods for grasping different kinds of objects as shown in FIGS. 43A to 43D. FIGS. 43A to 43D are line drawings that illustrate how the relative positions of the primary grasping device and secondary grasping device can be modified to match the contours of the object being grasped. According to the disclosure, a position of shaft with respect to the rim cup can be low and help with flat items with more suction (i.e., a separate venturi) or it can also be positioned high and create a cavity to help with sucking bags in.

Specifically, for grasping a flat object as in FIG. 43A and FIG. 43B, the gripping configuration resembling the embodiment shown in FIGS. 38A and 38B can be used. The primary suction interface [43] on the primary grasping device [20] and the flexible flange [100] on the secondary grasping device [30] are both reaching the same plane and contacting a flat surface on the object [80] and forming two sealing regions [220] and [221], corresponding to the suction compartment [40] and the flange compartment [110].

With the suction compartment [40] being depressurized by the suction compartment pressure mechanism [71] and the flange compartment [110] being depressurized by the flange compartment pressure mechanism [120], both sealing regions [220] and [221] contribute to the grasping effort. For grasping a soft irregular object such as a bag, as shown in FIG. 43C and FIG. 43D.

In addition to using the gripping configuration resembling the embodiment shown in FIGS. 38A and 38B, the suction compartment wall [41], hence the primary suction interface [43], is retracted more into the membrane compartment [50], bringing a part of the object [80] into the gripper device. This can help compensate for the deformation of the soft irregular object [80] due to suction force in the sealing region [220] from the suction compartment [40] and gravity, keeping the flexible flange [100] on the secondary grasping device [30] in contact with the object [80] and allowing the formation of the sealing region [221], thus providing a more secure grasp on the object [80].

Secondary Suction Device Affecting Inflation

In yet another embodiment as shown in FIGS. 44A to 44C are line drawings that illustrate how the secondary suction device can direct the inflation of the membrane. According to FIGS. 44A to 44C, when gripping with the deformable membrane [60], the use of a secondary suction interface [31] in the form of a flexible flange can help focusing the deformable membrane inflation towards the object to be grasped [80], thus increasing pinching form exerted on the object [80], and help preventing the deformable membrane from inflating in directions away from the object, thus improving the probability of achieving a secure grasp.

Furthermore, the rim cup can help with membrane pick by preventing the membrane from inflating in the wrong direction (i.e., away from the item). The rim cup forcing the membrane to inflate in the direction of pinching the item for better pinching force.

Since the rim cup has a larger area it can pick up delicate objects with less pressure (i.e., soft bags) so it will not damage them. In comparison all other grippers with a single smaller cup or even an array of cups will have a localized pressure in a small area which can make a hole in a bag or damage delicate items.

For an object that can be grasped by both the primary grasping device and the secondary grasping device in the preferred embodiment shown in FIG. 3, sometimes it is advantageous to grasp it using the secondary grasping device only. This is because the secondary suction interface of the secondary grasping device and in the form of a flexible flange can create a larger sealing region [200], therefore the flange compartment do not need to depressurize too much to generate enough suction force to grasp the object [80], which in turn is less likely to cause damage to the object [80]. In comparison, due to the smaller diameter of the primary grasping device [20], the suction compartment needs to be depressurized more to pick up the same object [80], which may damage the object [80].

Object Stabilization by Dampening Item Oscillations

FIGS. 45A to 45E shows several scenarios in which the augmented gripping device [10] in the preferred embodiment as shown in FIG. 3 is used for grasping an object [80]. FIGS. 45A to 45E are line drawings that illustrate how the relative positions of the primary and secondary grasping interfaces can be used to dampen object oscillations whereby a rim cup acts as a cushion to dampen item oscillations.

FIGS. 45A to 45E demonstrates that that the secondary suction interface [31] can help dampen oscillations of the object [80] when it is picked up. Specifically, in FIG. 45C, only the primary grasping device [20] is used to pick up the object [80], and the secondary suction interface [31] is displaced far away from the object [80]. Due to the softness of the deformable membrane [60] on the primary grasping device [20], the item [80] is free to oscillate laterally with a big magnitude.

Figures 45A, 45B, 45C, 45D, 45E:
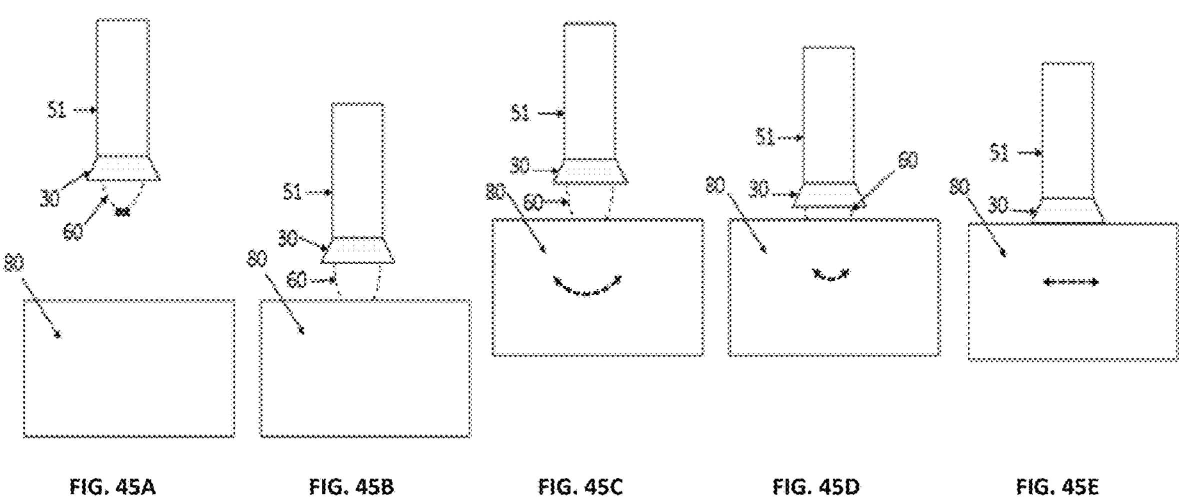
FIGS. 45A to 45E are line drawings that illustrate how the relative positions of the primary and secondary grasping interfaces can be used to dampen object oscillations.
Figures 46A, 46B, 46C, 46D:
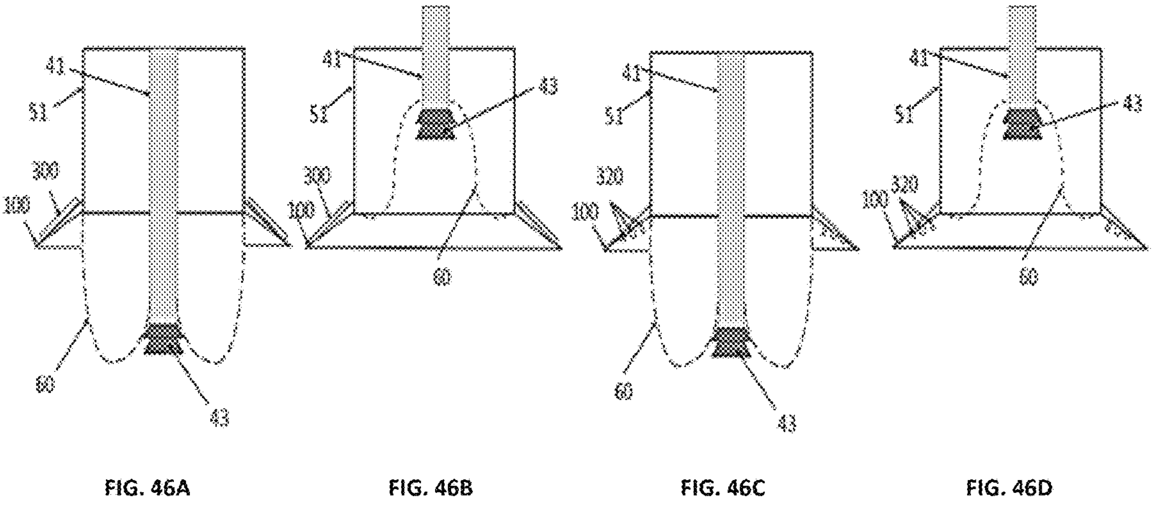
FIGS. 46A to 46D are line drawings that illustrate the incorporation of sensors or structures into the flexible flange for the detection of objects.

According to FIG. 45D, only the primary grasping device [20] is used to pick up the object [80], and the secondary suction interface [31] is displaced closer to the object [80]. Due to the softness of the deformable membrane [60] on the primary grasping device [20], the item [80] is still free to oscillate laterally. But the magnitude of such oscillation is limited by the secondary suction interface [31] as the object [80] will hit the secondary suction interface [31] if oscillating too much. In FIG. 45E, the secondary suction interface [31] is used for grasping the object [80] and the primary grasping device [20] may or may not be used. In this scenario, no lateral oscillation of the object [80] is allowed.

According to the disclosure, the rim cup cleats act as another form of support to farther stabilize items. When the item is picked up, the separation between cleats can get into cavities of the item and the item can deform the whole rim cup and help with stabilizing it better)

In another embodiment, in a scenario in which the secondary augmented gripping device [10] in the preferred embodiment as shown in FIG. 3, with its secondary suction interface [31] in the form of a flexible flange [100] with long cleats [101] as shown in FIG. 11 is used for grasping an object [80], the long cleats [101] can get into any cavities on the object [80] and pinch said cavities on the side, thus helping to stabilize the object [80] when it is picked up by the augmented gripping device [10].

Sensors for Detection of Objections

In another embodiment as shown in FIGS. 46A to 46D, sensors or structures can be used for the detection of objects. FIGS. 46A to 46D are line drawings that illustrate the incorporation of sensors or structures into the flexible flange for the detection of objects. According to FIGS. 46A to 46D, the secondary suction interface [31] can be used as a sensing device for detecting one or more of the following items: presence of external objects including bin walls and objects to be grasped [80], collision with external objects including bin walls and objects to be grasped [80], rigidity and stiffness of the object that the secondary suction interface [31] is colliding with, size of the object that the secondary suction interface [31] is colliding with, the texture of the object that the secondary suction interface [31] is colliding with, and the area of contact the secondary suction interface [31] made with the object.

And this can be achieved in a two-stage process. In the first stage, data containing information about the items desired to be detected is collected. To achieve this, one or more sensors such as strain gauges [300] or infrared sensors [300] as in FIG. 46A and FIG. 46B can be added to the secondary suction interface [31] to detect contact with object; or the secondary suction interface [31] can be made of a conductive polymer containing materials [320] such as carbon black, nanocarbon tubes, gold or silver nanoparticles, graphene, graphite as in FIG. 46C and FIG. 46D, such that upon contacting with an object, the conductivity and/or the capacity of the secondary suction interface [31] changes; or one or more vision system targets can be attached or painted onto the secondary suction interface [31] such that if the secondary suction interface [31] is colliding with an object, one or more vision system targets will be deformed together with the secondary suction interface [31], and an external vison system can detect the deformation in such vision system targets. Data is then collected from the strain gauges, the infrared sensor, the measured electrical characteristics of the secondary suction interface [31], and/or the vison system. In the second stage, such data is processed, for example by an artificial intelligence model, a heuristic model, a first-principle mathematical model, etc. to extract the information about the items desired to be detected.

In another embodiment of the augmented gripping device [10], the primary grasping device [20] is composed of a deformable membrane [60] attached to a membrane compartment wall [51]. The membrane [60] at least partially seals the membrane compartment [50]. The pressure within the at least partially sealed membrane compartment [50] may be adjusted by a membrane compartment pressure mechanism [72] utilizing suitable means such as a vacuum device, pump, valve or other such means. When paired with a sensing mechanism and a control mechanism, the pressure within the partially sealed chamber can be regulated.

The secondary grasping device [30] in this embodiment comprises a secondary suction interface [31] which is composed of a sealing element attached to, or near to, the exterior of the said partially sealed membrane compartment wall [51]. When grasping an object [80], the secondary suction interface [31] at least partially contacts the object [80] and delimits the outer limit of a sealed region [220]. When the deformable membrane [60] at least partially contacts the object [80], the boundary of the contact region between the deformable membrane [60] and the object [80] delimits the inner limit of the sealed region [220]. The contact region between the deformable membrane and the object, hence the sealed region [220], can be modified and adjusted by varying the pressure within the partially sealed membrane compartment [50] where increasing the pressure within the partially sealed membrane compartment [50] will cause the deformable membrane [60] to expand and stretch as it inflates. As the deformable membrane [60] expands, the contact area between the deformable membrane [60] and the object [80] will increase after contact between the deformable membrane [60] and the object [80] has been established.

In another embodiment, the primary grasping device [20] is composed of a membrane compartment [50] at least partially sealed by a deformable membrane [60]. Furthermore, the said deformable membrane [60] has at least one suction compartment [40] attached to the inner edge of the deformable membrane [60] which is referred to as the primary suction interface [43], where the relative position of the primary suction interface [43] with respect to the membrane compartment [50] is controlled by at least one actuator [52]. The at least partially sealed membrane compartment [50] is configured to allow the uninterrupted passage of the suction compartment [40] and primary suction interface [43] through the membrane compartment [50].

The pressure and direction of flow through the primary suction interface [43] can be controlled by means of a suction compartment pressure mechanism [71]. The secondary suction interface [31] is also configured to allow the uninterrupted passage of the suction compartment [40] and primary suction interface [43] through the secondary suction interface [31]. The suction compartment [40] is in fluid communication through the primary suction interface [43] to the region of space near the outer surface of the deformable membrane [60] and the region of space adjacent to the secondary suction interface [31] via the secondary suction device [120]. When grasping an object [80], a pressure differential can be set up between the primary suction interface [43] and the at least partially sealed membrane compartment [50] by adjusting the relative pressure of the suction compartment [40] and the at least partially sealed membrane compartment [50].

In yet another embodiment, the at least one suction compartment pressure mechanism [71] is configured to regulate the pressure of both the primary suction interface [43] and the secondary suction interface [31]. Similarly, the pressure within the at least partially sealed membrane compartment [50] is regulated by the membrane compartment pressure mechanism [72] which allows a pressure differential to be established across the deformable membrane [60].

In yet another embodiment, at least one secondary pressure mechanism [120] is configured to regulate the pressure adjacent to the secondary suction interface [31] through the venting ports [160] and separately from the primary suction device [43]. Fluid communication between the at least one secondary pressure mechanism [120] and the region of space adjacent to the secondary suction interface [31] is provided by at least one venting port [160] external to the at least one membrane compartment [50]. This allows a pressure differential to be established between the at least partially sealed membrane compartment [50] of the primary grasping device [20] and the region of space adjacent to the secondary suction interface [31] using at least one of the following: the suction compartment pressure mechanism [71], the secondary pressure mechanism [120].

In yet another embodiment, the pressure difference between the primary grasping interface [43] and the region of space adjacent to the secondary suction interface [31] and the suction compartment wall actuator [42] may be used, independently or collectively, to manipulate the shape of the at least one deformable membrane [60]. Manipulation of the shape of the at least one deformable membrane [60] can be used to ensure that at least one of the following suction ports is not occluded: primary suction interface [43] and the venting ports [16] on the secondary suction interface [31].

Furthermore, manipulation of the shape of the at least one deformable membrane [60] enables the formation of: one sealing region [220] delimited by the primary grasping interface [43]. The pressure within the sealing region [220] can be controlled by the suction compartment pressure mechanism [71]. Or one sealing region [223] delimited by the secondary suction interface [31]. The pressure within the sealing region [223] can be controlled by the secondary pressure mechanism [120]. In addition, there may be independent sealing regions when the at least one deformable membrane [60] or at least one primary suction interface [43] contacts and seals the object [80] in addition to the secondary suction interface [31]. In this case, the sealing regions comprises an inner suction region [220] delimited by the contact surface between the at least one deformable membrane [60] and the object [80]; and an outer suction region [223] is present when the secondary suction interface [31] contacts the object [80] and is delimited by both the contact area between the at least one deformable membrane [60] and the object [80] and the contact area between the object and the secondary suction interface [31].

As the pressure within the at least partially membrane sealed membrane compartment [50] is increases, the contact area between the deformable membrane [60] and the object [80] increases and the total area of each suction area may decrease. Similarly, if the pressure within the at least partially sealed membrane compartment [50] is decreased, the contact area between the at least one deformable membrane [60] and the object [80] will decrease and may become non-existent. When there is no contact between the at least one deformable membrane [60] and the object [80], the inner and outer suction regions [220] and [223] overlap and become a single suction region [220]. Similarly, the position of the primary suction interface [43] may be adjusted relative to the secondary suction interface [31] which also allows the contact area between the at least one deformable membrane [60] and the object [80] to be adjusted. Depending on the quality of the seal between the at least one deformable membrane [60] and the object [80] it is possible that leakage may occur between the inner suction region [220] and the outer suction region [223]. Furthermore, a third suction region [224] may be established that is wholly defined by the contact region between the at least one deformable membrane [60] and the object [80] and leakage between either, or both, of the inner [220] and or outer [223] suction regions.

In yet another embodiment, a pressure differential may be established across the deformable membrane [60] by lowering the pressure outside of the at least partially sealed membrane compartment [50] in order to generate a suction force towards the object [80] being grasped. The pressure outside the at least partially sealed membrane compartment [50] may be regulated by the suction compartment pressure mechanism [71] and the pressure inside the at least partially sealed membrane compartment [50] may be regulated by the membrane compartment pressure mechanism [72]. The desired pressure differential may be achieved by adjusting the pressure within the at least partially sealed membrane compartment [50] to be lower, equal to or greater than the pressure outside the at least partially sealed membrane compartment [50].

In one method of grasping an object using the secondary suction interface [31], the pressure within the at least partially sealed membrane compartment [50] is adjusted to be lower than the environmental pressure by using the membrane compartment pressure mechanism [72]. The pressure of the suction compartment [40] is decreased until it is lower than the environmental pressure but higher than the pressure within the at least partially sealed membrane compartment [50] by using the suction compartment pressure mechanism [71]. As a result, a pressure differences is established across the two sides of the at least one deformable membrane [60] such that the deformable membrane [60] is displaced towards the interior walls of the membrane compartment [50] and away from the object being grasped [80]. An actuator is used to displace the suction compartment along with the primary suction interface [43] towards at least one interior wall of the membrane compartment [50], further causing the deformable membrane [60] to be moved closer to the interior walls of the membrane compartment [50] and away from the object [80] to be grasped.

The displacement of the deformable membrane [60] allows the potential surface contact area between the deformable membrane [60] and the object [80] to be controlled and, if desired, eliminated or maximized. By eliminating the potential contact area between the at least one deformable membrane [60] and the object [80] the inner [220] and outer [223] suction regions are merged into a single suction region [220] delimited only by the outermost contact area between the secondary suction interface [31] and the object [80]. Displacing the augmented gripping device [10] towards said object [80] until the secondary suction interface [31] contacts the object [80] and a seal is created between the object and the secondary suction interface. The region sealed between the object, the secondary suction interface [31] and the outer surface of the deformable membrane [60] is in fluid communication with the suction compartment pressure mechanism [71] through the primary suction interface [43].

Figures 47A, 47B, 47C, 47D:
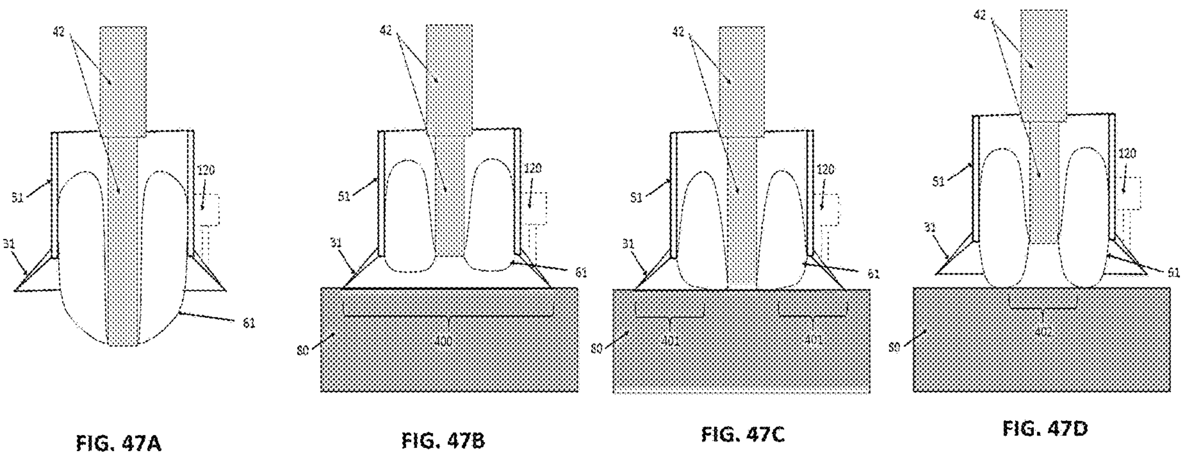
FIGS. 47A to 47F show an embodiment with different sealed areas it can form.
Figures 47E, 47F:
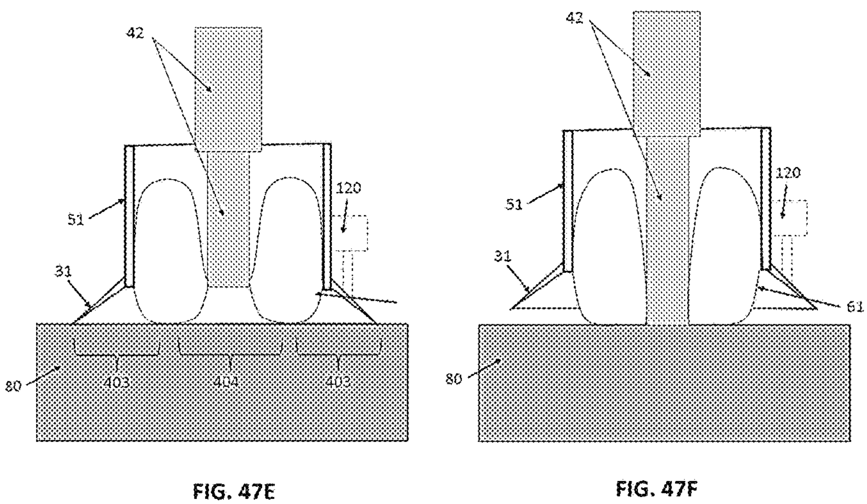

In yet another embodiment as in FIG. 47A, the augmented gripping device [10] is configured to pick up, manipulate and release objects [80], comprising: at least a rigid or flexible compartment wall [51], at least one deformable membrane [61] having genus 0, 1, 2 or g, torus, toroidal surface, surface with boundary, open surface, compact surface, non-compact surface, or surface with at least one hole; at least one actuation mechanism [52] connected to such deformable membrane [61] configured to at least deform or at least displace such deformable membrane [61] at least linearly, at least transversely, at least radially, at least rotationally, at least spirally, or at least normally; at least a suction interface [31] connected to a pressure mechanism [120] configured to at least generate suction or at least control the positive or negative pressure of such suction interface [31]; wherein such suction interface [31] is connected to such compartment wall [51]; wherein such deformable membrane [61] is configured to at least be housed by, or at least to be connected to, or at least to slide against to such membrane compartment wall [51]; wherein such deformable membrane [61] at least partially contain a compressible or incompressible fluid; wherein the geometry of such deformable membrane [61] changes responsive to pressure; wherein the suction interface [31] forms one large suction cup surrounding the deformable membrane [61]; wherein upon the augmented gripping device [10] contacts the object to be grasped [80], the at least suction interface [31] delimits at least one sealing region [110] between the suction interface [31] and the object; wherein the shape and area of the at least one sealing region [110] is dependent on the shape of the at least one deformable membrane [60] and can have the following configurations: at least one single area [400] where the perimeter of the area is solely defined by the contact between the suction interface [31] and the object [80] as in FIG. 47B; or at least one single area [401] having an outer perimeter defined by the contact between the suction interface [31] and the object [80] and an inner perimeter defined by the contact between the deformable membrane [61] and the object [80] as in FIG. 47C; or at least one single area [402] where the perimeter is solely defined by the contact between the deformable membrane [61] and the object as in FIG. 47D; or at least two areas, the first area [403] having an outer perimeter defined by the contact between the suction interface [31] and the object [80] and an inner perimeter defined by the contact between the deformable membrane [61] and the object [80], and a second area [404] where the perimeter is solely defined by the contact between the deformable membrane [61] and the object [80], as in FIG. 47E. In the case of FIG. 47D, if the actuator [42] is solid, the area [402] could have a negative pressure generated by the following process: firstly the gripping device [10] is brought to contact with the object [80] as in FIG. 47F, then the central part of the deformable membrane [61] is pulled up by the actuator [42], forming a negative pressure in the area [402] that can help picking up the object [80].

The pressure within the sealed region can be further depressurized by the suction compartment pressure mechanism [71]. When a steady-state pressure is reached within the sealed region [220], the pressure within the sealed region is lower than the environmental pressure but higher than the pressure within the at least partially sealed membrane compartment [50]. The pressure difference between the partially sealed membrane compartment [50] and the sealed region [220] is such that the deformable membrane [60] is further displaced towards the interior walls of the at least partially sealed membrane compartment [50] and works to keep the deformable membrane [60] away from the object [80]. The pressure within the sealed region of space [220], which is lower than the environmental pressure, acts on the surface of the object [80] generating a suction force on said object [80] and causing the object [80] to be grasped by the augmented gripping device [10]. Furthermore, the deformable membrane [60] does not contact the object [80] and the total suction area is wholly delimited by the contact area between the secondary suction interface [31] and the object [80].

In yet a further embodiment, the rim cup can be used for point cloud mapping. The lips of the rim cup touching any other item in the bin or the side of the bin will cause the lip to deform or flip up. And that can be used to determine the presence of an item there or used for collision avoidance. Sensor can be added to the rim cup to do the detection. The rim cup can be made of conductive polymer (e.g. carbon black, nanocarbon tubes, gold/silver nanoparticles, graphene, graphite) and then change its variation of conductivity to detect deformations (resistive sensor). Capacitive sensor and contact sensors can be used.

In yet a further embodiment, some structures or other polymers inside the lip of the rim cup which can help with detecting rigid versus deformable object (i.e., the rim cup deforms more when an object is deformable or stays close to its original shape when it is a rigid item). Sensor (i.e., IR sensor) can be used to detect if the object goes inside the rim cup. An artificial intelligent (AI) model may be used to monitor deformation of the rim cup to determine stiffness or other properties of the object to be picked up. Furthermore, the rim cup detects if the object is smaller than its diameter and estimates the size of the object.

According to the disclosure, a gripping apparatus configured to pick up, manipulate and release objects is disclosed. The apparatus comprises a housing or structural frame [2], a primary grasping device [20], a secondary grasping device, at least one deformable membrane [60] having an outer edge [65] attached to the membrane compartment wall [51] and an inner edge [66] attached to the suction compartment wall [41], forming at least a partially sealed membrane compartment [50], at least one membrane compartment wall actuator [52] adapted to displace the membrane compartment wall [51] relative to the housing [2] of the gripping apparatus, at least one pressure mechanism [70, 71 or 72, 120] configured to regulate the pressure inside the at least partially sealed membrane compartment or at least regulate the pressure of the suction assembly [40] of the primary grasping device [20], one or more guiding elements [47, 48, 49] for facilitating the movement of the membrane compartment wall [51] and the suction compartment wall [41] relative to the housing [2] and respective to each other.

According to the disclosure, the primary grasping device [20] further comprises a suction assembly [40], a suction compartment wall [41], a membrane compartment wall [51] and a primary suction interface [43] configured to grasp the object. The secondary grasping device [30] further comprises at least one secondary suction interface [31] in the form of a sealing element attached to the outside of and surrounding the membrane compartment wall [51] of the primary grasping device [20].

According to the disclosure, the membrane compartment wall [51] of the apparatus further comprises an opening [53] to accommodate the suction compartment wall [41] and wherein the suction assembly [40] is configured to move within the opening [53]. The secondary suction interface [31] forms one large suction cup surrounding the primary grasping device [20]. Upon the at least one secondary suction interface [31] contacting the object to be grasped, the at least one secondary suction interface [31] delimits at least one sealing region [110] between the secondary suction interface [31] and the object.

According to the disclosure, the shape and area of the at least one sealing region [110] of the apparatus is dependent on the shape of the at least one deformable membrane [60]. When said gripping apparatus is grasping an object [80], at least the primary suction interface [43] or at least the secondary grasping device [30] or at least the deformable membrane [60] simultaneously creates the sealing region [110]. The shape of the at least one deformable membrane [60] is affected by at least the pressure inside said at least one membrane compartment [50].

According to the disclosure, the guiding elements [47, 48, 49] of the apparatus is selected from a list consisting of rolling bearing, sliding bearing, bushing, seal, hydrostatic bearing, air bearing, magnetic bearing, superconductive levitation bearing, acoustic levitation bearing, or electrostatic bearing. The sealing element [46] of the apparatus is configured to seal the gap between the membrane compartment wall [51] and the suction compartment wall [41]. The sealing element of the apparatus can be combined with at least one of the guiding elements [47, 48, 49] to form a single element that serves both a guiding function and a sealing function. The apparatus further comprising an actuator [42] configured to move the suction assembly [40] relative to the housing [2].

According to the disclosure, the apparatus is configured wherein the pressure inside the at least one membrane compartment [50] is affected by the at least one pressure mechanism [72] and the pressure of the suction assembly [40] is affected by the at least one pressure mechanism [71], wherein the two pressure mechanism [71, 72] are independently controlled. The apparatus facilitates the movement of the membrane compartment wall [51] and the suction compartment wall [41] relative to the housing [2] and respective to each other, wherein respective to each other further comprising one item moves and the other item stays stationary or both items move.

According to the disclosure, the secondary grasping device [30] of the apparatus further comprising at least a venting port [160] configured to modify the properties within a flange compartment [110], wherein such venting port [160] is at least connected to an independent pressure mechanism [120], or at least in fluid communication with the pressure mechanism [71] configured to regulate the pressure of the suction assembly [40] of the primary grasping device [20], or at least to a valve [191] regulating pressure flow [192]. Each venting port [160] is connected to a different suction area [131] within the flange compartment [100].

According to the disclosure, the secondary suction interface [31] of the apparatus is configured as at least a flexible flange, sponge, foam, or fabric [100]. The membrane compartment wall [51] of the apparatus has an opening [53] wherein the opening [53] is configured to enable the suction compartment wall [41] to slide through the membrane compartment [50], wherein the sealing element [46] is configured to seal the gap between the membrane compartment wall [51] and the suction compartment wall [41]. The shape of the deformable membrane [60] of the apparatus is dependent of the movement and position of the primary suction interface [43] relative to the membrane compartment wall [51], such that grasping with the membrane is dependent on the movement or engagement of the primary suction interface.

According to the disclosure, the mode of operation of the secondary grasping device [30] of the apparatus only wherein the vacuum of the secondary suction interface [31] is formed from the suction assembly [40], the operation of the secondary grasping device [30] is dependent on the position of the primary suction interface [43], the pressure of primary suction interface [43], the pressure of the membrane compartment [50], and position and shape of the deformable membrane [60]. At least the primary suction interface [43], or at least the secondary suction interface [31] or at least the deformable membrane [60] when grasping [80] an object simultaneously creates the sealing region [110]. The different vacuum areas are formed by at least the secondary suction interface [31] alone, at least between the secondary suction interface [31] and the deformable membrane [60], at least the deformable membrane [60] alone, at least between the deformable membrane [60] and the primary suction interface [43], or at least the primary suction interface [43] alone.

According to the disclosure, a method for grasping an object, using a gripping apparatus, the gripping apparatus comprising a primary grasping device [20], a suction assembly [40], a secondary grasping device [30], a primary suction interface [43], a secondary suction interface [31] and at least one deformable membrane [60] is disclosed. The method comprising the steps of depressurizing a membrane compartment [50] of the apparatus using a membrane compartment pressure mechanism [72] to a pressure lower than the pressure in the environment, using a suction compartment pressure mechanism [71] to depressurize a suction compartment to a pressure equal or lower than the pressure in the environment but higher than the pressure in the membrane compartment [50], creating a pressure difference on two sides of the deformable membrane [60] wherein the pressure in the membrane compartment [50] becomes lower than the pressure of the region of space on the side of the deformable membrane [60] that is external to said membrane compartment [50], whereby the pressure difference affects the shape of the deformable membrane [60] wherein the deformable membrane [60] is sucked into the membrane compartment [50] and pushed against the internal wall of said membrane compartment [50] or other components inside the membrane compartment [50] and away from said object to be grasped, displacing the suction compartment relative to the membrane compartment [50] in the direction that is away from said object to be grasped, so that said secondary grasping interface [31] becomes the closest component on the gripping apparatus from the object, displacing the gripping apparatus towards the object until the secondary suction interface [31] contacts the object and seals a region of space on the side of the deformable membrane [60] that is on the outside of the membrane compartment [50] from the environment wherein the sealing region [110] of space is in fluid communication with a suction compartment pressure mechanism [71] through a primary suction interface [43], and depressurizing the sealing region [110] of space by the suction compartment pressure mechanism, whereby a steady state is reached, the pressure inside the sealing region [110] of space drops to become lower than the pressure in the environment but higher or equal to than the pressure in the membrane compartment [50] and the pressure difference between the two sides of the deformable membrane [60] at least pushes the deformable membrane [60] against the inside of the wall of the membrane compartment [50] and keeps the deformable membrane [60] away from the object, or at least keep the deformable membrane [60] not touching either the membrane compartment wall [51] or the object [80],or at least keep the deformable membrane [60] away from the primary suction interface [43], or at least prevents the deformable membrane [60] to clog the primary suction interface [43].

According to the disclosure, the pressure in the sealing region [110] of space the method, which is lower than environment pressure, acts on the surface of the object and is not obstructed by the deformable membrane [60], thereby generating a suction force on the object and causing the object to be grasped by the gripping apparatus. The mode of operation of the secondary grasping device [30] only and the vacuum is formed from the suction assembly [40], the operation of the secondary grasping device [30] is dependent on the position of primary suction interface [43], the pressure of primary suction interface [43] and pressure of the membrane compartment [50].

According to the disclosure, at least the primary suction interface [43], or at least the secondary suction interface [31] or at least the deformable membrane [60] when grasping [80] an object simultaneously creates the sealing region [110]. The different vacuum areas are formed by the secondary suction interface [31] alone, between the secondary suction interface [31] and the deformable membrane [60], the deformable membrane [60] and the primary suction interface [43], or the primary suction interface [43] alone.

According to the disclosure, the method further comprising the primary grasping device [20] and the secondary grasping device [30] engage the object through application of forces generally along the same direction. The secondary grasping device [30] is dependent of the primary grasping device [20] such that movement of the secondary grasping device [30] is dependent on engagement or movement of the primary grasping device [20]; wherein such dependency is provided by at least such deformable membrane [60] which mechanically connects the secondary grasping device [30] to the to the primary grasping device [20]. The deformable membrane [60] is an open surface where its edge [65] is mechanically connected to the membrane compartment wall [51], wherein such deformable membrane [60] has a membrane hole [67] with a hole edge [66], wherein such hole edge [66] is mechanically connected to said suction compartment wall [41].

According to the disclosure, the other components inside the membrane compartment further comprises sensors, cables, actuators, valves, tubes, wires, covers and guide mechanisms.

According to the disclosure, a gripping apparatus configured to pick up, manipulate and release objects is disclosed. The apparatus comprises a primary grasping device [20], an actuator component configured to at least provide or at least regulate the pressure of such fluid, a secondary grasping device [30] comprising at least one secondary suction interface [31] and is configured to surround such primary grasping device [20].

The a primary grasping device [20] further comprises a suction assembly [40] configured to provide positive or negative air pressure, a deformable membrane [60] having genus 0, 1, 2 or g, torus, toroidal surface, surface with boundary, open surface, compact surface, non-compact surface, or surface with at least one hole [61] disposed to surround at least a portion of such suction assembly [40], wherein the geometry of such deformable membrane [61] changes responsive to pressure, a compressible or incompressible fluid or particles at least partially contained by such deformable membrane [61].

According to the disclosure, the at least one secondary suction interface [31] of the apparatus contacting the object to be grasped, the at least one secondary suction interface [31] delimits at least one sealing region [110] between the secondary suction interface [31] and the object. When the grasping apparatus is grasping an [80] object, at least the primary suction interface [43] or at least the secondary grasping device [30] or at least the deformable membrane [61] simultaneously to create the sealing region [110].

According to the disclosure, the actuator component of the apparatus is connected to and disposed about an outer surface of the deformable membrane [61]. The actuator is configured to actuate such deformable membrane [61] at least linearly, at least transversely, at least radially, at least rotationally, at least spirally, or at least normally. The actuator is configured to actuate the secondary grasping device [30] at least linearly, at least transversely, at least radially, at least rotationally, at least spirally, or at least normally.

According to the disclosure, a gripping apparatus configured to pick up, manipulate and release objects is disclosed. The apparatus comprises at least a rigid or flexible compartment wall [51], at least one deformable membrane [61] having genus 0, 1, 2 or g, torus, toroidal surface, surface with boundary, open surface, compact surface, non-compact surface, or surface with at least one hole [61], at least one actuation mechanism [52] connected to such deformable membrane [61] configured to at least deform or at least displace such deformable membrane [61] at least linearly, at least transversely, at least radially, at least rotationally, at least spirally, or at least normally, at least a suction interface [31] connected to a device [120] configured to at least generate suction or at least control the positive or negative pressure of such suction interface [31].

According to the disclosure, the suction interface [31] of the apparatus is connected to such compartment wall [51]. The deformable membrane [61] is configured to at least be housed by, or at least to be connected to, or at least to slide against to such membrane compartment wall [51]. The deformable membrane [61] at least partially contain a compressible or incompressible fluid. The geometry of such deformable membrane [61] changes responsive to pressure. The suction interface [31] forms one large suction cup surrounding the deformable membrane [61]. Upon the gripping apparatus contacts the object to be grasped, the at least suction interface [31] delimits at least one sealing region [110] between the suction interface [31] and the object. The shape and area of the at least one sealing region [110] is dependent on the shape of the at least one deformable membrane [60].

According to the disclosure, the sealing region [110] of the apparatus is configured as at least one single area where the perimeter of the area is solely defined by the contact between the suction interface [31] and the object, or at least one single area having an outer perimeter defined by the contact between the suction interface [31] and the object and an inner perimeter defined by the contact between the deformable membrane [60] and the object, or at least one single area where the perimeter is solely defined by the contact between the deformable membrane [60] and the object, or at least two areas, the first area having an outer perimeter defined by the contact between the suction interface [31] and the object and an inner perimeter defined by the contact between the deformable membrane [60] and the object, and a second area where the perimeter is solely defined by the contact between the deformable membrane [60] and the object.

According to the disclosure, the apparatus further comprises a valve [190] that regulates the flow between the membrane compartment [50] and the suction assembly [40] wherein the valve is closed after the apparatus forms a seal with the object.

According to the disclosure, the secondary grasping device [30] of the apparatus further comprises at least one sensor [300] configured to collect data regarding changes in the properties of said secondary suction interface [31], or detect at least collision with external object, or at least the size of the colliding external object, or at least the stiffness of said colliding external object, or at least the texture of said colliding external object. The secondary suction interface [31] can be made out of elastically conductive material acting as a sensor [300] and is selected from a list including carbon particles, graphene, graphane, graphite, silver particles, gold particles, carbon black and nano-carbon tubes.

According to the disclosure, a gripping apparatus configured to pick up, manipulate and release objects is disclosed. The apparatus comprises a primary grasping device and a secondar grasping device. The primary grasping device further comprises at least one deformable membrane having an outer edge is attached to a wall of at least one membrane compartment, and at least partially sealing said membrane compartment, at least one membrane compartment pressure mechanism configured to regulate the pressure inside the said at least partially sealed membrane compartment. The secondary grasping device comprises at least one secondary suction interface in the form of a sealing element attached to the outside of an outer wall of said membrane compartment.

According to the disclosure, upon said at least one secondary suction interface contacting with an object to be grasped, said at least one secondary suction interface delimits at least one sealing region between said secondary suction interface and said object. The shape and area of said at least one sealing region is dependent on the shape of said at least one deformable membrane. The shape of said at least one deformable membrane is affected by at least the pressure inside said at least one membrane compartment. The pressure inside said at least one membrane compartment is affected by said at least one membrane compartment pressure mechanism.

According to the disclosure, the apparatus further comprises at least one suction compartment, which is attached to an inner edge of said at least one deformable membrane near one open end, and said open end is referred to as the primary suction interface, at least one actuator configured to change the relative position between said at least one membrane compartment and said at least one suction compartment and at least one suction compartment pressure mechanism configured to regulate the pressure inside the said at least one suction compartment.

According to the disclosure, the said membrane compartment is configured to allow the uninterrupted passage of the suction compartment through the said membrane compartment. The said secondary suction interface is configured to allow the uninterrupted passage of the suction compartment through the said secondary suction interface.

According to the disclosure, the said at least one suction compartment is in fluid communication through said primary suction interface with the region of space on the side of said at least one deformable membrane that is external to the said at least one membrane compartment and the region of space adjacent to said secondary suction interface. Furthermore, a pressure difference can be created between the at least partially sealed membrane compartment of the primary gripping interface and the region of space adjacent to said secondary suction interface by using the said at least one membrane compartment pressure mechanism and at least one suction compartment pressure mechanism.

According to the disclosure, the apparatus further comprises at least one suction compartment pressure mechanism configured to regulate the pressure in the region of space on the side of said at least one deformable membrane that is external to the said at least one membrane compartment. The pressure on the side of the said at least one deformable membrane that is internal to the said at least one membrane compartment is actively controlled by the said membrane compartment pressure mechanism. The pressure on the side of the said at least one deformable membrane that is external to the said at least one membrane compartment is actively controlled by the said suction compartment pressure mechanism.

According to the disclosure, the apparatus further comprises at least one secondary pressure mechanism configured to regulate the pressure in the region of space adjacent to said secondary suction interface and external to the said at least one membrane compartment and the region of space on the side of the said at least one deformable membrane that is external to the said at least one membrane compartment and at least one venting port on said at least one secondary suction interface establishing fluid connection between said at least one secondary pressure mechanism and the region of space adjacent to said secondary suction interface and external to the said at least one membrane compartment. The pressure difference can be created between the at least partially sealed chamber of the primary gripping interface and the region of space adjacent to said secondary suction interface by using the said at least one membrane compartment pressure mechanism and at least said at least one suction compartment pressure mechanism or at least said at least one secondary pressure mechanism.

According to the disclosure, the apparatus further comprising manipulation of the shape of said at least one deformable membrane ensures that at least said primary suction interface of said at least one suction compartment, or at least said at least one venting port on the secondary suction interface are not occluded by said at least one deformable membrane.

According to the disclosure, the manipulation of the shape of said at least one deformable membrane enables the creation of said sealing regions selected from a list consisting of one sealing region delimited by said primary suction interface, whose pressure can be controlled by said suction compartment pressure mechanism, one sealing region delimited by said secondary suction interface, whose pressure can be controlled by said suction compartment pressure mechanism, or said secondary pressure mechanism, two sealing regions, where one is delimited by said primary suction interface, whose pressure can be controlled by said suction compartment pressure mechanism; and the other covers the region between said primary suction interface and said secondary suction interface, whose pressure can be controlled by said secondary pressure mechanism, two sealing regions, where one covers an area delimited by the internal boundary of a region where said deformable membrane contacts with said object to be grasped, whose pressure can be controlled by said suction compartment pressure mechanism; and the other covers a region delimited by the external boundary of said region where said deformable membrane contacts with said object to be grasped and said secondary suction interface, whose pressure can be controlled by said secondary pressure mechanism; and the size and shape of said two sealing regions can change depending on at least the shape of the deformable membrane or the shape of the object and three sealing regions, where one is delimited by said primary suction interface, whose pressure can be controlled by said suction compartment pressure mechanism; another one covers a region outside of said primary suction interface but delimited by the internal boundary of a region where said deformable membrane contacts with said object to be grasped, whose pressure is affected by leakage from other sealing regions, from said membrane compartment, and from the environment; and yet another one covers a region delimited by the external boundary of a region where said deformable membrane contacts said object to be grasped and said secondary suction interface, whose pressure can be controlled by said secondary pressure mechanism; and the size of the latter two regions can change depending on the shape of the deformable membrane. The most suitable form of said sealing regions can be chosen and created to grasp an object based on the size, shape and weight of the object to be grasped.

According to the disclosure, the pressure difference of the apparatus is achieved by the pressure on the side of said deformable membrane that is external to said membrane compartment is desired to be lower than that of the pressure in the environment in order to generate a suction force towards said object to be grasped, and said pressure is regulated by at least one of the following: at least said suction compartment pressure mechanism or at least said secondary pressure mechanism, and the pressure inside the membrane compartment is desired to be lower, equal to, or higher than the actual pressure on the side of said deformable membrane that is external to said membrane compartment, dependent on the said form of said sealing regions that is desired to be created, and said pressure is regulated by said membrane compartment pressure mechanism.

According to the disclosure, a method for grasping an object using a secondary suction interface of a gripping apparatus, the apparatus comprising a primary grasping device and at least one secondary grasping device is disclosed. The method comprising the steps of depressurizing a membrane compartment of the apparatus using a membrane compartment pressure mechanism to a pressure lower than the pressure in the environment, using a suction compartment pressure mechanism to depressurize said suction compartment to a pressure equal or lower than the pressure in the environment but higher than the pressure in said membrane compartment, creating a pressure difference on two sides of said deformable membrane whereby as the pressure in said membrane compartment becomes lower than the pressure of the region of space on the side of said deformable membrane that is external to said membrane compartment, whereby the pressure difference affect the shape of said membrane wherein said deformable membrane is sucked into said membrane compartment and pushed against the internal wall of said membrane compartment, and away from said object to be grasped, displacing said suction compartment relative to the membrane compartment in the direction that is away from said object to be grasped, so that said secondary grasping interface becomes the closest component on said gripping device from said object, displacing said gripping device towards said object until said secondary suction interface contacts said object and sealing a region of space on the side of said deformable membrane that is on the outside of said membrane compartment from the environment wherein said sealed region of space is in fluid communication with said suction compartment pressure mechanism through said primary suction interface, depressurizing said sealed region of space by said still-activated suction compartment pressure mechanism, whereby a steady state is reached, the pressure inside said seal region of space drops to become lower than the pressure in the environment but higher than the pressure in said membrane compartment and the pressure difference between the two sides of said deformable membrane pushes said deformable membrane against the inside of the wall of said membrane compartment and keeps said deformable membrane away from said object. The pressure in said sealed region of space, which is lower than environment pressure, acts on the surface of said object and is not obstructed by the membrane and generating a suction force on said object and causing said object to be grasped by said gripping device.

According to the disclosure, a gripping apparatus configured to pick up, manipulate and release objects is disclosed. The apparatus comprises a primary grasping device comprises and a secondary grasping device. The primary grasping device comprises at least one deformable membrane whose outer edge is attached to a wall of at least one membrane compartment, and at least partially sealing said membrane compartment, at least one suction compartment, which is attached to an inner edge of said at least one deformable membrane near one open end, and said open end is referred to as the primary suction interface, at least one actuator configured to change the relative position between said at least one membrane compartment and said at least one suction compartment, at least one suction compartment pressure mechanism configured to regulate the pressure inside the said at least one suction compartment, and at least one valve that regulates the fluid communication between said at least one suction compartment pressure mechanism and said at least one membrane compartment.

According to the disclosure, the secondary grasping device further comprises at least one secondary suction interface in the form of a sealing element attached to the outside of an outer wall of said membrane compartment. Upon said at least one secondary suction interface contacting with an object to be grasped, said at least one secondary suction interface delimits at least one sealing region between said secondary suction interface and said object. The shape and area of said at least one sealing region is dependent on the shape of said at least one deformable membrane and the position of said at least one suction compartment relative to the membrane compartment. The shape of said at least one deformable membrane is affected by at least the pressure inside said at least one membrane compartment and the position of said at least one suction compartment relative to the membrane compartment. Furthermore, the pressure inside said at least one membrane compartment is affected by the position of said at least one suction compartment relative to the membrane compartment, by said at least one valve, and by at least one suction compartment pressure mechanism through the said valve.

According to the disclosure, a method for grasping an object using a secondary suction interface of a gripping apparatus, the apparatus comprising a primary grasping device and at least one secondary grasping device is disclosed. The method comprising the steps of depressurizing said membrane compartment using said suction compartment pressure mechanism by the following two steps in any order opening said valve to establish fluid communication between said suction compartment pressure mechanism and said membrane compartment, activating said suction compartment pressure mechanism to depressurize both said suction compartment to a pressure which is equal or lower to the ambient pressure, and, through said valve, the membrane compartment, creating a pressure difference on two sides of said deformable membrane is generated as the pressure in said membrane compartment becomes lower than the pressure of the region of space on the side of said deformable membrane that is external to said membrane compartment. Such pressure difference affects the shape of said membrane that said deformable membrane is sucked into said membrane compartment, pushed against the internal wall of said membrane compartment, and away from said object to be grasped, displacing said suction compartment relative to the membrane compartment in the direction that is away from said object to be grasped, so that said secondary grasping interface becomes the closest component on said gripping device from said object, displacing said gripping device towards said object until said secondary suction interface contacts said object and sealing a region of space on the side of said deformable membrane that is on the outside of said membrane compartment from the environment and said sealed region of space is in fluid communication with said suction compartment pressure mechanism through said primary suction interface, depressurizing said sealed region of space by said still-activated suction compartment pressure mechanism whereby when steady state is reached, the pressure inside said sealed region of space drops to become equal to the pressure in said membrane compartment, so that the pressure difference between the two sides of said deformable membrane becomes close or null, and said deformable membrane maintains its shape of being away from said object and the low-than-environment pressure in said sealed region of space acts on the surface of said object and is not obstructed by the membrane, generating a suction force on said object and causing said object to be grasped by said gripping device.

According to the disclosure, the method further comprising closing said valve after said item is grasped whereby cutting the fluid communication between said suction compartment pressure mechanism and said membrane compartment.

According to the disclosure, the apparatus further comprises at least one venting port on said at least one secondary suction interface further comprising at least one sealing element, so that when said at least one secondary suction interface is in contact with said object to be grasped, said at least one sealing element for said at least one venting port forms at least one sub sealing region within the sealing region formed by said at least one secondary suction interface.

According to the disclosure, the apparatus further comprising at least one sealing element for at least one venting port on said at least one secondary suction interface comprises small overlapping pieces arranged all-around said at least one venting port. The small overlapping pieces can flip away and separate from each other when said deformable membrane inflates and touches said small overlapping pieces, thus not obstructing the deformation of said deformable membrane. The small overlapping pieces can press against each other, forming a continuous sealing element around said venting port, when said venting port is depressurized.

According to the disclosure, the secondary suction interface of the apparatus further comprises at least one sensor. The at least one sensor can collect data regarding changes in the properties of said secondary suction interface. The data can be processed by an algorithm to detect at least collision with external object, or at least the size of said colliding external object, or at least the stiffness of said colliding external object, or at least the texture of said colliding external object.

According to the disclosure, the secondary suction interface of the apparatus is made of a conductive material, wherein said at least one sensor collects data regarding changes in the electrical properties of said secondary suction interface. The data is processed by an algorithm to detect at least the collision of said secondary suction interface with an external object, or at least the size of said colliding external object, or at least the stiffness of said colliding external object, or at least the texture of said colliding external object, or at least the area of contact the secondary suction interface makes with the external object.

According to the disclosure, a gripping apparatus configured to pick up, manipulate and release objects is disclosed. The apparatus further comprises a primary grasping device and a secondary grasping device. The primary grasping device further comprises at least one suction compartment that is in fluid communication with the environment at one open end, and said open end is referred to as the primary suction interface, at least one suction compartment pressure mechanism configured to regulate the pressure inside the said at least one suction compartment and at least one actuator configured to displace said at least one suction compartment relative to said secondary grasping device.

According to the disclosure, the secondary grasping device further comprises at least one secondary suction interface in the form of a sealing element surrounding said primary grasping device. Upon said at least one secondary suction interface contacting with an object to be grasped, said at least one secondary suction interface delimits at least one sealing region between said secondary suction interface and said object. The shape and area of said at least one sealing region is dependent on the position of said at least one suction compartment relative to said secondary suction interface.

According to the disclosure, a gripping apparatus configured to pick up, manipulate and release objects is disclosed. The apparatus further comprises a primary grasping device and a secondary grasping device. The primary grasping device further comprises at least one membrane having genus 0, 1, 2 or g, torus, toroidal surface, surface with boundary, open surface, compact surface, or non-compact surface which encloses at least partially a region of space referred to as a membrane compartment. The secondary grasping device, further comprises at least one secondary suction interface in the form of a sealing element surrounding said primary grasping device. The secondary grasping device is on the outside of the primary grasping device.

According to the disclosure, at least one suction compartment of the apparatus is located at about the center of said membrane and at least one suction compartment pressure mechanism configured to regulate the pressure inside said at least one suction compartment.

According to the disclosure, at least one actuator of the apparatus is to displace said membrane through at least one actuation component that is in contact with at least a portion of said actuator and said membrane and at least one membrane compartment pressure mechanism configured to regulate the pressure inside said at least one membrane compartment. The actuation component forms at least one fluid connection between said membrane compartment and said at least one membrane compartment pressure mechanism. Upon said at least one secondary suction interface contacting with an object to be grasped, said at least one secondary suction interface delimits at least one sealing region between said secondary suction interface and said object.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A gripping apparatus configured to pick up, manipulate and release objects, comprising:
- a housing or structural frame;
- a primary grasping device comprising:
  - a suction assembly;
  - a suction compartment wall;
  - a membrane compartment wall;
  - a primary suction interface configured to grasp the object;
  - at least one deformable membrane having an outer edge attached to the membrane compartment wall and an inner edge attached to the suction compartment wall, forming at least a partially sealed membrane compartment;

at least one membrane compartment wall actuator adapted to displace the membrane compartment wall relative to the housing of the gripping apparatus;

at least one pressure mechanism configured to regulate pressure inside the at least partially sealed membrane compartment or at least regulate pressure of the suction assembly of the primary grasping device;

one or more guiding elements for facilitating movement of the membrane compartment wall and the suction compartment wall relative to the housing and respective to each other;

at least one secondary grasping device comprising:

at least one secondary suction interface comprising a sealing element attached to an outside of and surrounding the membrane compartment wall of the primary grasping device;

wherein the membrane compartment wall further comprises an opening to accommodate the suction compartment wall and wherein the suction assembly is configured to move within the opening;

wherein the secondary suction interface forms one large suction cup surrounding the primary grasping device;

wherein upon the at least one secondary suction interface contacting the object to be grasped, the at least one secondary suction interface delimits at least one sealing region between the secondary suction interface and the object;

wherein a shape and area of the at least one sealing region is dependent on a shape of the at least one deformable membrane;

wherein when the gripping apparatus is grasping an object, at least the primary suction interface or at least the secondary grasping device or at least the deformable membrane simultaneously creates the sealing region;

wherein the shape of the at least one deformable membrane is affected by at least the pressure inside the at least one membrane compartment.

2. The apparatus of claim 1, wherein the one or more guiding elements are selected from a group consisting of rolling bearing, sliding bearing, bushing, seal, hydrostatic bearing, air bearing, magnetic bearing, superconductive levitation bearing, acoustic levitation bearing, and electrostatic bearing.

3. The apparatus of claim 1, wherein a sealing element is configured to seal a gap between the membrane compartment wall and the suction compartment wall.

4. The apparatus of claim 3, wherein the one or more guiding elements are selected from a group consisting of rolling bearing, sliding bearing, bushing, seal, hydrostatic bearing, air bearing, magnetic bearing, superconductive levitation bearing, acoustic levitation bearing, and electrostatic bearing, and wherein the sealing element can be combined with at least one of the guiding elements to form a single element that serves both a guiding function and a sealing function.

5. The apparatus of claim 1, further comprising an actuator configured to move the suction assembly relative to the housing.

6. The apparatus of claim 1, wherein pressure inside the at least one membrane compartment is affected by one pressure mechanism of the at least one pressure mechanism and the-pressure of the suction assembly is affected by another pressure mechanism of the at least one pressure mechanism, wherein the two pressure mechanisms are independently controlled.

7. The apparatus of claim 1, wherein the apparatus facilitates the movement of the membrane compartment wall and the suction compartment wall relative to the housing and respective to each other, wherein respective to each other further comprises one item moves and the other item stays stationary or both items move.

8. The apparatus of claim 1, wherein the secondary grasping device further comprises at least a one venting port configured to modify one or more properties within a flange compartment, wherein the venting port is at least connected to an independent pressure mechanism, or at least in fluid communication with the pressure mechanism configured to regulate the pressure of the suction assembly of the primary grasping device, or at least connected to a valve regulating pressure flow.

9. The apparatus of claim 8, wherein the at least one venting port comprises a plurality of venting ports, and each venting port of the plurality of venting ports is connected to a different suction area within the flange compartment.

10. The apparatus of claim 1, wherein the secondary suction interface is selected from the group consisting of a flexible flange, sponge, foam, and fabric.

11. The apparatus of claim 1, wherein the membrane compartment wall has an opening, wherein the opening is configured to enable the suction compartment wall to slide through the membrane compartment, wherein the sealing element is configured to seal a gap between the membrane compartment wall and the suction compartment wall.

12. The apparatus of claim 1, wherein the shape of the deformable membrane is dependent on movement and a position of the primary suction interface relative to the membrane compartment wall, wherein grasping with the membrane is dependent on movement or engagement of the primary suction interface.

13. The apparatus of claim 1, wherein a vacuum of the secondary suction interface is formed from the suction assembly, and wherein operation of the secondary grasping device is dependent on a position of the primary suction interface, a pressure of the primary suction interface, a pressure of the membrane compartment, and a position and shape of the deformable membrane.

14. The apparatus of claim 1, wherein at least the primary suction interface, or at least the secondary suction interface, or at least the deformable membrane when grasping an object creates the sealing region.

15. The apparatus of claim 1, wherein different vacuum areas are formed by one selected from the group consisting of at least the secondary suction interface alone, at least between the secondary suction interface and the deformable membrane, at least the deformable membrane alone, at least between the deformable membrane and the primary suction interface, and at least the primary suction interface alone.

16. The apparatus claim 1, further comprising a valve that regulates flow between the membrane compartment and the suction assembly wherein the valve is closed after the apparatus forms a seal with the object.

17. The apparatus of claim 1, wherein the secondary grasping device further comprises at least one sensor configured to:

collect data regarding changes in properties of the secondary suction interface; or detect at least collision with an external object, or at least a size of a colliding external object, or at least stiffness of the colliding external object, or at least texture of the colliding external object;

wherein the secondary suction interface is constructed from one member selected from a group consisting of carbon particles, graphene, graphane, graphite, silver particles, gold particles, carbon black, and carbon nanotubes.

18. A method for grasping an object, using a gripping apparatus, the gripping apparatus comprising a primary grasping device, a suction assembly, a secondary grasping device, a primary suction interface, a secondary suction interface, and at least one deformable membrane, the method comprising the steps of:

depressurizing a membrane compartment of the apparatus using a membrane compartment pressure mechanism to a pressure lower than the pressure in the environment;

using a suction compartment pressure mechanism to depressurize a suction compartment to a pressure equal or lower than pressure in the environment but higher than the pressure in the membrane compartment;

creating a pressure difference on two sides of the deformable membrane wherein the pressure in the membrane compartment becomes lower than a pressure of a region of space on a side of the deformable membrane that is external to the membrane compartment, whereby the pressure difference affects a shape of the deformable membrane wherein the deformable membrane is sucked into the membrane compartment and pushed against an internal wall of the membrane compartment or other components inside the membrane compartment and away from the object to be grasped;

displacing the suction compartment relative to the membrane compartment in a direction that is away from the object to be grasped, so that the secondary grasping interface becomes the closest component on the gripping apparatus to the object;

displacing the gripping apparatus towards the object until the secondary suction interface contacts the object and seals a region of space on a side of the deformable membrane that is outside the membrane compartment from a side where the sealing region of space is in fluid communication with a suction compartment pressure mechanism through a primary suction interface; and depressurizing the sealing region of space by the suction compartment pressure mechanism, whereby a steady state is reached, the pressure inside the sealing region of space drops to become lower than the pressure in the environment but higher than or equal to than the pressure in the membrane compartment and the pressure difference between the two sides of the deformable membrane at least pushes the deformable membrane against the inner wall of the membrane compartment and keeps the deformable membrane away from the object, or at least prevents the deformable membrane from touching either the membrane compartment wall or the object, or at least keeps the deformable membrane away from the primary suction interface, or at least prevents the deformable membrane from clogging the primary suction interface;

wherein pressure in the sealing region of space, which is lower than environmental pressure, acts on the a surface of the object and is not obstructed by the deformable membrane, thereby generating a suction force on the object and causing the object to be grasped by the gripping apparatus.

19. The apparatus of claim 18, wherein a vacuum is formed from the suction assembly, and wherein operation of the secondary grasping device is dependent on a position of the primary suction interface, pressure of the primary suction interface, and pressure of the membrane compartment.

20. The method of claim 18, wherein at least the primary suction interface, or at least the secondary suction interface, or at least the deformable membrane when grasping an object creates the sealing region.

21. The method of claim 20, wherein when the grasping apparatus is grasping an object, at least two of the group consisting of the primary suction interface, the secondary grasping device, and the deformable membrane simultaneously operate to create the sealing region.

22. The method of claim 18, wherein different vacuum areas are formed by the secondary suction interface alone, between the secondary suction interface and the deformable membrane, the deformable membrane and the primary suction interface, or the primary suction interface alone.

23. The method of claim 18, wherein the primary grasping device and the secondary grasping device engage the object through application of forces generally along the a same direction;

wherein the secondary grasping device is dependent on the primary grasping device, wherein movement of the secondary grasping device is dependent on engagement or movement of the primary grasping device; wherein the dependency is provided by at least the deformable membrane which mechanically connects the secondary grasping device to the primary grasping device;

wherein the deformable membrane is an open surface where its edge is mechanically connected to the membrane compartment wall, wherein the deformable membrane has a membrane hole with a hole edge, wherein the hole edge is mechanically connected to the suction compartment wall.

24. The method of claim 18, wherein the other components inside the membrane compartment are selected from the group consisting of sensors, cables, actuators, valves, tubes, wires, covers, and guide mechanisms.

25. A gripping apparatus configured to pick up, manipulate, and release objects, comprising:

a primary grasping device comprising:

a suction assembly configured to provide positive or negative air pressure;

a deformable membrane wherein a geometry of such deformable membrane changes responsive to pressure;

a compressible or incompressible fluid or particles at least partially contained by the deformable membrane;

an actuator component configured to at least provide or at least regulate pressure of the fluid, wherein the actuator is configured to actuate the deformable membrane by one of the group consisting of at least linearly, at least transversely, at least radially, at least rotationally, at least spirally, and at least normally;

at least one secondary grasping device comprising at least one secondary suction interface;

wherein the secondary grasping device is configured to surround the primary grasping device;

wherein upon the at least one secondary suction interface contacting the object to be grasped, the at least one secondary suction interface delimits at least one sealing region between the secondary suction interface and the object;

wherein when the grasping apparatus is grasping an object, at least the primary suction interface or at least the secondary grasping device or at least the deformable membrane creates the sealing region.

26. The apparatus of claim 25, wherein the actuator component is connected to and disposed about an outer surface of the deformable membrane.

27. The apparatus of claim 25, wherein an actuator is configured to actuate the secondary grasping device by one of the group consisting of at least linearly, at least transversely, at least radially, at least rotationally, at least spirally, and at least normally.

28. The apparatus of claim 25, wherein the deformable membrane forms or a torus or has a toroidal surface.

29. The apparatus of claim 25, wherein the deformable membrane has an open surface.

30. The apparatus of claim 25, wherein when the grasping apparatus is grasping an object, at least two of the group consisting of the primary suction interface, the secondary grasping device, and the deformable membrane simultaneously operate to create the sealing region.

31. A gripping apparatus configured to pick up, manipulate, and release objects, comprising:

at least a rigid or flexible compartment wall;

at least one deformable membrane;

at least one actuation mechanism connected to the deformable membrane configured to at least deform or at least displace the deformable membrane by one of the group consisting of at least linearly, at least transversely, at least radially, at least rotationally, at least spirally, and at least normally;

at least a suction interface connected to a device configured to at least generate suction or at least control the positive or negative pressure of the suction interface;

wherein the suction interface is connected to the compartment wall;

wherein the deformable membrane is configured to at least be housed by, or at least be connected to, or at least to slide against to suchthe membrane compartment wall;

wherein the deformable membrane at least partially contain contains a compressible or incompressible fluid;

wherein a geometry of the deformable membrane changes responsive to pressure;

wherein the suction interface forms one large suction cup surrounding the deformable membrane;

wherein upon the gripping apparatus contacting the object to be grasped, the at least a suction interface delimits at least one sealing region between the suction interface and the object;

wherein a shape and area of the at least one sealing region is dependent on a shape of the at least one deformable membrane; and wherein the sealing region is configured as:

at least one single area where a perimeter of the area is solely defined by contact between the suction interface and the object; or at least one single area having an outer perimeter defined by the contact between the suction interface and the object and an inner perimeter defined by contact between the deformable membrane and the object; or at least one single area where the perimeter is solely defined by the contact between the deformable membrane and the object; or at least two areas, the first area having an outer perimeter defined by the contact between the suction interface and the object and an inner perimeter defined by the contact between the deformable membrane and the object, and a second area where the perimeter is solely defined by the contact between the deformable membrane and the object.

32. The apparatus of claim 31, wherein the deformable membrane forms or a torus or has a toroidal surface.

33. The apparatus of claim 31, wherein the deformable membrane has an open surface.

34. A gripping apparatus configured to pick up, manipulate, and release objects, comprising:

at least a rigid or flexible compartment wall;

at least one deformable membrane;

at least one actuation mechanism connected to the deformable membrane configured to at least deform or at least displace the deformable membrane by one of the group consisting of at least linearly, at least transversely, at least radially, at least rotationally, at least spirally, and at least normally;

at least a suction interface connected to a device configured to at least generate suction or at least control positive or negative pressure of the suction interface;

wherein the suction interface is connected to the compartment wall;

wherein the deformable membrane is configured to at least be housed by, or at least be connected to, or at least to slide against the membrane compartment wall;

wherein the deformable membrane at least partially contains a compressible or incompressible fluid;

wherein a geometry of the deformable membrane changes responsive to pressure;

wherein the suction interface forms one large suction cup surrounding the deformable membrane;

wherein upon the gripping apparatus contacting the object to be grasped, the at least a suction interface delimits at least one sealing region between the suction interface and the object;

wherein a shape and area of the at least one sealing region is dependent on a shape of the at least one deformable membrane; and wherein the sealing region is configured as:

at least two areas, the first area having an outer perimeter defined by contact between the deformable membrane and the object and an inner perimeter defined by contact between the suction interface and the object, and a second area where the perimeter is solely defined by the contact between the suction interface and the object;

at least three areas, the first area having an outer perimeter defined by contact between the suction interface and the object and an inner perimeter defined by contact between the deformable membrane and the object, a second area having an outer perimeter defined by the contact between the deformable membrane and the object and an inner perimeter defined by contact between a second suction interface and the object, and a third area where the perimeter is solely defined by the contact between the second suction interface and the object.

* * * * *